(12) United States Patent
Lunkenbein

(10) Patent No.: US 10,875,591 B2
(45) Date of Patent: Dec. 29, 2020

(54) TRACK SYSTEM FOR TRACTION OF AN AGRICULTURAL VEHICLE TRAVELLING ON FIELDS AND ROADS

(71) Applicant: CAMSO INC., Magog (CA)

(72) Inventor: Martin Lunkenbein, Sherbrooke (CA)

(73) Assignee: CAMSO INC., Magog (CA)

( * ) Notice: Subject to any disclaimer, the term of this patent is extended or adjusted under 35 U.S.C. 154(b) by 0 days.

(21) Appl. No.: 15/228,007

(22) Filed: Aug. 4, 2016

(65) Prior Publication Data

US 2017/0036714 A1 Feb. 9, 2017

Related U.S. Application Data

(60) Provisional application No. 62/200,898, filed on Aug. 4, 2015.

(51) Int. Cl.
| | | |
|---|---|---|
| *B62D 55/104* | (2006.01) | |
| *B62D 55/065* | (2006.01) | |
| *B62D 55/24* | (2006.01) | |
| *B62D 55/14* | (2006.01) | |

(52) U.S. Cl.
CPC ......... *B62D 55/104* (2013.01); *B62D 55/065* (2013.01); *B62D 55/14* (2013.01); *B62D 55/244* (2013.01)

(58) Field of Classification Search
CPC ...... B62D 55/08; B62D 55/104; B62D 55/14; B62D 55/244
See application file for complete search history.

(56) References Cited

U.S. PATENT DOCUMENTS

| | | |
|---|---|---|
| 1,356,038 A | 10/1920 | Carey |
| 1,368,652 A | 2/1921 | Pennington et al. |
| 1,439,236 A | 12/1922 | Harris Hollis |
| 1,451,627 A | 4/1923 | Munson |
| 1,539,582 A | 5/1925 | Landry |
| 1,585,100 A | 5/1926 | Kegresse |
| 1,665,470 A | 4/1928 | Norelius |
| 1,725,817 A | 8/1929 | Mitchell |
| 1,980,276 A | 11/1934 | Kegresse |
| 1,990,900 A | 2/1935 | Glasier |
| 2,052,068 A | 8/1936 | Ziegler |
| 2,345,158 A | 3/1944 | Schroter et al. |
| 2,442,354 A | 6/1948 | Gordon, Jr. et al. |

(Continued)

FOREIGN PATENT DOCUMENTS

| | | |
|---|---|---|
| CA | 2899527 | 2/2017 |
| CN | 202080289 U | 12/2011 |

(Continued)

OTHER PUBLICATIONS

Non-Final Office Action dated Oct. 21, 2010 in connection with U.S. Appl. No. 12/708,062, 25 pages.

(Continued)

*Primary Examiner* — Ruth Ilan
*Assistant Examiner* — Maurice L Williams
(74) *Attorney, Agent, or Firm* — Smart & Biggar LLP

(57) ABSTRACT

A track system for an agricultural vehicle is configured to better perform when the vehicle is roading, including to reduce or minimize deteriorative effects on a track of the track system as the vehicle travels against a road's hard surface, especially at higher speeds.

30 Claims, 42 Drawing Sheets

(56) References Cited

U.S. PATENT DOCUMENTS

| | | | |
|---|---|---|---|
| 2,453,209 A | 11/1948 | Dwight | |
| 2,467,947 A | 4/1949 | Skelton | |
| 2,726,904 A | 12/1955 | Bekker | |
| 2,749,189 A | 6/1956 | France | |
| 2,753,190 A | 7/1956 | Hooven | |
| 3,170,532 A | 2/1965 | Boppart, Jr. | |
| 3,216,520 A | 11/1965 | Blonsky | |
| 3,275,386 A | 9/1966 | Bexten | |
| 3,292,943 A | 12/1966 | Crockett | |
| 3,333,867 A | 8/1967 | Schultze | |
| 3,343,889 A | 9/1967 | Bexten | |
| 3,346,306 A * | 10/1967 | Erwin-Walter Siber | B62D 55/253 305/158 |
| 3,357,751 A | 12/1967 | Brown | |
| 3,412,820 A | 11/1968 | Wachholz | |
| 3,435,908 A | 4/1969 | Sunderlin et al. | |
| 3,455,405 A | 7/1969 | Parent | |
| 3,506,079 A | 4/1970 | Madler et al. | |
| 3,539,170 A | 11/1970 | Hamel | |
| 3,556,455 A | 1/1971 | Storm et al. | |
| 3,565,198 A | 2/1971 | Ames | |
| 3,595,332 A | 7/1971 | Sanstrom | |
| 3,613,810 A | 10/1971 | Hetteen et al. | |
| 3,688,858 A * | 9/1972 | Jespersen | B62D 55/06 180/89.1 |
| 3,696,878 A | 10/1972 | Nelson | |
| 3,774,708 A | 11/1973 | Purcell et al. | |
| 3,826,325 A | 7/1974 | Purcell et al. | |
| 3,828,873 A | 8/1974 | Oestmann | |
| 3,828,874 A | 8/1974 | Council | |
| 3,837,714 A | 9/1974 | Russ, Sr. | |
| 3,841,424 A | 10/1974 | Purcell et al. | |
| 3,860,079 A | 1/1975 | Hoffman | |
| 3,889,769 A | 6/1975 | Blomstrom et al. | |
| 3,946,822 A | 3/1976 | Dohse et al. | |
| 3,948,110 A | 4/1976 | Lassanke | |
| 3,951,483 A | 4/1976 | Nakamura | |
| 4,019,268 A | 4/1977 | Waterman | |
| 4,069,883 A | 1/1978 | Cousineau | |
| 4,087,135 A | 5/1978 | Unruh | |
| 4,161,227 A | 7/1979 | Inui et al. | |
| 4,166,511 A | 9/1979 | Stedman | |
| 4,230,199 A | 10/1980 | Stedman | |
| 4,420,272 A | 12/1983 | Ingalls et al. | |
| 4,422,696 A * | 12/1983 | Seit | B62D 55/10 305/134 |
| 4,512,258 A * | 4/1985 | Matsukata | B61B 13/10 104/138.1 |
| 4,537,267 A | 8/1985 | Satzler | |
| 4,583,791 A | 4/1986 | Nagata et al. | |
| 4,647,116 A | 3/1987 | Trask | |
| RE32,442 E | 6/1987 | Satzler | |
| 4,681,177 A | 7/1987 | Zborowski | |
| 4,781,257 A | 11/1988 | Gee et al. | |
| 4,838,373 A | 6/1989 | Price | |
| 4,874,052 A | 10/1989 | Purcell et al. | |
| 4,881,609 A | 11/1989 | Purcell et al. | |
| 4,932,677 A | 6/1990 | Shustack | |
| 4,936,639 A | 6/1990 | Pohjola | |
| 4,940,002 A | 7/1990 | Bien | |
| 4,966,242 A | 10/1990 | Baillargeon | |
| 5,127,714 A | 7/1992 | Satzler | |
| 5,168,632 A | 12/1992 | Rimlinger, Jr. | |
| 5,184,842 A * | 2/1993 | Stockton | B60G 11/08 280/124.107 |
| 5,191,951 A | 3/1993 | Bargfrede et al. | |
| 5,240,084 A | 8/1993 | Christianson | |
| 5,273,126 A | 12/1993 | Reed et al. | |
| 5,286,044 A | 2/1994 | Satzler et al. | |
| 5,312,176 A | 5/1994 | Crabb | |
| 5,343,960 A | 9/1994 | Gilbert | |
| 5,361,860 A | 11/1994 | Smith et al. | |
| 5,373,909 A | 12/1994 | Dow et al. | |
| 5,409,305 A | 4/1995 | Nagorcka | |
| 5,451,135 A | 9/1995 | Schempf et al. | |
| 5,452,949 A | 9/1995 | Kelderman | |
| 5,494,125 A | 2/1996 | Gustin et al. | |
| 5,531,282 A | 7/1996 | Jennen | |
| 5,566,773 A | 10/1996 | Gersmann | |
| 5,639,148 A | 6/1997 | Sheidler | |
| 5,671,819 A | 9/1997 | Kendall | |
| 5,769,512 A * | 6/1998 | Kautsch | B62D 55/088 305/115 |
| 5,829,848 A | 11/1998 | Kelderman | |
| 5,842,757 A | 12/1998 | Keloderman | |
| 5,899,542 A | 5/1999 | Lykken et al. | |
| 5,899,543 A | 5/1999 | Lykken et al. | |
| 5,924,503 A | 7/1999 | Lykken | |
| 5,927,412 A | 7/1999 | Crabb | |
| RE36,284 E | 8/1999 | Kelderman | |
| 5,954,148 A | 9/1999 | Okumura et al. | |
| 5,988,775 A | 11/1999 | Nordberg | |
| D425,526 S | 5/2000 | Juncker et al. | |
| 6,062,661 A | 5/2000 | Juncker et al. | |
| 6,062,662 A | 5/2000 | Witt | |
| 6,068,353 A | 5/2000 | Juncker et al. | |
| 6,074,024 A | 6/2000 | Juncker | |
| 6,074,025 A | 6/2000 | Juncker et al. | |
| 6,116,362 A | 9/2000 | Schubert et al. | |
| 6,125,956 A | 10/2000 | Gignac | |
| 6,129,426 A | 10/2000 | Tucker | |
| 6,131,833 A | 10/2000 | Chapman | |
| 6,135,220 A | 10/2000 | Gleasman | |
| 6,164,399 A | 12/2000 | Bays | |
| 6,176,334 B1 | 1/2001 | Lorenzen | |
| 6,244,613 B1 | 6/2001 | Renger | |
| 6,249,994 B1 | 6/2001 | Oertley | |
| 6,267,459 B1 | 7/2001 | Becker et al. | |
| 6,273,530 B1 | 8/2001 | Johnson et al. | |
| 6,289,995 B1 | 9/2001 | Fuller | |
| 6,318,484 B2 | 11/2001 | Lykken et al. | |
| 6,374,933 B1 | 4/2002 | Rupper, Jr. et al. | |
| 6,386,653 B1 | 5/2002 | Brandenburger | |
| 6,401,847 B1 | 6/2002 | Lykken | |
| 6,502,840 B1 | 1/2003 | Leyonhjelm et al. | |
| 6,536,854 B2 | 3/2003 | Juncker et al. | |
| 6,543,861 B1 | 4/2003 | Kahle et al. | |
| 6,543,862 B1 | 4/2003 | Kahle et al. | |
| 6,557,953 B1 | 5/2003 | Kahle et al. | |
| 6,604,796 B2 | 8/2003 | Boyum | |
| 6,607,256 B2 | 8/2003 | Yoshida et al. | |
| 6,640,915 B2 | 11/2003 | Haringer | |
| 6,641,235 B2 | 11/2003 | Boyum | |
| 6,712,549 B2 | 3/2004 | Roth | |
| D488,171 S | 4/2004 | Juncker et al. | |
| 6,716,012 B2 | 4/2004 | Yovichin | |
| 6,857,816 B2 | 2/2005 | Saito et al. | |
| 6,929,334 B2 | 7/2005 | Verheye et al. | |
| RE38,858 E | 11/2005 | Grawey et al. | |
| 6,959,936 B2 | 11/2005 | Anderson et al. | |
| 7,077,216 B2 | 7/2006 | Juncker | |
| 7,156,185 B2 | 1/2007 | Juncker | |
| 7,222,924 B2 | 5/2007 | Christianson | |
| 7,255,184 B2 | 8/2007 | Loegering et al. | |
| 7,370,918 B2 | 5/2008 | Tucker | |
| 7,380,892 B2 | 6/2008 | Rosenboom | |
| 7,552,979 B2 | 6/2009 | Christianson | |
| 7,740,084 B2 | 6/2010 | Rosenboom | |
| 7,798,260 B2 | 9/2010 | Albright | |
| 8,342,257 B2 | 1/2013 | Rosenboom | |
| 8,763,716 B2 | 7/2014 | Rosenboom | |
| 9,505,454 B1 | 11/2016 | Kautsch | |
| 9,580,121 B2 | 2/2017 | Reshad et al. | |
| 9,940,691 B2 | 4/2018 | Mitsunami et al. | |
| 10,112,663 B2 | 10/2018 | Kautsch | |
| 10,259,512 B2 | 4/2019 | Rosemboom | |
| 2002/0101052 A1 | 8/2002 | Panizzolo | |
| 2003/0070862 A1 | 4/2003 | Tartara | |
| 2003/0127258 A1 | 7/2003 | Lansberry | |
| 2005/0035650 A1 | 2/2005 | Toews | |
| 2005/0035655 A1 | 2/2005 | Beckstrom et al. | |
| 2005/0072607 A1 | 4/2005 | Tucker | |

(56) References Cited

U.S. PATENT DOCUMENTS

| | | | |
|---|---|---|---|
| 2005/0077784 A1 | 4/2005 | Dudkinski et al. | |
| 2005/0200200 A1 | 9/2005 | Fukushima | |
| 2006/0113121 A1 | 5/2006 | Radke et al. | |
| 2006/0220456 A1 | 10/2006 | Sugahara | |
| 2006/0267405 A1 | 11/2006 | Tucker | |
| 2007/0046100 A1* | 3/2007 | McGilvrey | B62D 55/244 305/165 |
| 2007/0102173 A1 | 5/2007 | Juncker | |
| 2007/0138866 A1 | 6/2007 | Rosenboom | |
| 2007/0261898 A1 | 11/2007 | Bessette | |
| 2008/0084111 A1* | 4/2008 | Rainer | B62D 55/112 305/124 |
| 2008/0156548 A1 | 7/2008 | Mallette et al. | |
| 2009/0105059 A1* | 4/2009 | Dorry | B04B 1/2016 494/37 |
| 2009/0206655 A1* | 8/2009 | Song | B62D 55/244 305/169 |
| 2009/0278403 A1 | 11/2009 | Canossa | |
| 2009/0308669 A1 | 12/2009 | Vos et al. | |
| 2009/0321151 A1 | 12/2009 | Archambault et al. | |
| 2010/0006353 A1 | 1/2010 | Bernard et al. | |
| 2010/0012399 A1 | 1/2010 | Hansen | |
| 2010/0033010 A1* | 2/2010 | Shimozono | B62D 55/26 305/169 |
| 2010/0060075 A1 | 3/2010 | Hanson | |
| 2010/0071969 A1 | 3/2010 | Rainer | |
| 2010/0133019 A1 | 3/2010 | Muemken | |
| 2010/0108421 A1 | 5/2010 | Zuchoski et al. | |
| 2010/0201186 A1 | 8/2010 | Rosenboom | |
| 2010/0139994 A1 | 10/2010 | Hansen | |
| 2010/0295367 A1* | 11/2010 | Kim | B62D 55/244 305/177 |
| 2011/0046832 A1* | 2/2011 | Francoeur | B60K 35/00 701/22 |
| 2011/0068620 A1 | 3/2011 | Delisle et al. | |
| 2011/0155482 A1 | 6/2011 | Courtemanche et al. | |
| 2013/0126196 A1 | 5/2013 | Rosenboom | |
| 2013/0134772 A1* | 5/2013 | Dandurand | B62D 55/04 305/178 |
| 2014/0262563 A1 | 9/2014 | Rosenboom | |
| 2015/0344087 A1 | 12/2015 | De Boe et al. | |
| 2016/0039482 A1 | 2/2016 | Lussier et al. | |
| 2016/0059779 A1* | 3/2016 | Vandendriessche | B60Q 9/00 701/70 |
| 2016/0114840 A1* | 4/2016 | L'Herault | B62D 55/04 180/9.21 |
| 2016/0362148 A1 | 12/2016 | Rosenboom | |
| 2016/0362151 A1* | 12/2016 | Jee | B62D 55/26 |
| 2017/0274946 A1 | 9/2017 | Vik et al. | |

FOREIGN PATENT DOCUMENTS

| | | |
|---|---|---|
| EP | 0680869 | 8/1995 |
| EP | 1982904 | 10/2008 |
| WO | 2014195386 A1 | 12/2014 |
| WO | 2007101633 | 9/2017 |
| WO | 2007101634 | 9/2017 |

OTHER PUBLICATIONS

Final Office Action dated Jul. 7, 2011 in connection with U.S. Appl. No. 12/708,062, 7 pages.
Non-Final Office Action dated Sep. 15, 2015 in connection with U.S. Appl. No. 15/246,704, 8 pages.
Final Office Action issued by the United States Patent and Trademark Office dated May 30, 2017 in connection with U.S. Appl. No. 15/246,704.
Restriction Requirement dated Aug. 9, 2002 in connection with U.S. Appl. No. 09/847,264, 4 pages.
Restriction Requirement dated Nov. 18, 2002 in connection with U.S. Appl. No. 09/847,264, 5 pages.
Non-Final Office Action dated Jan. 27, 2003 in connection with U.S. Appl. No. 09/847,264, 4 pages.
Final Office Action dated Mar. 16, 2004 in connection with U.S. Appl. No. 09/847,264, 5 pages.
Non-Final Office Action dated Aug. 1, 2005 in connection with U.S. Appl. No. 09/847,264, 5 pages.
Non-Final Office Action dated Oct. 17, 2005 in connection with U.S. Appl. No. 10/776,086, 7 pages.
Final Office Action dated May 1, 2006 in connection with U.S. Appl. No. 09/847,264, 8 pages.
Non-Final Office Action dated May 22, 2006 in connection with U.S. Appl. No. 10/776,086, 5 pages.
Non-Final Office Action dated Nov. 9, 2006 in connection with U.S. Appl. No. 09/847,264, 5 pages.
Non-Final Office Action dated Dec. 13, 2006 in connection with U.S. Appl. No. 10/776,086, 6 pages.
Final Office Action dated Jun. 4, 2007 in connection with U.S. Appl. No. 10/776,086, 6 pages.
Final Office Action dated Jun. 28, 2007 in connection with U.S. Appl. No. 09/847,264, 5 pages.
Non-Final Office Action dated Dec. 19, 2007 in connection with U.S. Appl. No. 09/847,264, 11 pages.
Ex Parte Quayle Action dated Jan. 9, 2008 in connection with U.S. Appl. No. 10/776,086, 6 pages.
Notice of Allowance dated Feb. 22, 2008 in connection with U.S. Appl. No. 10/776,086, 4 pages.
Final Office Action dated Jun. 23, 2008 in connection with U.S. Appl. No. 09/847,264, 13 pages.
Non-Final Office Action dated Oct. 27, 2008 in connection with U.S. Appl. No. 11/672,151, 6 pages.
Advisory Action dated Jan. 16, 2009 in connection with U.S. Appl. No. 09/847,264, 2 pages.
Final Office Action dated Apr. 13, 2009 in connection with U.S. Appl. No. 11/672,151, 8 pages.
Advisory Action dated Jul. 16, 2009 in connection with U.S. Appl. No. 11/672,151, 5 pages.
Non-Final Office Action dated Oct. 2, 2009 in connection with U.S. Appl. No. 09/847,264, 12 pages.
Notice of Allowance dated Nov. 16, 2009 in connection with U.S. Appl. No. 11/672,151, 7 pages.
Notice of Allowance dated Mar. 15, 2010 in connection with U.S. Appl. No. 09/847,264, 4 pages.
Notice of Allowance dated Sep. 6, 2012 in connection with U.S. Appl. No. 12/708,062, 5 pages.
Non-Final Office Action dated Jan. 16, 2015 in connection with U.S. Appl. No. 13/495,823, 12 pages.
Non-Final Office Action dated Oct. 8, 2015 in connection with U.S. Appl. No. 13/495,823, 6 pages.
Non-Final Office Action dated Oct. 14, 2015 in connection with U.S. Appl. No. 14/287,794, 5 pages.
Notice of Allowance dated Jul. 25, 2016 in connection with U.S. Appl. No. 13/495,823, 5 pages.
Non-Final Office Action dated Sep. 14, 2017 in connection with U.S. Appl. No. 15/246,704, 9 pages.
Final Office Action dated Oct. 31, 2017 in connection with U.S. Appl. No. 15/246,704, 9 pages.
Non-Final Office Action dated Nov. 24, 2017 in connection with U.S. Appl. No. 15/246,704, 9 pages.
Examiner's Report dated Jan. 2, 2018 in connection with Canadian Patent Application No. 2,899,527, 3 pages.
Final Office Action dated Mar. 12, 2018 in connection with U.S. Appl. No. 15/246,704, 10 pages.
Examiner's Report dated Apr. 13, 2018 in connection with Canadian Patent Application No. 2,899,527, 5 pages.
Notice of Allowance dated Jun. 27, 2018 in connection with U.S. Appl. No. 15/348,717, 9 pages.
Non-Final Office Action dated Jul. 2, 2018 in connection with U.S. Appl. No. 15/246,704, 10 pages.
International Search Report dated Feb. 10, 2011 in connection with International PCT application No. PCT/US2010/051166, 4 pages.
Final Office Action dated Oct. 22, 2015 in connection with U.S. Appl. No. 13/499,655, 20 pages.

(56) References Cited

OTHER PUBLICATIONS

Non-Final Office Action dated Jan. 16, 2015 in connection with U.S. Appl. No. 13/499,655, 19 pages.
Non-Final Office Action dated Jul. 21, 2016 in connection with U.S. Appl. No. 13/499,655, 20 pages.
Non-Final Office Action dated Nov. 14, 2018 in connection with U.S. Appl. No. 16/143,784, 7 pages.
Notice of Allowance dated Apr. 17, 2019 in connection with U.S. Appl. No. 16/143,784, 10 pages.
Notice of Allowance dated Dec. 5, 2018 in connection with U.S. Appl. No. 15/246,704, 15 pages.
Written Opinion dated Feb. 10, 2011 in connection with International PCT application No. PCT/US2010/051166, 12 pages.

* cited by examiner

TRACK SYSTEM FOR TRACTION OF AN AGRICULTURAL VEHICLE TRAVELLING ON FIELDS AND ROADS

CROSS-REFERENCE TO RELATED APPLICATION

This application claims the benefit of U.S. Provisional Patent Application 62/200,898 filed on Aug. 4, 2015 and incorporated by reference herein.

FIELD OF THE INVENTION

The invention relates generally to agricultural vehicles (e.g., tractors, harvesters, combines, etc.) and, more particularly, to track systems for traction of agricultural vehicles.

BACKGROUND

Agricultural vehicles (e.g., tractors, harvesters, combines, etc.) sometimes comprise track systems (instead of tire-equipped wheels) to enhance their traction and floatation in agricultural fields, which may be soft, slippery, and/or uneven (e.g., soil, mud, etc.).

In addition to travelling in agricultural fields to perform agricultural work, agricultural vehicles are often "roading", i.e., travelling on roads, such as between different fields. When on a road, an agricultural vehicle's track systems are exposed to conditions that are completely different than those in a field and can drastically affect their performance. Notably, the road's hard surface, which may be relatively hot, and a typical desire of the vehicle's operator to move the vehicle faster on the road (e.g., to minimize non-productive time out of the field) may result in severe wear and deterioration of the vehicle's tracks, which may lead to their premature failure.

The applicant has discovered that, under certain operating conditions, an agricultural vehicle's tracks, which have a carcass that is reinforced, can fail very quickly during roading. For instance, tracks with an expected useful life of 2000 or 3000 hours in a field deteriorate significantly within merely a few hours of roading. The economic consequences for the vehicle's operator are severe because a failed track, especially one in which the carcass has been damaged, cannot readily be repaired and must typically be replaced.

Without intent of being bound by any particular theory, the actual failure mechanism of a track's carcass is believed to be essentially a succession of failures of different components of the track, which progressively increases the strain on the carcass until it fails as well.

To elaborate, as the vehicle is driven on the road, heat buildup starts to develop in the track's tread projections (sometimes referred to as "traction projections", "traction lugs" or "tread bars") that project from the track's ground-engaging outer surface. The heat buildup can increase the internal temperature of a tread projection to a point at which the internal elastomeric material outgases, increasing the internal pressure of the tread projection until it bursts. The effect of such "blowout" is to produce a void volume in the tread projection, which reduces its load carrying capacity. As a result of the void volume, the tread projection structurally collapses and loading is directly transferred to the carcass underlying the tread projection. The blowout of multiple traction projections, as shown in FIG. 38, exposes the carcass in that area of the track to loading that it is not designed to sustain. As shown in FIGS. 39 and 40, the loading can rapidly wear down the carcass and expose its reinforcements, such as its cables, which in turn can wear down causing a complete failure of the track.

Tests performed by the applicant have identified an operational range of the vehicle, which is characterized by certain speed, load, and track width factors in which the failure mode occurs almost uncontrollably. In other words, when the vehicle is roading in that operational range, the cascade of failure events can occur very quickly following an initial blowout event. It is very difficult for the operator to detect the occurrence of the initial blowout such that even attentive operators cannot react quickly enough to prevent the track destruction.

The operational range in question tends to be at or beyond the operational limit of the vehicle, that is, above the manufacturer recommended maximal speed and maximal weight. Yet it constitutes a desired operational range because the vehicle is the most productive in those conditions. Accordingly, from an efficiency perspective, operators tend to operate their vehicles as near as possible to those limits, with the risk that the track may suffer from a catastrophic failure.

Roading may also cause severe damage to other components of the agricultural vehicle's track systems, including idler wheels (e.g., front or read idler wheels, or intermediate roller wheels) that contact a track's inner side. For example, this may cause a peripheral covering of an idler wheel to damage its treaded outer surface, as shown in FIG. 41, and/or fail entirely as shown in FIG. 42.

For these and other reasons, there is a need to provide an improved track system for an agricultural vehicle that can notably reduce the risk of failure of its track's carcass when the vehicle is roading, such as when operated in the above-defined operational range.

SUMMARY OF THE INVENTION

According to various aspects of the invention, a track system for traction of an agricultural vehicle is configured to better perform when the agricultural vehicle is roading, including to reduce or minimize deteriorative effects on a track of the track system as the agricultural vehicle travels against a road's hard surface, especially at higher speeds.

For example, according to an aspect of the invention, there is provided a track system for traction of an agricultural vehicle. The track system comprises a track and a track-engaging assembly for driving and guiding the track around the track-engaging assembly. The track comprises elastomeric material to flex around the track-engaging assembly. The track also comprises a reinforcement within the elastomeric material. The track-engaging assembly comprises a drive wheel for driving the track and a plurality of idler wheels for contacting a bottom run of the track. The track system comprises an enhanced-roading feature to facilitate travel of the agriculture vehicle on a road. A speed restriction for the agricultural vehicle on the road is laxer than if the enhanced-roading feature was omitted but the track system was otherwise identical.

According to another aspect of the invention, there is provided a track system for traction of an agricultural vehicle. The track system comprises a track and a track-engaging assembly for driving and guiding the track around the track-engaging assembly. The track comprises elastomeric material to flex around the track-engaging assembly. The track comprises a reinforcement within the elastomeric material. The track-engaging assembly comprises a drive wheel for driving the track and a plurality of idler wheels for contacting a bottom run of the track. The track system comprises a lateral load distribution mechanism configured such that bottom track-contacting areas of laterally-adjacent ones of the idler wheels are movable relative to one another in a height direction of the track system when the agricultural vehicle travels on a road. A speed restriction for the agricultural vehicle on the road is laxer than if the bottom track-contacting areas of the laterally-adjacent ones of the idler wheels were not movable relative to one another in the height direction of the track system when the agricultural vehicle travels on the road but the track system was otherwise identical.

According to another aspect of the invention, there is provided a track system for traction of an agricultural vehicle. The track system comprises a track and a track-engaging assembly for driving and guiding the track around the track-engaging assembly. The track comprises elastomeric material to flex around the track-engaging assembly. The track comprises a reinforcement within the elastomeric material. The track-engaging assembly comprises a drive wheel for driving the track and a plurality of idler wheels for contacting a bottom run of the track. The track system comprises a lateral load distribution mechanism configured such that bottom track-contacting areas of laterally-adjacent ones of the idler wheels are movable relative to one another in a height direction of the track system when the agricultural vehicle travels on a road. A speed restriction for the agricultural vehicle on the road is defined in a zone SRZ indicated in a chart provided in FIG. 43.

According to another aspect of the invention, there is provided a method for regulating a speed of an agricultural vehicle on a road. The method comprises providing a plurality of track systems for traction of the agricultural vehicle. Each track system comprises a track and a track-engaging assembly for driving and guiding the track around the track-engaging assembly. The track comprises elastomeric material to flex around the track-engaging assembly. The track comprises a reinforcement within the elastomeric material. The track-engaging assembly comprises a drive wheel for driving the track and a plurality of idler wheels for contacting a bottom run of the track. The track system comprises a lateral load distribution mechanism configured such that bottom track-contacting areas of laterally-adjacent ones of the idler wheels are movable relative to one another in a height direction of the track system when the agricultural vehicle travels on the road. The method comprises conveying a speed restriction for the agricultural vehicle on the road that is laxer than if the bottom track-contacting areas of the laterally-adjacent ones of the idler wheels were not movable relative to one another in the height direction of the track system when the agricultural vehicle travels on the road but the track system was otherwise identical.

According to another aspect of the invention, there is provided a method for regulating a speed of an agricultural vehicle on a road. The method comprises providing a plurality of track systems for traction of the agricultural vehicle. Each track system comprises a track and a track-engaging assembly for driving and guiding the track around the track-engaging assembly. The track comprises elastomeric material to flex around the track-engaging assembly. The track also comprises a reinforcement within the elastomeric material. The track-engaging assembly comprises a drive wheel for driving the track and a plurality of idler wheels for contacting a bottom run of the track. The method also comprises conveying a speed restriction for the agricultural vehicle on the road. The speed restriction for the agricultural vehicle on the road is defined in a zone SRZ indicated in a chart provided in FIG. 43.

According to another aspect of the invention, there is provided a track for traction of an agricultural vehicle. The track is mountable around a track-engaging assembly for driving and guiding the track. The track comprises elastomeric material to flex around the track-engaging assembly. The track comprises a reinforcement within the elastomeric material. The track-engaging assembly comprises a drive wheel for driving the track and a plurality of idler wheels for contacting a bottom run of the track. The track comprises a ground-engaging outer surface, an inner surface opposite to the ground-engaging outer surface, and a plurality of traction projections projecting from the ground-engaging outer surface. Each traction projection comprises a top surface for facing the ground. A width of the top surface of the traction projection is greater than a height of the traction projection.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which.

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1:
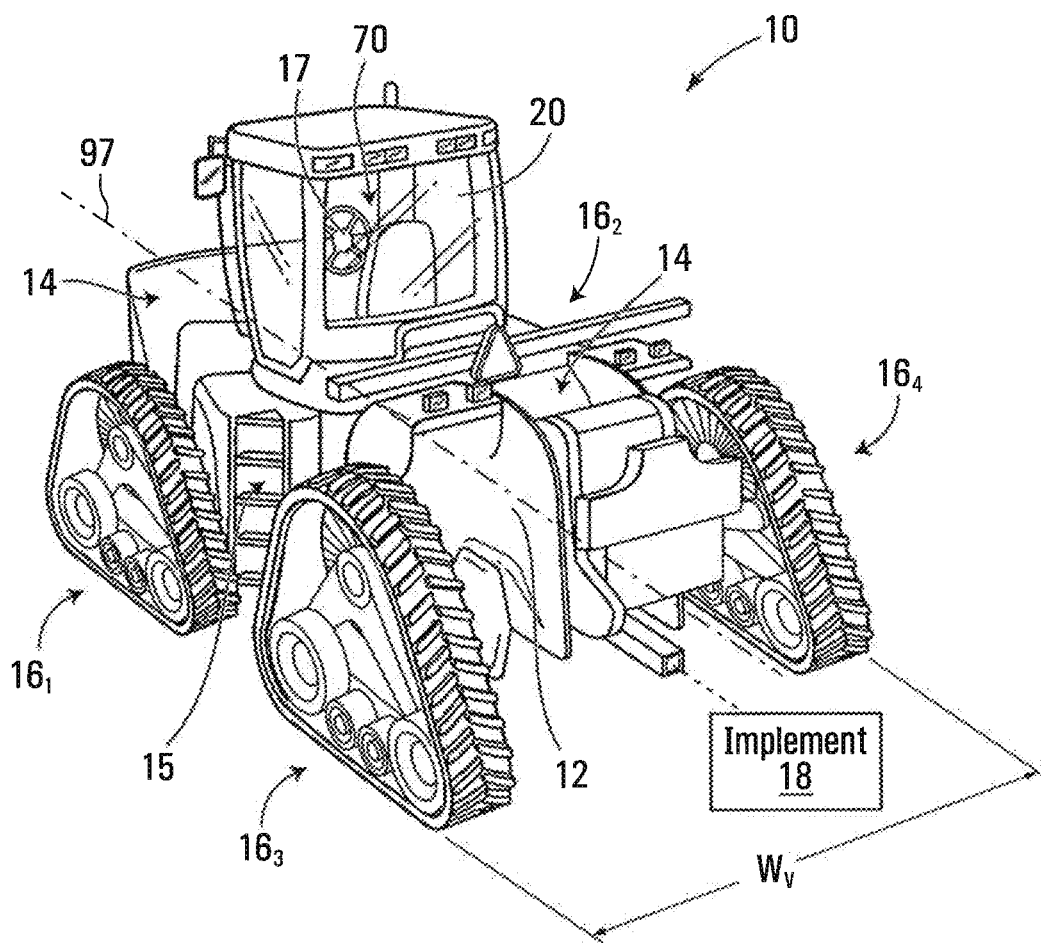
FIG. 1 shows an example of an agricultural vehicle comprising a track system in accordance with an embodiment of the invention.

FIG. 1 shows an example of an agricultural vehicle 10 in accordance with an embodiment of the invention. In this embodiment, the agricultural vehicle 10 is a tractor. In other embodiments, the agricultural vehicle 10 may be a combine harvester, another type of harvester, or any other type of agricultural vehicle.

The agricultural vehicle 10 comprises a frame 12, a powertrain 15, a steering system 17, a plurality of track systems $16_1$-$16_4$ (which can be referred to as "undercarriages"), and an operator cabin 20 that enable an operator to move the agricultural vehicle 10 on the ground. The vehicle 10 can travel in an agricultural field to perform agricultural work using a work implement 18. The vehicle 10 can also be "roading", i.e., travelling on a road (i.e., a paved road having a hard surface of asphalt, concrete, gravel, or other pavement), such as between agricultural fields.

As will be further discussed later, in this embodiment, the track systems $16_1$-$16_4$ of the agricultural vehicle 10 are designed to better perform when the vehicle 10 is roading, including to reduce or minimize deteriorative effects on tracks of the track systems $16_1$-$16_4$ (e.g., "blowout" of their traction projections, deterioration of their carcass, etc.) as the vehicle 10 travels fast against a road's hard surface. Notably, in this embodiment, each of the track systems $16_1$-$16_4$ of the agricultural vehicle 10 is designed to better laterally distribute a load it supports onto the road. This may allow the vehicle 10 to travel faster on the road without excessively wearing or deteriorating the track systems $16_1$-$16_4$, which may make the vehicle 10 more efficient and productive.

The powertrain 15 is configured for generating motive power and transmitting motive power to the track systems $16_1$-$16_4$ to propel the agricultural vehicle 10 on the ground. To that end, the powertrain 15 comprises a prime mover 14, which is a source of motive power that comprises one or more motors. For example, in this embodiment, the prime mover 14 comprises an internal combustion engine. In other embodiments, the prime mover 14 may comprise another type of motor (e.g., an electric motor) or a combination of different types of motor (e.g., an internal combustion engine and an electric motor). The prime mover 14 is in a driving relationship with the track systems $16_1$-$16_4$. That is, the powertrain 15 transmits motive power generated by the prime mover 14 to one or more of the track systems $16_1$-$16_4$ in order to drive (i.e., impart motion to) these one or more of the track systems $16_1$-$16_4$ The powertrain 15 may transmit power from the prime mover 14 to the track systems $16_1$-$16_4$ in any suitable way. In this embodiment, the powertrain 15 comprises a transmission between the prime mover 14 and final drive axles $56_1$, $56_2$ for transmitting motive power from the prime mover 14 to the track systems $16_1$-$16_4$. The transmission may be an automatic transmission (e.g., a continuously variable transmission (CVT)) or any other suitable type of transmission.

The work implement 18 is used to perform agricultural work. For example, in some embodiments, the work implement 18 may be a combine head, a cutter, a scraper pan, a tool bar, a planter, or any other type of agricultural work implement.

The operator cabin 20 is where the operator sits and controls the agricultural vehicle 10. More particularly, the operator cabin 20 comprises a user interface 70 including a set of controls that allow the operator to steer the agricultural vehicle 10 on the ground and operate the work implement 18. For example, in this embodiment, the user interface 70 comprises an accelerator, a brake control, and a steering device that are operable by the operator to control motion of the agricultural vehicle 10 on the ground and operation of the work implement 18. The user interface 70 also comprises an instrument panel (e.g., a dashboard) which provides indicators (e.g., a speedometer indicator, a tachometer indicator, etc.) to convey information to the operator.

Figure 2:
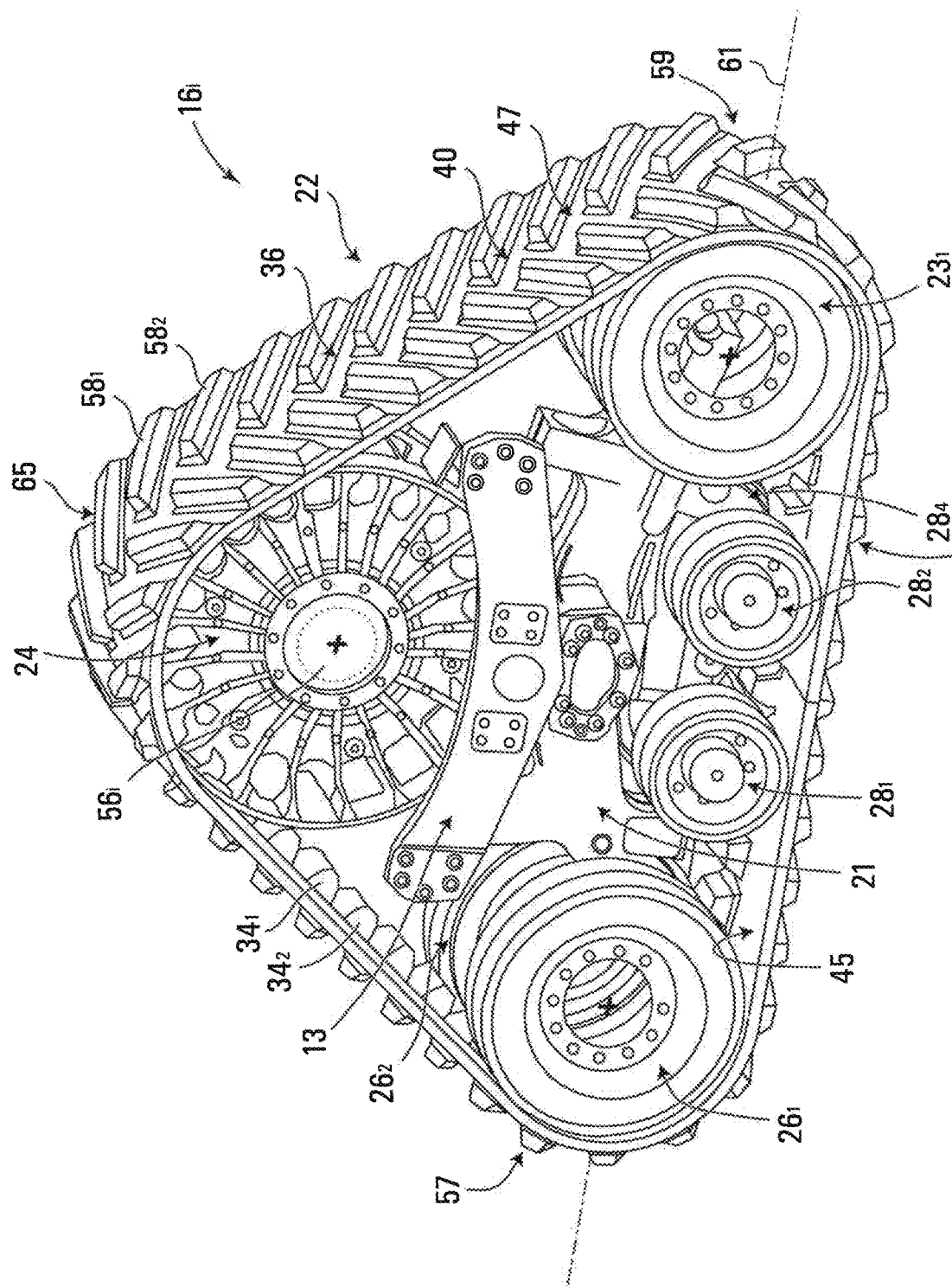
FIGS. 2 and 3 show a perspective view and a side view of the track system.
Figure 3:
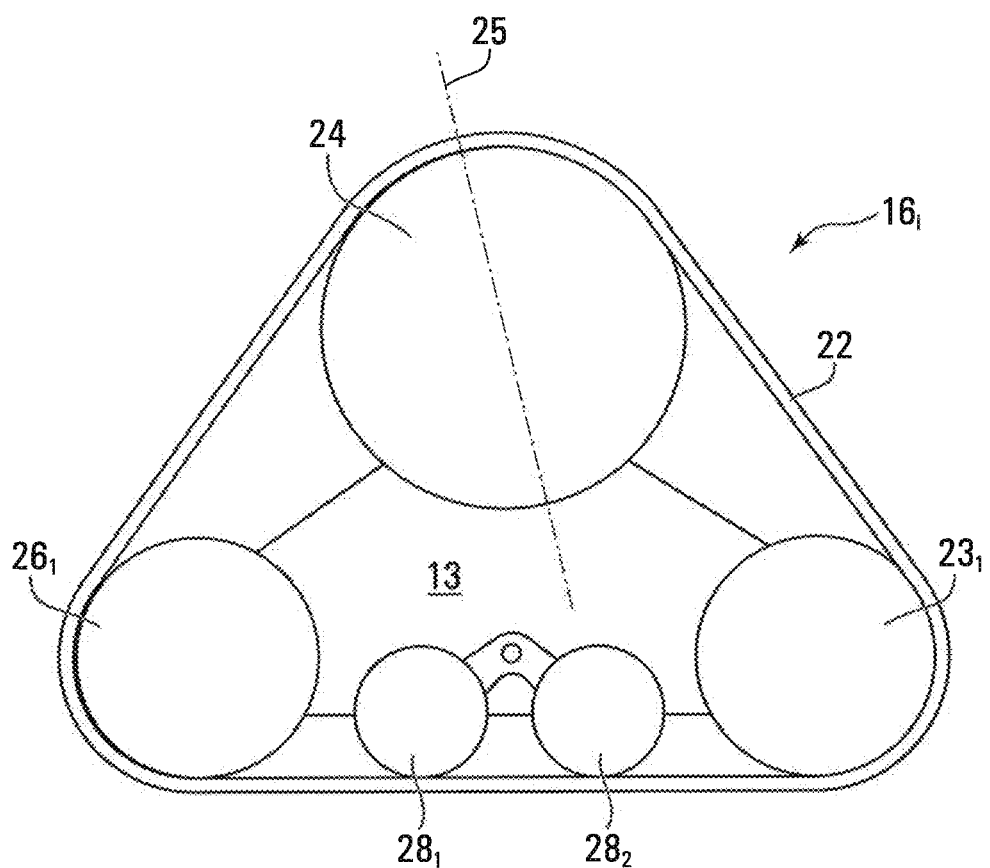
Figure 5:
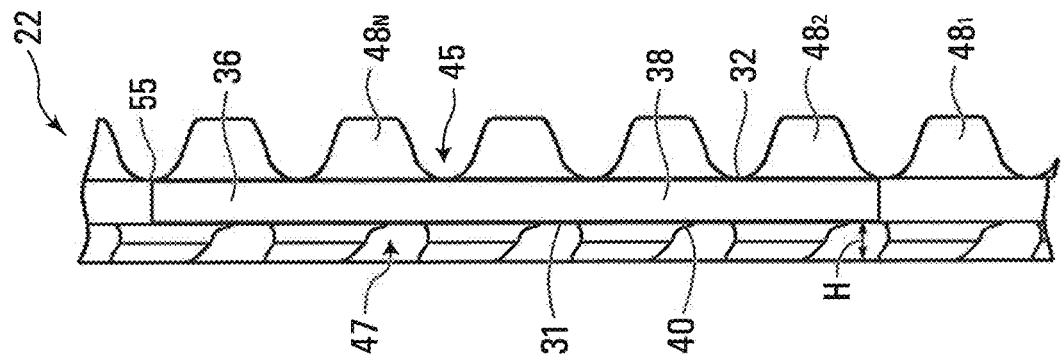
FIGS. 4 and 5 show a plan view and a side view of a track of the track system.
Figure 4:
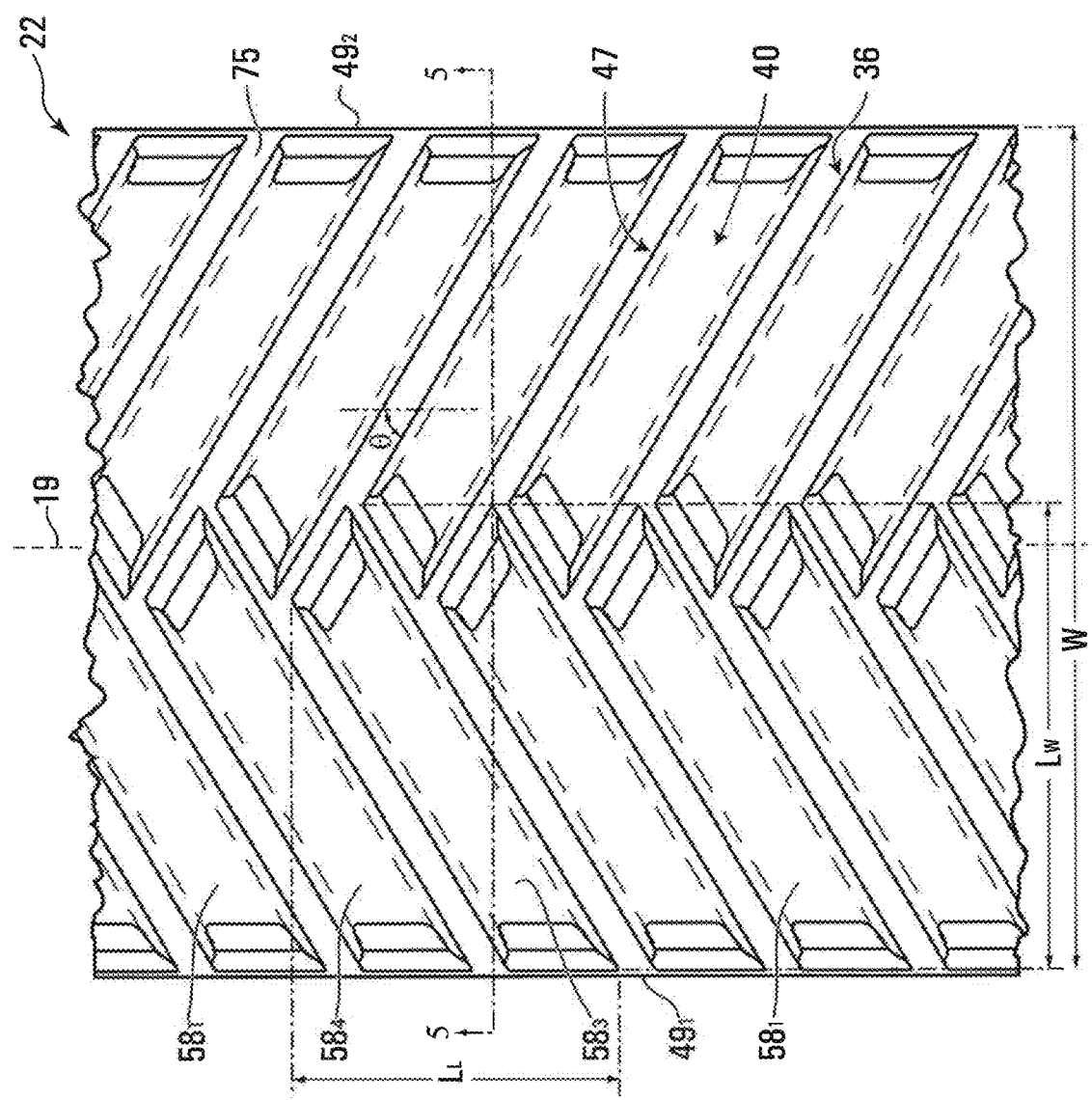
Figure 6:
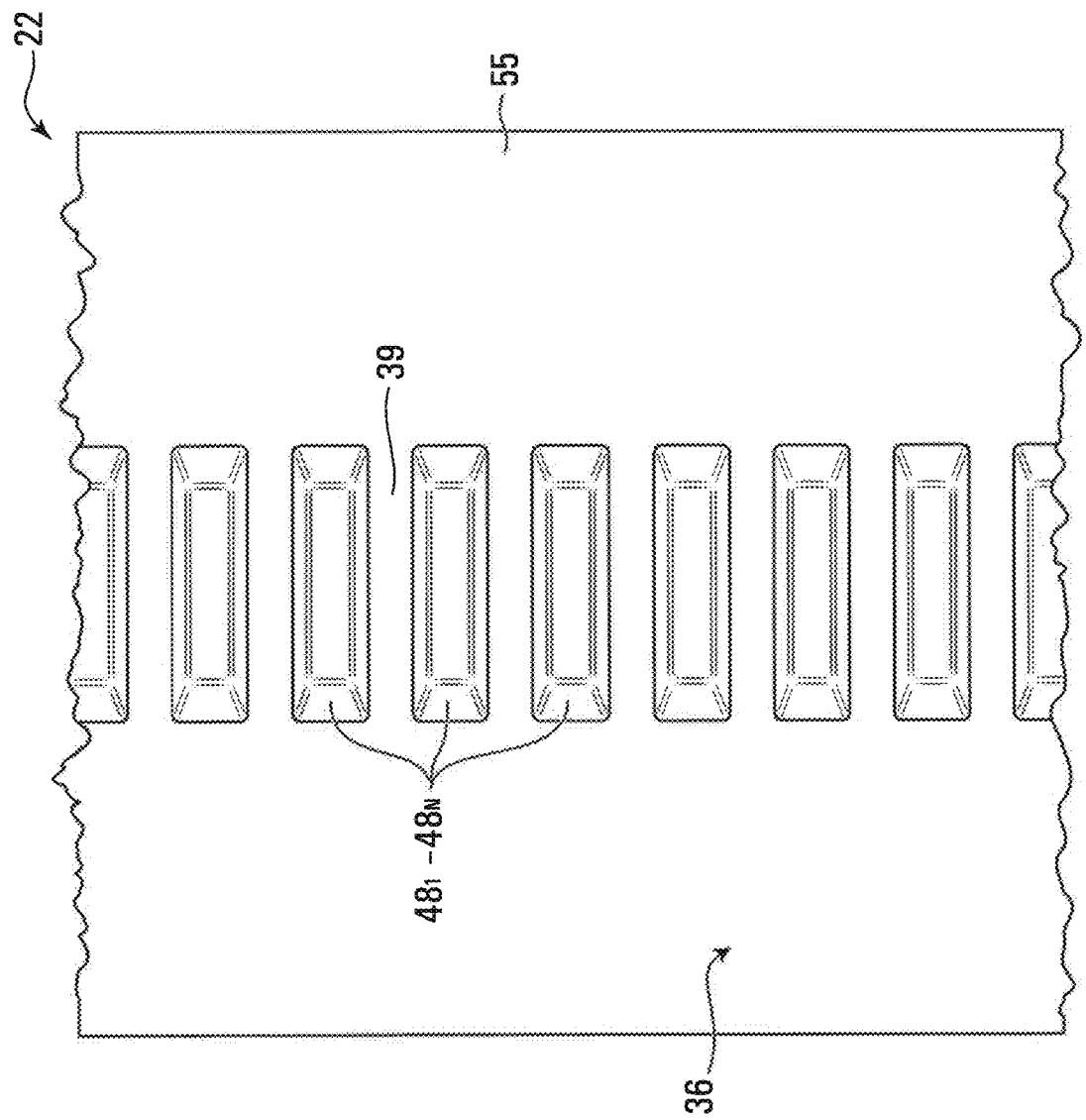
FIG. 6 shows an inside view of the track.
Figure 7:
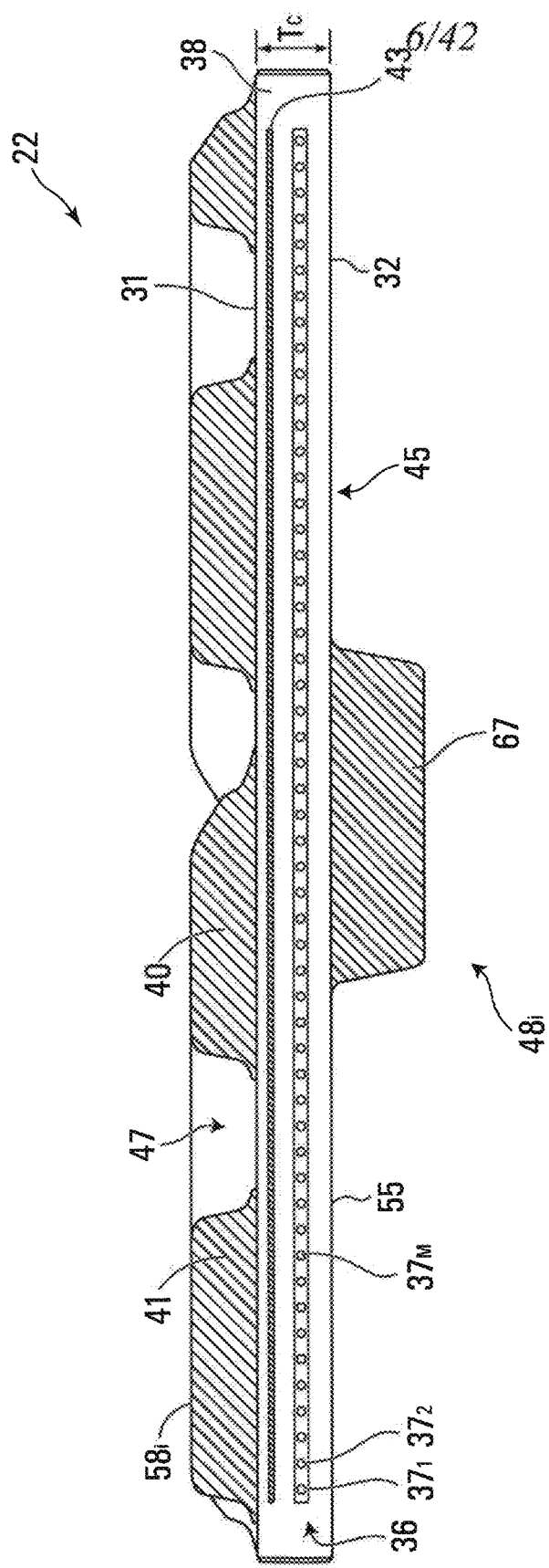
FIG. 7 shows a cross-sectional view of the track.

The track systems $16_1$-$16_4$ engage the ground to propel the agricultural vehicle 10. As shown in FIGS. 2 and 3, each track system $16_i$ comprises a track-engaging assembly 21 and a track 22 disposed around the track-engaging assembly 21. In this embodiment, the track-engaging assembly 21 comprises a plurality of wheels which, in this example, includes a drive wheel 24 and a plurality of idler wheels that includes front (i.e., leading) idler wheels $23_1$, $23_2$, rear (i.e., trailing) idler wheels $26_1$, $26_2$, and roller wheels $28_1$-$28_4$. The track system $16_i$ also comprises a frame 13 which supports various components of the track system $16_i$, including the idler wheels $23_1$, $23_2$, $26_1$, $26_2$, $28_1$-$28_4$. The track system $16_i$ has a longitudinal direction and a first longitudinal end 57 and a second longitudinal end 59 that define a length of the track system $16_i$ along a longitudinal axis 61 that defines the longitudinal direction of the track system $16_i$. The track system $16_i$ has a widthwise direction and a width that is defined by a width W of the track 22. The track system $16_i$ also has a height direction that is normal to its longitudinal direction and its widthwise direction.

Each of the front ones of the track systems $16_1$-$16_4$ is steerable by the steering system 17 of the agricultural vehicle 10 in response to input of the user at the steering device to change an orientation of that track system relative to the frame 12 of the agricultural vehicle 10 in order to steer the agricultural vehicle 10 on the ground. To that end, each of the front ones of the track systems $16_1$-$16_4$ is pivotable about a steering axis 25 of the agricultural vehicle 10. An orientation of the longitudinal axis 61 of each of the front ones of the track systems $16_1$-$16_4$ is thus adjustable relative to a longitudinal axis 97 of the agricultural vehicle 10.

The track 22 engages the ground to provide traction to the agricultural vehicle 10. A length of the track 22 allows the track 22 to be mounted around the track-engaging assembly 21. In view of its closed configuration without ends that allows it to be disposed and moved around the track-engaging assembly 21, the track 22 can be referred to as an "endless" track. With additional reference to FIGS. 3 to 6, the track 22 comprises an inner side 45, a ground-engaging outer side 47, and lateral edges $49_1$, $49_2$. The inner side 45 faces the wheels $23_1$, $23_2$, 24, $26_1$, $26_2$, $28_1$-$28_4$, while the ground-engaging outer side 47 engages the ground. A top run 65 of the track 22 extends between the longitudinal ends 57, 59 of the track system $16_i$ and over the wheels $23_1$, $23_2$, 24, $26_1$, $26_2$, $28_1$-$28_4$, while a bottom run 66 of the track 22 extends between the longitudinal ends 57, 59 of the track system $16_i$ and under the wheels $23_1$, $23_2$, 24, $26_1$, $26_2$, $28_1$-$28_4$. The bottom run 66 of the track 22 defines an area of contact 63 of the track 22 with the ground which generates traction and bears a majority of a load on the track system $16_i$, and which will be referred to as a "contact patch" of the track 22 with the ground. The track 22 has a longitudinal axis 19 which defines a longitudinal direction of the track 22 (i.e., a direction generally parallel to its longitudinal axis) and transversal directions of the track 22 (i.e., directions transverse to its longitudinal axis), including a widthwise direction of the track 22 (i.e., a lateral direction generally perpendicular to its longitudinal axis). The track 22 has a thickness direction normal to its longitudinal and widthwise directions.

In this embodiment, the track 22 is relatively narrow. For instance, this may be helpful to allow the track 22 to fit between rows of crops such as to leave the crops undisturbed when the agricultural vehicle 10 traverses an agricultural field. In turn, this may allow the agricultural field to have a greater crop density. For instance, in some embodiments, a ratio of a width $W_v$ of the agricultural vehicle 10 (measured between laterally-outwardmost ones of the track systems $16_1$-$16_4$) over the width W of the track 22 may be at least 5, in some cases at least 7, in some cases at least 10, in some cases at least 12, and in some cases even more. For example, in some embodiments, the width W of the track 22 may no more than 30 inches, in some cases no more than 25 inches, in some cases no more than 20 inches, in some cases no more than 18 inches, in some cases no more than 16 inches, and in some cases even less (e.g., 14.5 inches). The width W of the track 22 may have any other suitable value in other embodiments.

The track 22 is elastomeric, i.e., comprises elastomeric material, to be flexible around the track-engaging assembly 21. The elastomeric material of the track 22 can include any polymeric material with suitable elasticity. In this embodiment, the elastomeric material of the track 22 includes rubber. Various rubber compounds may be used and, in some cases, different rubber compounds may be present in different areas of the track 22. In other embodiments, the elastomeric material of the track 22 may include another elastomer in addition to or instead of rubber (e.g., polyurethane elastomer).

More particularly, the track 22 comprises an endless body 36 underlying its inner side 45 and ground-engaging outer side 47. In view of its underlying nature, the body 36 will be referred to as a "carcass". The carcass 36 is elastomeric in that it comprises elastomeric material 38 which allows the carcass 36 to elastically change in shape and thus the track 22 to flex as it is in motion around the track-engaging assembly 21.

In this embodiment, the carcass 36 comprises a plurality of reinforcements embedded in its elastomeric material 38. These reinforcements can take on various forms.

For example, in this embodiment, the carcass 36 comprises a layer of reinforcing cables $37_1$-$37_M$ that are adjacent to one another and extend generally in the longitudinal direction of the track 22 to enhance strength in tension of the track 22 along its longitudinal direction. In this case, each of the reinforcing cables $37_1$-$37_M$ is a cord including a plurality of strands (e.g., textile fibers or metallic wires). In other cases, each of the reinforcing cables $37_1$-$37_M$ may be another type of cable and may be made of any material suitably flexible along the cable's longitudinal axis (e.g., fibers or wires of metal, plastic or composite material).

As another example, in this embodiment, the carcass 36 comprises a layer of reinforcing fabric 43. The reinforcing fabric 43 comprises thin pliable material made usually by weaving, felting, knitting, interlacing, or otherwise crossing natural or synthetic elongated fabric elements, such as fibers, filaments, strands and/or others, such that some elongated fabric elements extend transversally to the longitudinal direction of the track 22 to have a reinforcing effect in a transversal direction of the track 22. For instance, the reinforcing fabric 43 may comprise a ply of reinforcing woven fibers (e.g., nylon fibers or other synthetic fibers).

The carcass 36 may be molded into shape in a molding process during which the rubber 38 is cured. For example, in this embodiment, a mold may be used to consolidate layers of rubber providing the rubber 38 of the carcass 36, the reinforcing cables $37_1$-$37_M$ and the layer of reinforcing fabric 43.

The inner side 45 of the endless track 22 comprises an inner surface 55 of the carcass 36 and a plurality of wheel-contacting projections $48_1$-$48_N$ that project from the inner surface 55 and are positioned to contact at least some of the wheels $23_1$, $23_2$, 24, $26_1$, $26_2$, $28_1$-$28_4$ to do at least one of driving (i.e., imparting motion to) the track 22 and guiding the track 22. The wheel-contacting projections $48_1$-$48_N$ can be referred to as "wheel-contacting lugs". Furthermore, since each of them is used to do at least one of driving the track 22 and guiding the track 22, the wheel-contacting lugs $48_1$-$48_N$ can be referred to as "drive/guide projections" or "drive/guide lugs". In some examples of implementation, a drive/guide lug $48_i$ may interact with the drive wheel 24 to drive the track 22, in which case the drive/guide lug $48_i$ is a drive lug. In other examples of implementation, a drive/guide lug $48_i$ may interact with the front and rear idler wheels $23_1$, $23_2$, $26_1$, $26_2$ and/or the roller wheels $28_1$-$28_4$ to guide the track 22 to maintain proper track alignment and prevent de-tracking without being used to drive the track 22, in which case the drive/guide lug $48_i$ is a guide lug. In yet other examples of implementation, a drive/guide lug $48_i$ may both (i) interact with the drive wheel 24 to drive the track 22 and (ii) interact with the idler wheels $23_1$, $23_2$, $26_1$, $26_2$ and/or the roller wheels $28_1$-$28_4$ to guide the track 22 to maintain proper track alignment and prevent de-tracking, in which case the drive/guide lug $48_i$ is both a drive lug and a guide lug.

In this embodiment, the drive/guide lugs $48_1$-$48_N$ interact with the drive wheel 24 in order to cause the track 22 to be driven, and also interact with the idler wheels $23_1$, $23_2$, $26_1$, $26_2$ and the roller wheels $28_1$-$28_4$ in order to guide the track 22 as it is driven by the drive wheel 24 to maintain proper track alignment and prevent de-tracking. The drive/guide lugs $48_1$-$48_N$ are thus used to both drive the track 22 and guide the track 22 in this embodiment.

In this example of implementation, the drive/guide lugs $48_1$-$48_N$ are arranged in a single row disposed longitudinally along the inner side 45 of the track 22. The drive/guide lugs $48_1$-$48_N$ may be arranged in other manners in other examples of implementation (e.g., in a plurality of rows that are spaced apart along the widthwise direction of the track 22).

In this embodiment, each drive/guide lug $48_i$ is an elastomeric drive/guide lug in that it comprises elastomeric material 67. The elastomeric material 67 can be any polymeric material with suitable elasticity. More particularly, in this embodiment, the elastomeric material 67 includes rubber. Various rubber compounds may be used and, in some cases, different rubber compounds may be present in different areas of the drive/guide lug $48_i$. In other embodiments, the elastomeric material 67 may include another elastomer in addition to or instead of rubber (e.g., polyurethane elastomer). The drive/guide lugs $48_1$-$48_N$ may be provided on the inner side 45 in various ways. For example, in this embodiment, the drive/guide lugs $48_1$-$48_N$ are provided on the inner side 45 by being molded with the carcass 36.

The ground-engaging outer side 47 comprises a ground-engaging outer surface 31 of the carcass 36 and a tread pattern 40 to enhance traction on the ground. The tread pattern 40 comprises a plurality of traction projections $58_1$-$58_T$ projecting from the ground-engaging outer surface 31, spaced apart in the longitudinal direction of the endless track 22 and engaging the ground to enhance traction. The traction projections $58_1$-$58_T$ may be referred to as "tread projections" or "traction lugs".

The traction lugs $58_1$-$58_T$ may have any suitable shape. In this embodiment, each of the traction lugs $58_1$-$58_T$ has an elongated shape and is angled, i.e., defines an oblique angle θ (i.e., an angle that is not a right angle or a multiple of a right angle), relative to the longitudinal direction of the track 22. The traction lugs $58_1$-$58_T$ may have various other shapes in other examples (e.g., curved shapes, shapes with straight parts and curved parts, etc.).

Figure 8:
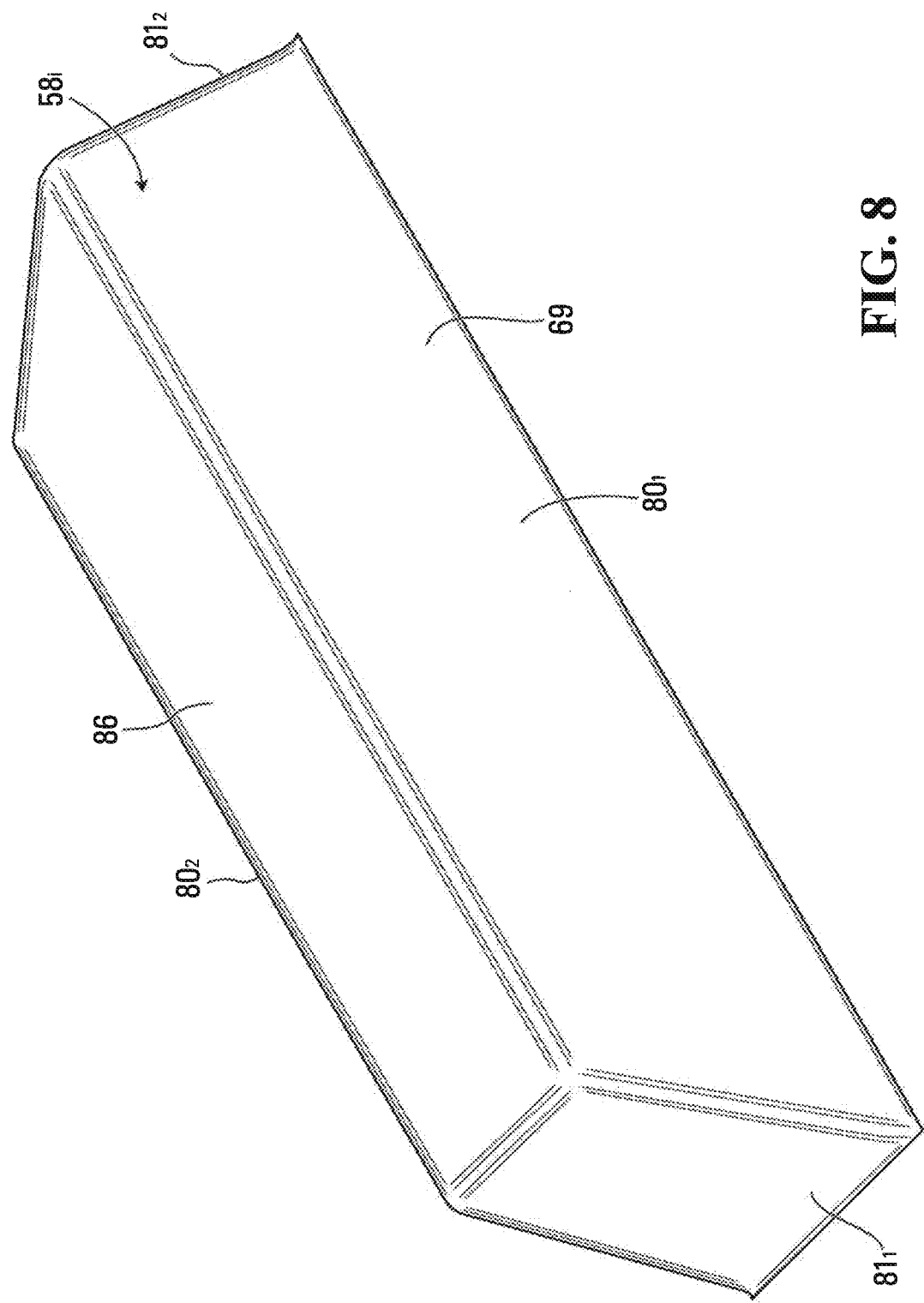
FIG. 8 shows a perspective view of a traction projection of the track.

As shown in FIG. 8, each traction lug $58_i$ has a periphery 69 which includes a front surface $80_1$, a rear surface $80_2$, two lateral surfaces $81_1$, $81_2$, and a top surface 86.

The front surface $80_1$ and the rear surface $80_2$ are opposed to one another in the longitudinal direction of the track 22. The two lateral faces $81_1$, $81_2$ are opposed to one another in the widthwise direction of the track 22. In this embodiment, the front surface $80_1$, the rear surface $80_2$, and the lateral surfaces $81_1$, $81_2$ are substantially straight. The periphery 69 of the traction lug $58_i$ may have any other shape in other embodiments (e.g., the front surface $80_1$, the rear surface $80_2$, and/or the lateral surfaces $81_1$, $81_2$ may be curved). The traction lug $58_i$ has a front-to-rear dimension $L_L$ in the longitudinal direction of the track 22, a side-to-side dimension $L_W$ in the widthwise direction of the track 22, and a height H in the thickness direction of the track 22.

In this embodiment, each traction lug $58_i$ is an elastomeric traction lug in that it comprises elastomeric material 41. The elastomeric material 41 can be any polymeric material with suitable elasticity. More particularly, in this embodiment, the elastomeric material 41 includes rubber. Various rubber compounds may be used and, in some cases, different rubber compounds may be present in different areas of the traction lug $58_i$. In other embodiments, the elastomeric material 41 may include another elastomer in addition to or instead of rubber (e.g., polyurethane elastomer). The traction lugs $58_1$-$58_T$ may be provided on the ground-engaging outer side 47 in various ways. For example, in this embodiment, the traction lugs $58_1$-$58_T$ are provided on the ground-engaging outer side 47 by being molded with the carcass 36.

The track 22 may be constructed in various other manners in other embodiments. For example, in some embodiments, the track 22 may have recesses or holes that interact with the drive wheel 24 in order to cause the track 22 to be driven (e.g., in which case the drive/guide lugs $48_1$-$48_N$ may be used only to guide the track 22 without being used to drive the track 22, i.e., they may be "guide lugs" only), and/or the ground-engaging outer side 47 of the track 22 may comprise various patterns of traction lugs.

The drive wheel 24 is rotatable by power derived from the prime mover 14 to drive the track 22. That is, power generated by the prime mover 14 and delivered over the powertrain 15 of the agricultural vehicle 10 can rotate a final drive axle $56_i$, which causes rotation of the drive wheel 24, which in turn imparts motion to the track 22.

Figure 9:
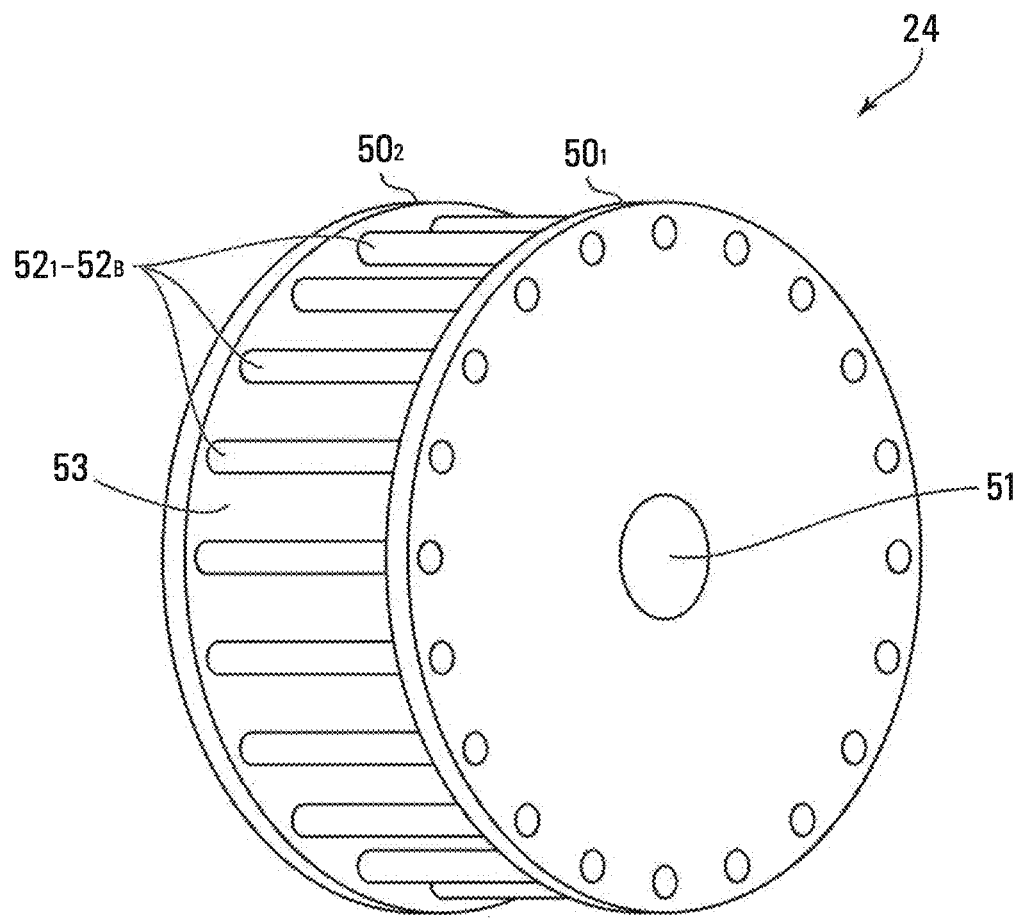
FIG. 9 shows a drive wheel of a track-engaging assembly of the track system.

With additional reference to FIG. 9, in this embodiment, the drive wheel 24 comprises a drive sprocket comprising a plurality of drive members $52_1$-$52_B$ spaced apart along a circular path to engage the drive/guide lugs $48_1$-$48_N$ of the track 22 in order to drive the track 22. The drive wheel 24 and the track 22 thus implement a "positive drive" arrangement. More particularly, in this embodiment, the drive wheel 24 comprises two side discs $50_1$, $50_2$ which are co-centric and turn about a common axle 51 and between which the drive members $52_1$-$52_B$ extend near respective peripheries of the side discs $50_1$, $50_2$. In this example, the drive members $52_1$-$52_B$ are thus drive bars that extend between the side discs $50_1$, $50_2$. The drive wheel 24 and the track 22 have respective dimensions allowing interlocking of the drive bars $52_1$-$52_B$ of the drive wheel 24 and the drive/guide lugs $48_1$-$48_N$ of the track 22. Adjacent ones of the drive bars $52_1$-$52_B$ define an interior space 53 between them to receive one of the drive/guide lugs $48_1$-$48_N$. Adjacent ones of the drive/guide lugs $48_1$-$48_N$ define an inter-lug space 39 between them to receive one of the drive bars $52_1$-$52_B$. The drive/guide lugs $48_1$-$48_N$ and the drive bars $52_1$-$52_B$ have a regular spacing that allows interlocking of the drive/guide lugs $48_1$-$48_N$ and the drive bars $52_1$-$52_B$ over a certain length of the drive wheel's circumference.

The drive wheel 24 may be configured in various other ways in other embodiments. For example, in other embodiments, the drive wheel 24 may not have any side discs such as the side discs $50_1$, $50_2$. As another example, in other embodiments, instead of being drive bars, the drive members $52_1$-$52_B$ may be drive teeth that are distributed circumferentially along the drive wheel 24 or any other type of drive members. As another example, in embodiments where the track 22 comprises recesses or holes, the drive wheel 24 may have teeth that enter these recesses or holes in order to drive the track 22. As yet another example, in some embodiments, the drive wheel 24 may frictionally engage the inner side 45 of the track 22 in order to frictionally drive the track 22 (i.e., the drive wheel 24 and the track 22 may implement a "friction drive" arrangement).

Figure 10:
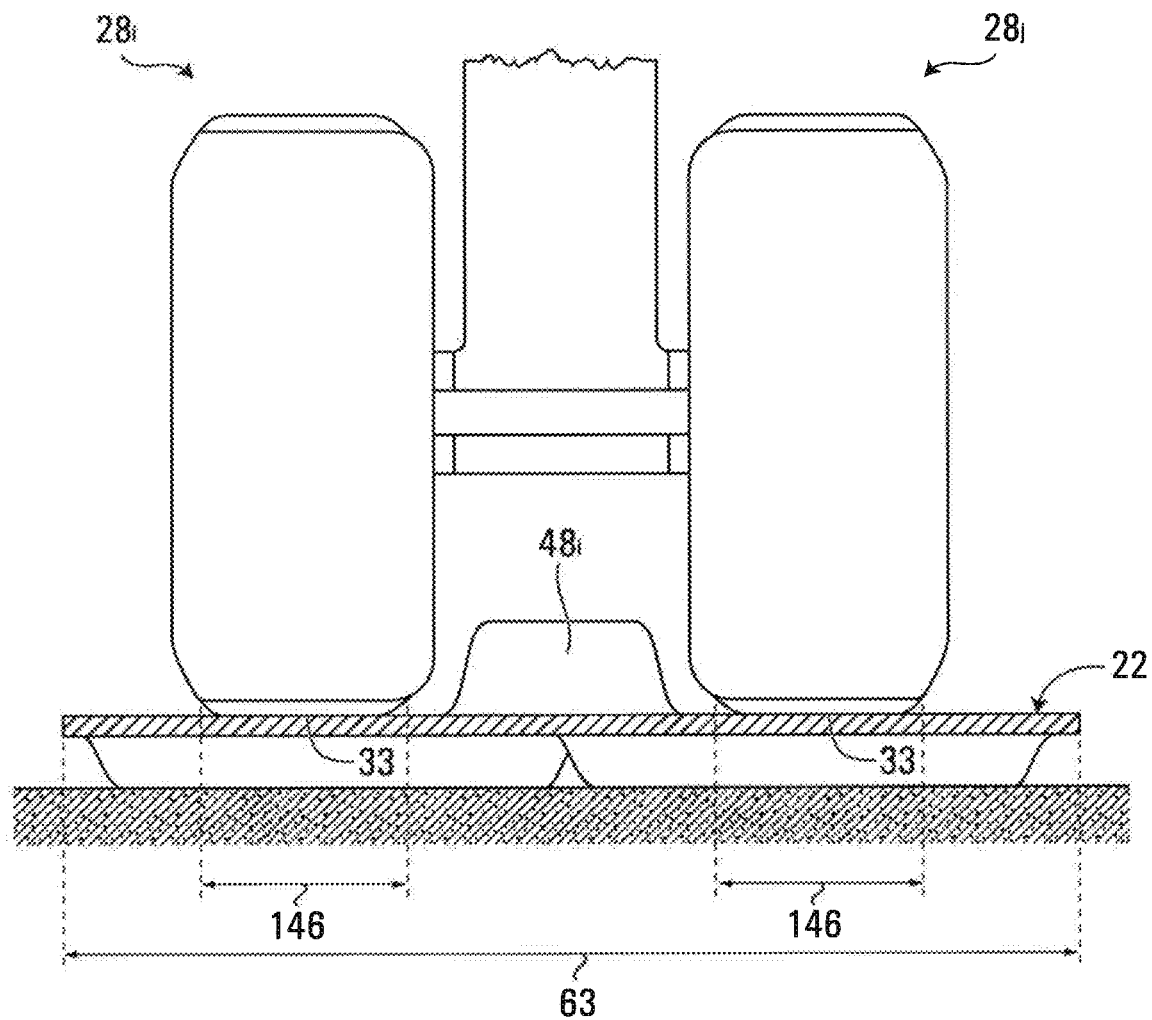
FIG. 10 shows mid-rollers of the track-engaging assembly engaging an inner side the track.
Figure 11:
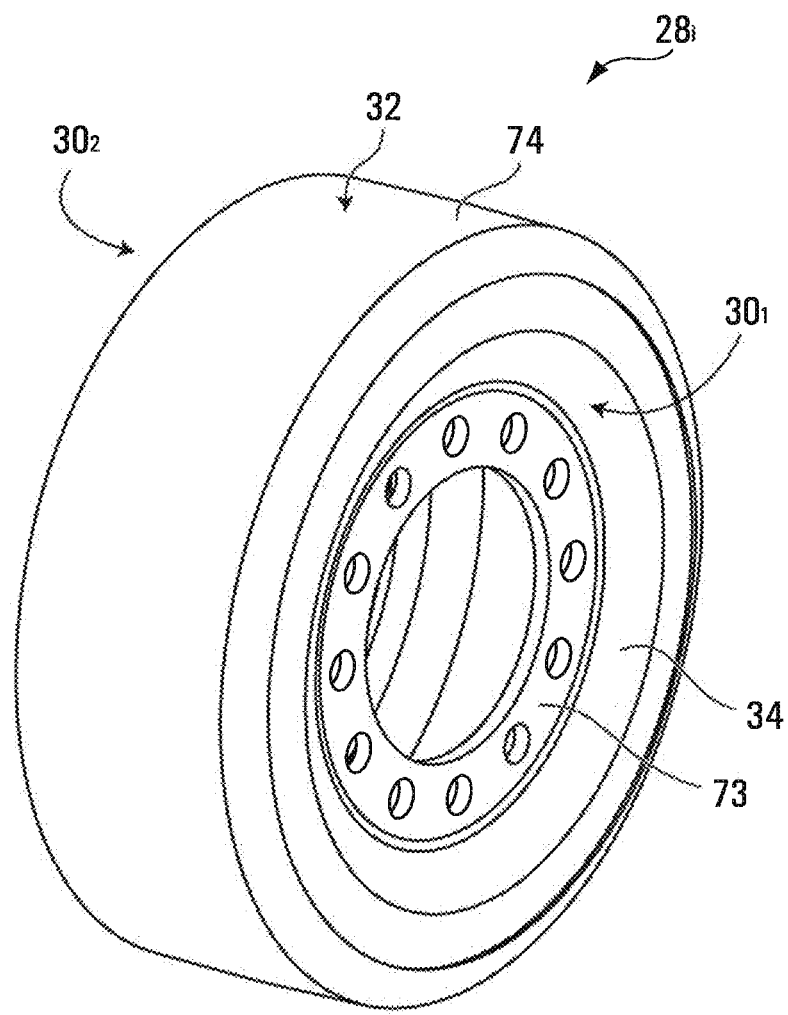
FIGS. 11 and 12 show perspective views of an idler wheel, and more particularly of a mid-roller, of the track-engaging assembly.
Figure 12:
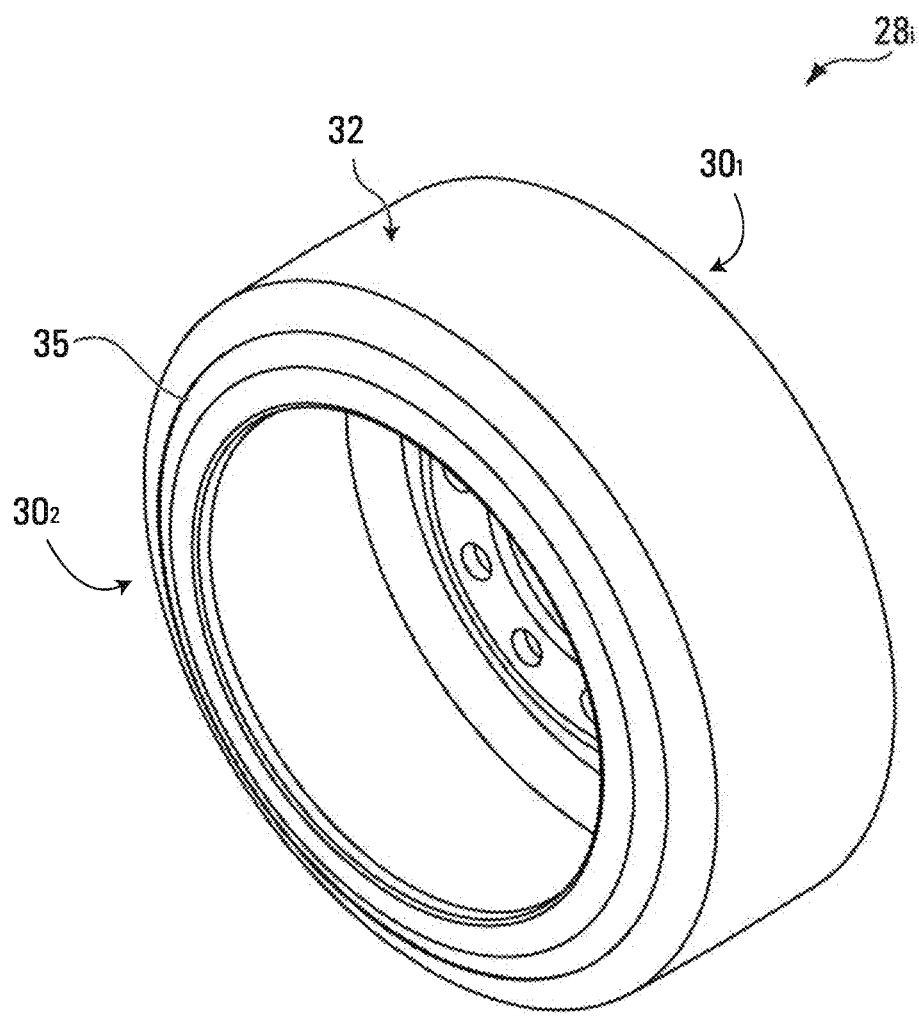
Figure 13:
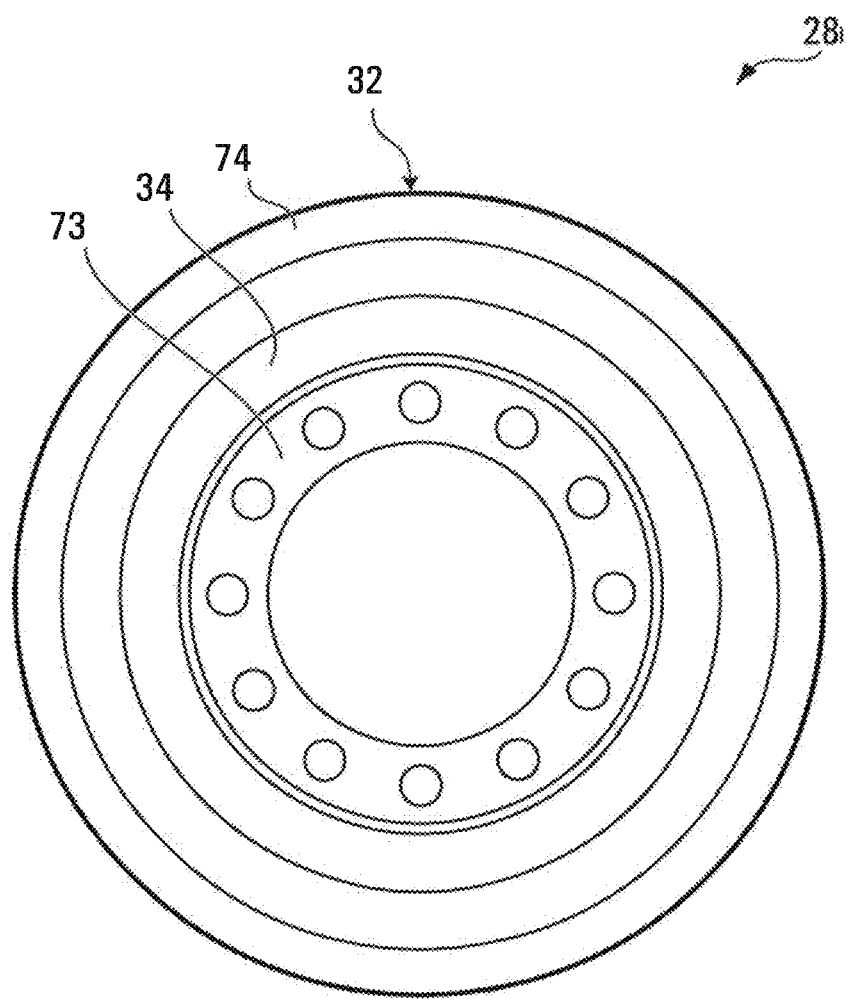
FIGS. 13 and 14 show a front view and a side view of the mid-roller.
Figure 14:
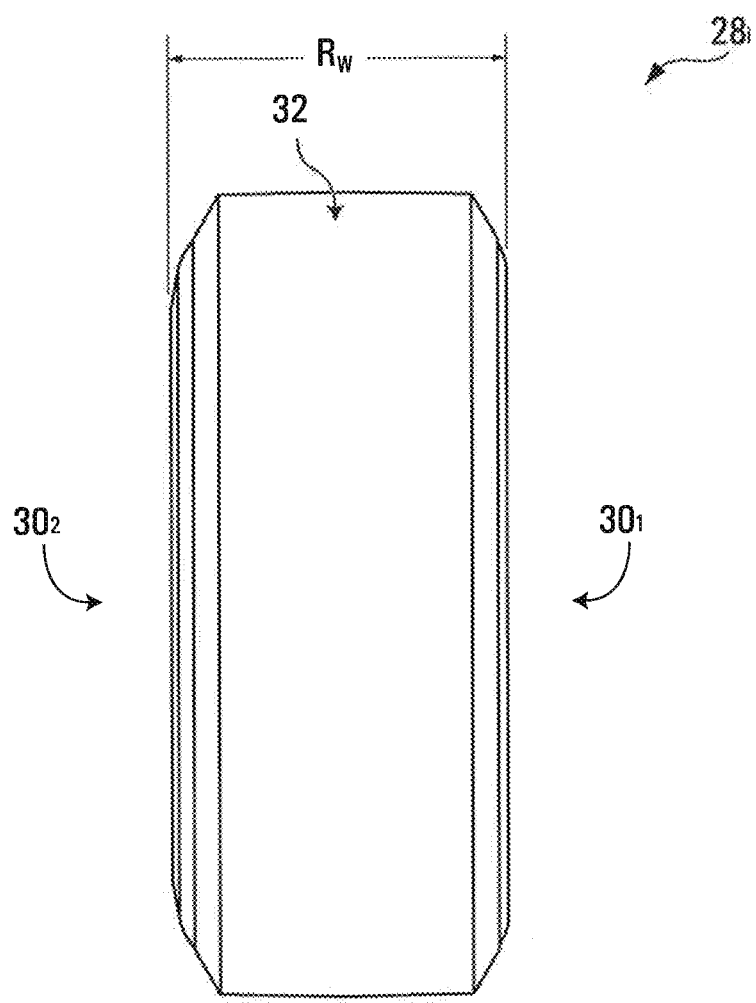
Figure 15:
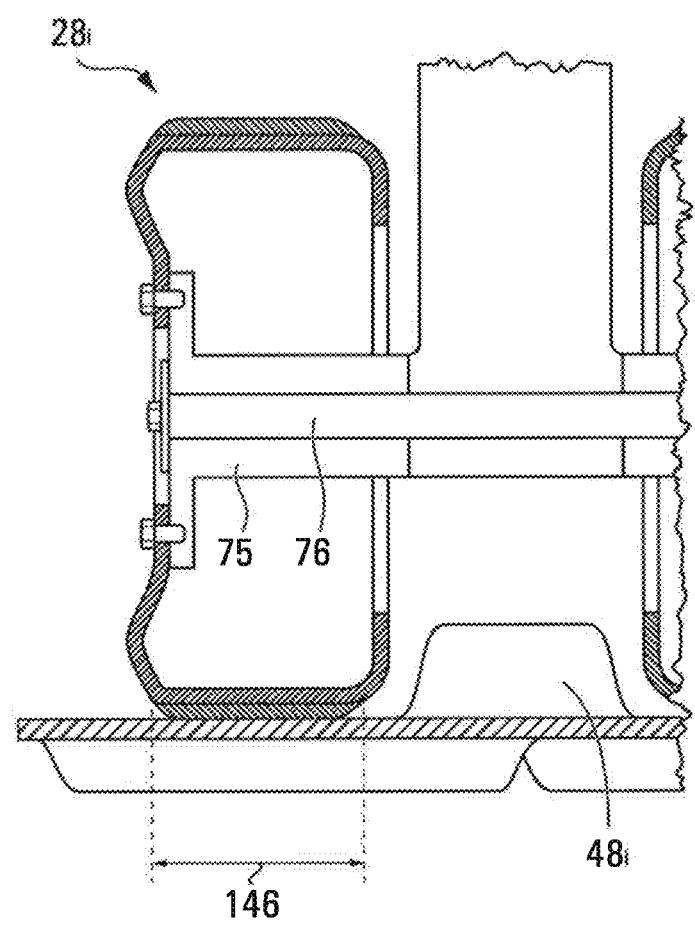
FIG. 15 shows the idler wheel mounted on its axle via a hub.

The idler wheels $23_1$, $23_2$, $26_1$, $26_2$, $28_1$-$28_4$ are not driven by power supplied by the prime mover 14, but are rather used to do at least one of supporting part of the weight of the agricultural vehicle 10 on the ground via the track 22, guiding the track 22 as it is driven by the drive wheel 24, and tensioning the track 22. More particularly, in this embodiment, the front and rear idler wheels $23_1$, $23_2$, $26_1$, $26_2$ maintain the track 22 in tension and help to support part of the weight of the agricultural vehicle 10 on the ground via the track 22. As shown in FIG. 10, the roller wheels $28_1$-$28_4$ roll on a rolling path 33 of the inner side 45 of the track 22 along the bottom run 66 of the track 22 to apply the bottom run 66 on the ground. In this case, as they are located between frontmost and rearmost ones of the wheels of the track system $16_i$, the roller wheels $28_1$-$28_4$ can be referred to as "mid-rollers".

With additional reference to FIGS. 11 to 15, each mid-roller $28_i$ comprises a hub portion 73, a rim portion 74, and a radially-extending portion 34 between the hub portion 73 and the rim portion 74. The hub portion 73 is an inner portion of the mid-roller $28_i$ which is associated with a hub 75 receiving an axle 76 for the mid-roller $28_i$. The rim portion 74 is an outer portion of the mid-roller $28_i$ which contacts the inner side 45 of the endless track 22. The radially-extending portion 34 is an intermediate portion of the mid-roller $28_i$ which extends radially between the hub portion 73 and the rim portion 74.

The mid-roller $28_i$ comprises a pair of lateral sides $30_1$, $30_2$ opposite one another and a peripheral side 32 between the lateral sides $30_1$, $30_2$. The peripheral side 32 rolls on the inner side 45 of the track 22 to apply the bottom run 66 of track 22 on the ground. More particularly, in this embodiment, the mid-roller $28_i$ rolls on the rolling path 33 which is delimited by some of the drive/guide lugs $48_1$-$48_N$ such that, as the mid-roller $28_i$ rolls, these drive/guide lugs pass next to the mid-roller $28_i$.

In this embodiment, the mid-roller $28_i$ may engage a significant extent of the width W of the track 22. For example, in some embodiments, a ratio of a width $R_w$ of the mid-roller $28_i$ over the width W of the track 22 may be at least 0.2, in some cases at least 0.3, in some cases at least 0.4, and in some cases even more.

Figure 16:
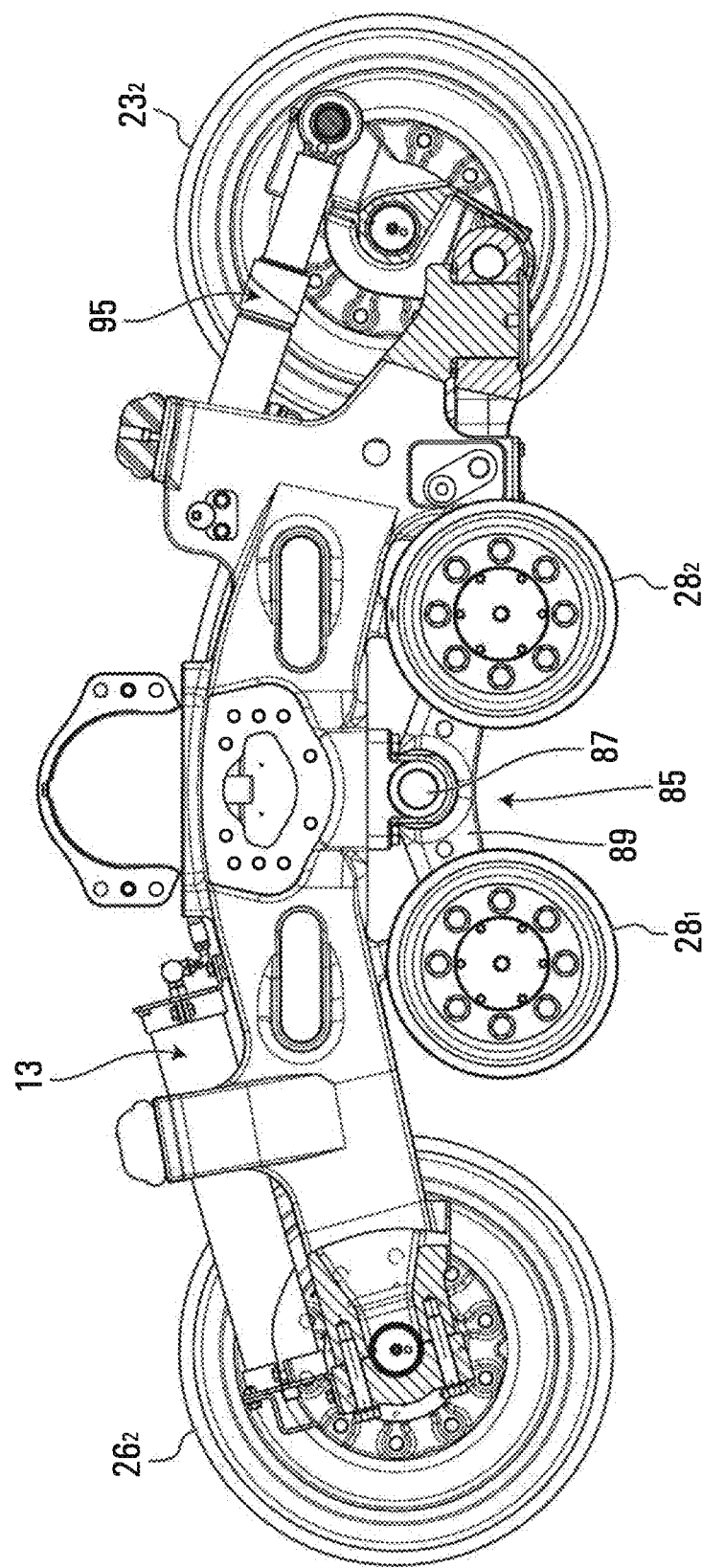
FIG. 16 shows a partial cross-sectional side view of a lower portion of the track system, including a bogie for mounting the mid-rollers.
Figure 17:
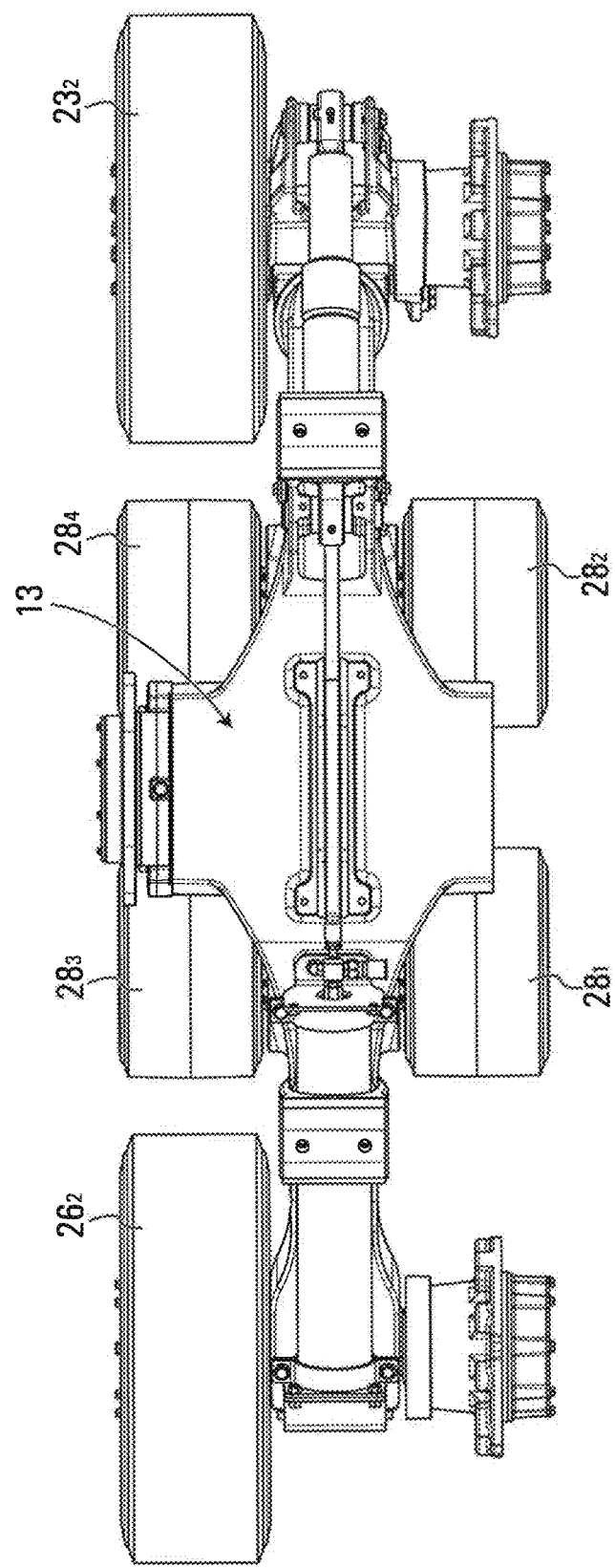
FIG. 17 shows a top view of the lower portion of the track system with two idler wheels being omitted to show a hub of the idler wheels.

In addition, in this embodiment, as shown in FIGS. 16 and 17, the track system $16_i$ comprises a wheel-mounting sub-assembly 85 which may be referred to as a "bogie".

The bogie 85 is configured to carry the mid-rollers $28_1$-$28_4$ and is mounted to the frame 13 of the track system $16_i$. More specifically, the bogie 85 comprises a link 89 to which are mounted the mid-rollers $28_1$-$28_4$. The bogie 85 is pivotable relative to the frame 13 of the track system $16_i$ about a pivot 87 defining an axis of rotation 88 that is perpendicular to the longitudinal axis 61 of the track system $16_i$. The bogie 85 thus imparts the mid-rollers $28_1$-$28_4$ with a pivoting motion capability which may be referred to as a "pitch" motion. The mid-rollers $28_1$-$28_4$ may not be mounted to a bogie in other embodiments. For example, the mid-rollers $28_1$-$28_4$ may be mounted directly to the frame 13 of the track system $16_i$ in other embodiments.

Moreover, as shown in FIG. 16, the track system $16_i$ may comprise a tensioning mechanism 95 for tensioning the track 22. For instance, in this embodiment, the tensioning mechanism 95 comprises an actuator mounted at one end to the frame 13 of the track system $16_i$ and at another end to a hub of the front idler wheels $23_1$, $23_2$. This allows the tensioning mechanism 95 to modify a distance between the front idler wheels $23_1$, $23_2$ and the rear idler wheels $26_1$, $26_2$ in the longitudinal direction of the track system $16_i$.

Figure 19:
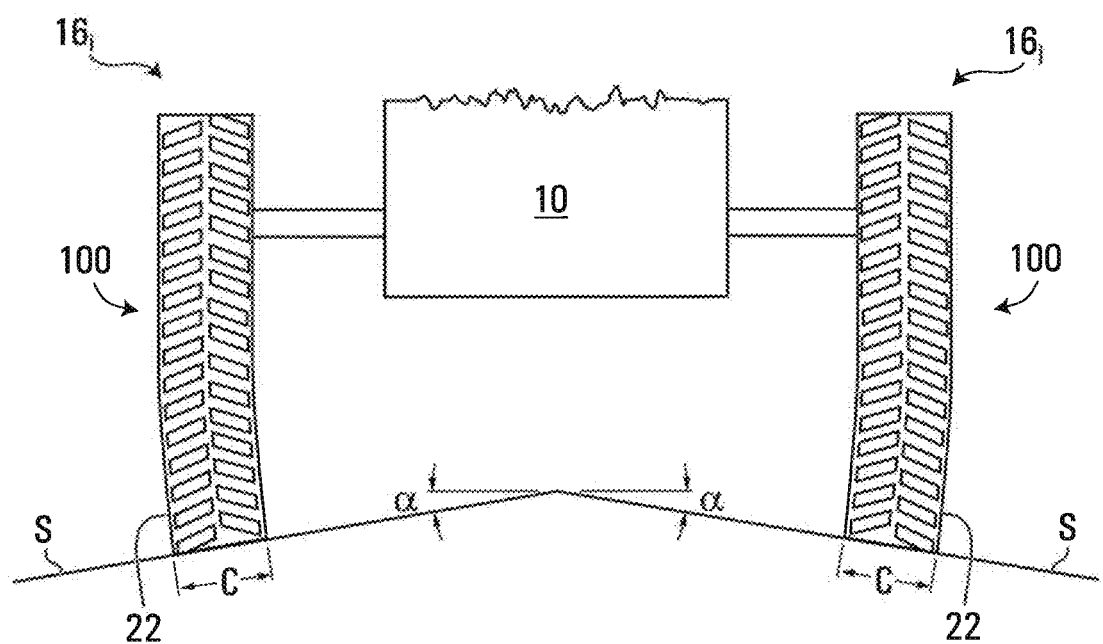
FIG. 19 shows the track system provided herein implementing a lateral load distribution mechanism for evenly distributing a load along a widthwise direction of the track while the agricultural vehicle is travelling on the crowned road.

With additional reference to FIG. 19, in this embodiment, each track system $16_i$ is designed to better perform when the agricultural vehicle 10 is roading, i.e., travelling on a road 115, such as between agricultural fields, notably by reducing or minimizing deteriorative effects on its track 22 (e.g., "blowout" of the traction projections $58_1$-$58_T$ of the track 22, deterioration of the carcass 36 of the track 22, etc.) as the vehicle 10 travels fast against a hard surface S (e.g., asphalt, concrete, gravel, or other pavement) of the road 115, thereby making the vehicle 10 more efficient and productive.

This capability of the track system $16_i$ to better perform on the road 115 may be particularly useful in situations such as this example in which the road's surface S has a cross slope for leading water away from the road 115 (i.e., to avoid water accumulation on the road 115). In this case, the cross slope of the road's surface S is such that the road 115 has a crown 117, i.e., a highest point, at a center of the road 115 in its widthwise direction and slopes downwardly on either side of the crown 117. For instance, in some cases, an angle α defined between a horizontal axis and the road's surface S on either side of the crown 117 may be at least 1°, in some cases at least 2°, in some cases at least 4°, and in some cases even higher (e.g., at least 6° or 8°. The angle α may have any other value in other cases. In view of its crown 117, the road 115 may sometimes be referred to as a "crowned road".

Figure 18:
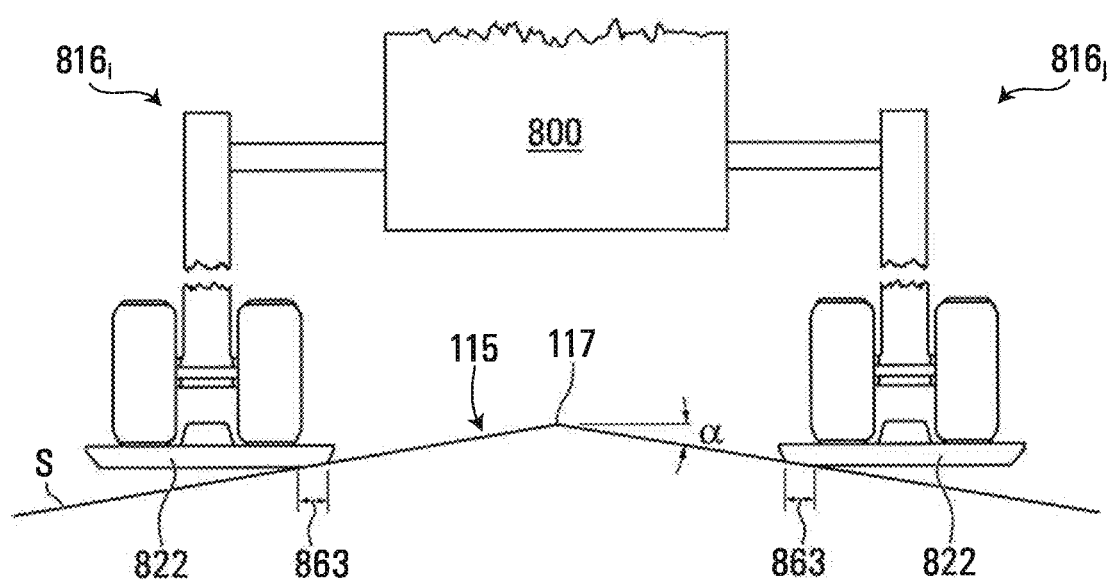
FIG. 18 shows an example of an agricultural vehicle equipped with typical track systems travelling on a crowned road.

In this embodiment, the track system $16_i$ may be configured to accommodate a shape of the road 115, including its crown 117 in this example, so as to better distribute loading on its track 22 than a conventional track system. For example, with additional reference to FIG. 18, an agricultural vehicle 800 equipped with conventional track systems $816_1$-$816_4$ may perform poorly while travelling on the crowned road 115. Notably, a track 822 of a track system $816_i$ may have a lateral extent of its contact patch 863 with the crowned road 115 that is significantly reduced. This can adversely affect traction of the track 822 on the road 115, but, more importantly, generates significant loads on the track 822 that result in severe stress regions which can accelerate wear and deterioration of the track 822 and lead to premature failure of the track 822. This problem may be amplified when the agricultural vehicle 800 is roading at elevated speeds.

The track system $16_i$ may have various features to better perform when the agricultural vehicle 10 is travelling on the road 115. Examples of these "enhanced-roading features" are discussed below.

1. Lateral Load Distribution Mechanism

In some embodiments, with additional reference to FIG. 19, the track system $16_i$ may comprise a lateral load distribution mechanism 100 configured to increase a lateral extent C of the contact patch 63 of the track 22 when the agricultural vehicle 10 travels on the crowned road 11. This may reduce peak loads experienced by the track 22 and thus help to reduce potential for rapid wear or other deterioration of the track 22 as the vehicle 10 travels on the road's hard surface S, particularly at high speed.

In this embodiment, the lateral load distribution mechanism 100 is configured to apply the idler wheels $23_1$, $23_2$, $28_1$, $26_2$, $28_1$-$28_4$ onto the bottom run 66 of the track 22 such as to increase the lateral extent C of the contact patch 63 of the track 22 when the agricultural vehicle 10 is travelling on the road's surface S which has the cross slope in a direction normal to a direction of travel of the agricultural vehicle 10. For example, in some embodiments, the lateral load distribution mechanism 100 may be configured to apply laterally-adjacent ones of the idler wheels $23_1$, $23_2$, $28_1$, $26_2$, $28_1$-$28_4$ onto the bottom run 66 of the track 22 to increase the lateral extent C of the contact patch 63 of the track 22. The laterally-adjacent ones of the idler wheels $23_1$, $23_2$, $26_1$, $26_2$, $28_1$-$28_4$ are respective ones of these wheels that are generally aligned with respect to one another or otherwise closest to one another in the longitudinal direction of the track system $16_i$ (e.g., the front idler wheels $23_1$, $23_2$, and/or the rear idler wheels $26_1$, $26_2$, and/or the mid-rollers $28_1$, $28_3$, and/or the mid-rollers $28_2$, $28_4$).

The lateral load distribution mechanism 100 may be configured such that bottom track-contacting areas 146 of laterally-adjacent ones of the idler wheels $23_1$, $23_2$, $26_1$, $26_2$, $28_1$-$28_4$ are vertically movable relative to one another (i.e., movable relative to one another in the height direction of the track system $16_i$). The bottom track-contacting area 146 of a given one of the idler wheels $23_1$, $23_2$, $26_1$, $26_2$, $28_1$-$28_4$ is that area of the given one of the idler wheels $23_1$, $23_2$, $26_1$, $26_2$, $28_1$-$28_4$ which contacts the bottom run 65 of the track 22.

For instance, in this embodiment, the lateral load distribution mechanism 100 may increase the lateral extent C of the contact patch 63 of the track 22 when the agricultural vehicle 10 travels on the crowned road 115 such that a ratio of the lateral extent C of the contact patch 63 of the track 22 over the width W of the track 22 is at least 0.3, in some cases at least 0.4, in some cases at least 0.5, in some cases at least 0.6, and in some cases even more (e.g., at least 0.8). In some cases, the lateral load distribution mechanism 100 may cause the lateral extent C of the contact patch 63 to correspond to an entirety of the width W of the track 22.

As a result of the increased lateral extent C of the contact patch 63 of the track 22 provided by the lateral load distribution mechanism 100, a peak load exerted on the track 22 on the road 115 may be reduced. For instance, in some embodiments, a ratio of the peak load exerted on the track 22 over a load on the track system $16_i$ on the road 115 (i.e., calculated by dividing the weight of the vehicle 10 by the number of track systems $16_1$-$16_4$) may be no more than a certain value. [. For example, in some embodiments, the peak load exerted on the track 22 on the road 115 may be no more than a certain value.

The lateral load distribution mechanism 100 may be implemented in various ways, certain examples of which will be described below.

1.1 Idler Wheel Roll Motion

In some embodiments, the lateral load distribution mechanism 100 may allow a "roll" motion of respective ones of the front and rear idler wheels $23_1$, $23_2$, $26_1$, $26_2$ and/or the mid-rollers $28_1$-$28_4$. That is, the lateral load distribution mechanism 100 may be configured to allow a motion of respective ones of the front and rear idler wheels $23_1$, $23_2$, $26_1$, $26_2$ and/or the mid-rollers $28_1$-$28_4$ relative to the frame 12 of the agricultural vehicle 10 that includes a rotation about a roll axis 164 which is transverse to their axes of rotation, in this case, parallel to the longitudinal axis 61 of the track system $16_i$.

For example, in some embodiments, the roll motion enabled by the lateral load distribution mechanism 100 may be implemented by the bogie 85. More specifically, the bogie 85 may be movable relative to the frame 12 of the vehicle 10 to cause the front and rear idler wheels $23_1$, $23_2$, $26_1$, $26_2$ and/or the mid-rollers $28_1$-$28_4$ to rotate about the roll axis 164 as they engage the bottom run 66 of the track 22 when the agricultural vehicle 10 travels on the crowned road 115.

Figure 31:
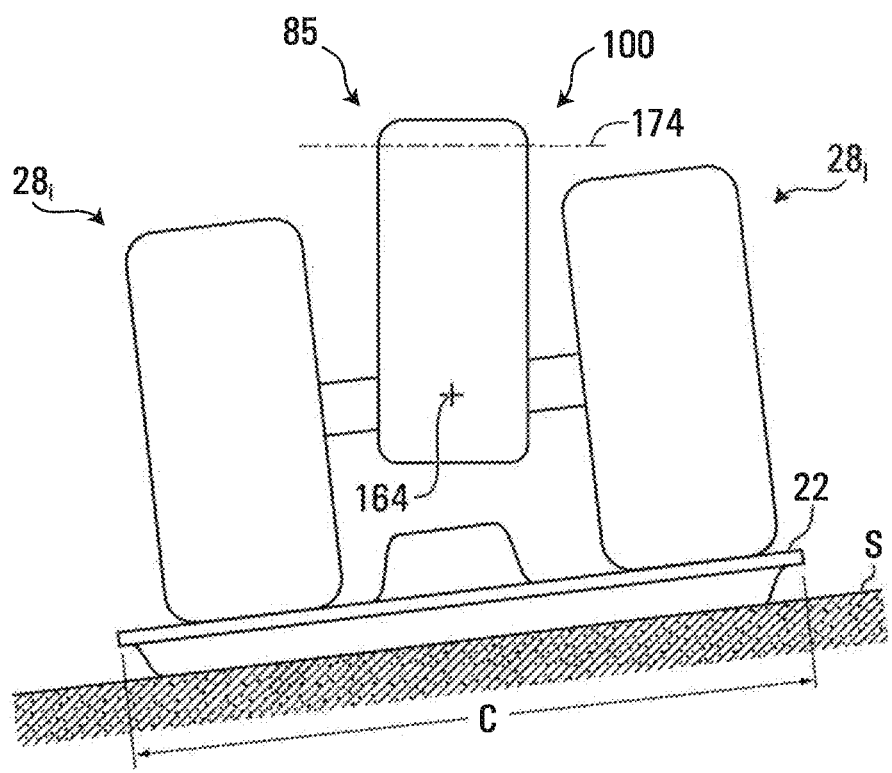
FIG. 31 shows an example of an embodiment of the lateral load distribution mechanism in which the bogie of the track system has a pitch and roll motion capability to cause the mid-rollers to engage the track evenly along the widthwise direction of the track while the agricultural vehicle travels over the crowned road.

More particularly, in some embodiments, as shown in FIG. 31, the bogie 85 is configured to define the roll motion and a "pitch" motion of respective ones of the mid-rollers $28_1$-$28_4$. That is, the bogie 85 can define a rotation about the roll axis 164 parallel to the longitudinal axis 61 of the track system $16_i$ and about a pitch axis 174 parallel to the widthwise direction of the track system $16_i$.

Figure 32:
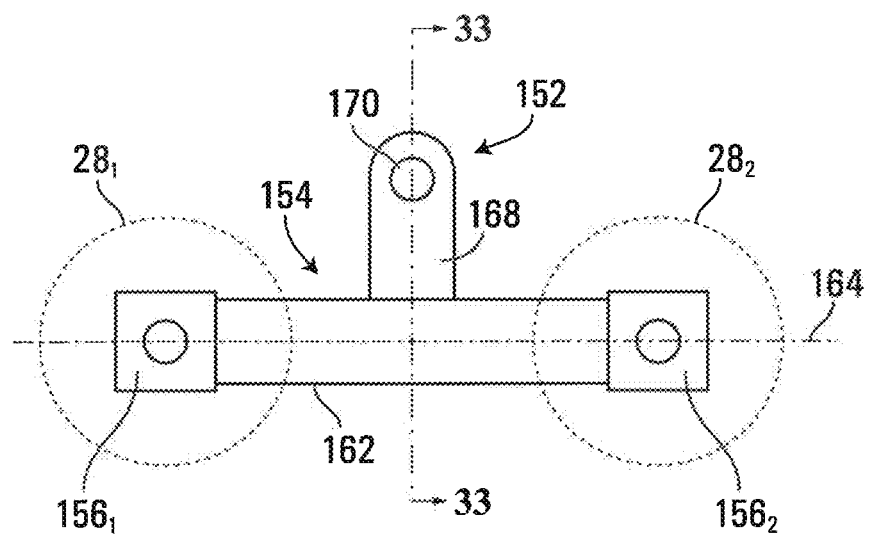
FIG. 32 shows the bogie of FIG. 31 including an upper and lower frame of the bogie.
Figure 33:
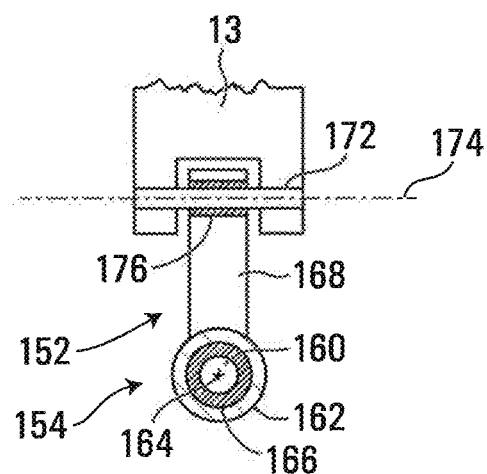
FIG. 33 shows a cross-sectional view of the bogie taken along line 33-33 as shown in FIG. 32.

As shown in FIGS. 32 and 33, in this embodiment, the bogie 85 comprises an upper structure 152 and a lower structure 154 connected to the upper structure 154. The lower structure 154 is configured to provide the bogie 85 with its roll motion capability. The lower structure 154 comprises a pair of axle-retaining members $156_1$, $156_2$ spaced apart in the longitudinal direction of the track system $16_i$, and a roll motion mechanism 158 connecting the axle-retaining members $156_1$, $156_2$ to one another. The axle-retaining members $156_1$, $156_2$ are configured to receive the axles 76 of the mid-rollers $28_1$-$28_4$ (e.g., via a hole traversing each axle-retaining member $156_i$). Each axle 76 receives two laterally adjacent mid-rollers $28_i$, $28_j$ thereon.

The roll motion mechanism 158 comprises a shaft 160 and an outer tube 162 receiving the shaft 160 therein. The shaft 160 extends in the longitudinal direction of the track system 16i and is connectable to the axle-retaining members $156_1$, $156_2$. For example, the shaft 160 may be connected to the axle-retaining members $156_1$, $156_2$ via an interference fit. In other embodiments, the shaft 160 may be connected to the axle-retaining members $156_1$, $156_2$ in any other suitable way (e.g., via welding, fasteners, etc.). The outer tube 162 is mounted to the shaft 160 and extends between the axle-retaining members $156_1$, $156_2$. The shaft 160 is rotatable within the outer tube 162 about an axis of rotation of the outer tube 162 which corresponds to the roll axis 164. In this embodiment, the shaft 160 rotates within the outer tube 162 via a bearing 166 (e.g., a roller bearing) disposed between a peripheral surface of the shaft 160 and an inner surface of the outer tube 162. The shaft 160 may rotate within the outer tube 162 via any other suitable mechanism in other embodiments.

The upper structure 152 of the bogie 85 is configured to provide the bogie 85 with its pitch motion capability. The upper structure 152 comprises a body 168 affixed to the lower structure 154 (e.g., via welding). The body 168 comprises a shaft-receiving aperture 170 for receiving therein a shaft 172. The shaft 172 is rotatable within the shaft-receiving aperture 170 about an axis of rotation that corresponds to the pitch axis 174. For example, the shaft-receiving aperture 170 may comprise a bearing 176 (e.g., a roller bearing) for enabling rotation of the shaft 172 within the shaft-receiving aperture 170. As shown in FIG. 33, the shaft 170 is connected at its longitudinal end portions to the frame 13 of the track system $16_i$ which supports the bogie 85.

Thus, in this embodiment, the lateral load distribution mechanism 100 allows the bogie 85 to define the roll motion and the pitch motion about the roll and pitch axes 164, 174 respectively. Therefore, when the agricultural vehicle 10 travels on the crowned road 115, the bogie 85 allows the mid-rollers $28_1$-$28_4$ to pivot about the roll axis 164 causing the mid-rollers $28_1$-$28_4$ to apply the bottom run 66 of the track 22 more evenly on the hard surface S of the crowned road 115.

The roll motion of respective ones of the front and rear idler wheels $23_1$, $23_2$, $26_1$, $26_2$ and/or the mid-rollers $28_1$-$28_4$ may be implemented by the lateral load distribution mechanism 100 in any other suitable way in other embodiments.

1.2 Adaptable Idler Wheel Suspension

In some embodiments, the lateral load distribution mechanism 100 may implement an adaptable suspension of respective ones of the idler wheels $23_1$, $23_2$, $26_1$, $26_2$, $28_1$-$28_4$. For instance, the lateral load distribution mechanism 100 may cause a suspension of the front and rear idler wheels $23_1$, $23_2$, $26_1$, $26_2$ and/or a suspension of the mid-rollers $28_1$-$28_4$ to increase the lateral extent C of the contact patch 63 of the track 22 when the agricultural vehicle 10 travels on the crowned road 115.

Figure 20:
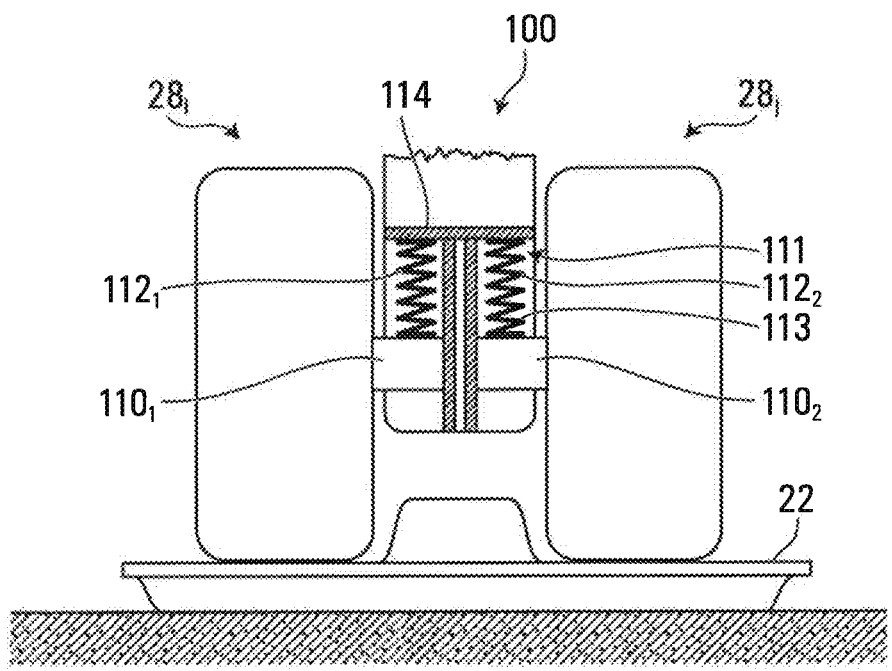
FIGS. 20 and 21 show an example of an embodiment of the lateral load distribution mechanism in which a suspension of the idler wheels is adapted to cause the idler wheels to engage the track evenly along the widthwise direction of the track while the agricultural vehicle travels over the crowned road.

For example, in some embodiments, as shown in FIG. 20, the lateral load distribution mechanism 100 may comprise a suspension of laterally-adjacent mid-rollers $28_i$, $28_j$ which comprises axles $110_1$, $110_2$ that are moveable with respect to one another and about which the mid-rollers $28_i$, $28_j$ are rotatable. For example, each axle $110_i$ may be received within the hub 75 (shown in FIG. 15) which rotates relative to the axle $110_i$ about an axis of rotation 116. The suspension of the lateral load distribution mechanism 100 thus effectively implements an independent suspension for the laterally-adjacent mid-rollers $28_i$, $28_j$ that allows them to move independently from one another in the height direction of the track system.

In this example, the suspension of the lateral load distribution mechanism 100 also comprises a resilient member 111 mounted between the axles $110_1$, $110_2$, and a frame 114. The resilient member 111 is configured to change in configuration from a first configuration to a second configuration in response to a load and recover the first configuration in response to removal of the load in order to allow relative movement of the axles $110_1$, $110_2$. In this embodiment, the resilient member 111 comprises a pair of resilient elements $112_1$, $112_2$. Each resilient element $112_i$ is mounted at one end to the axle $110_i$ and at another end to the frame 114 in order to allow the axle $110_i$ to move relative to the frame 114 in the height direction of the track system $16_i$. The resilient member $112_i$ comprises a spring 113. The spring 113 may be a coil spring, a torsion spring, a leaf spring, an elastomeric spring (e.g., a rubber spring), a fluid spring (e.g., an air spring), or any other object that is operable to change in configuration from a first configuration to a second configuration in response to a load and recover the first configuration in response to removal of the load.

Figure 22:
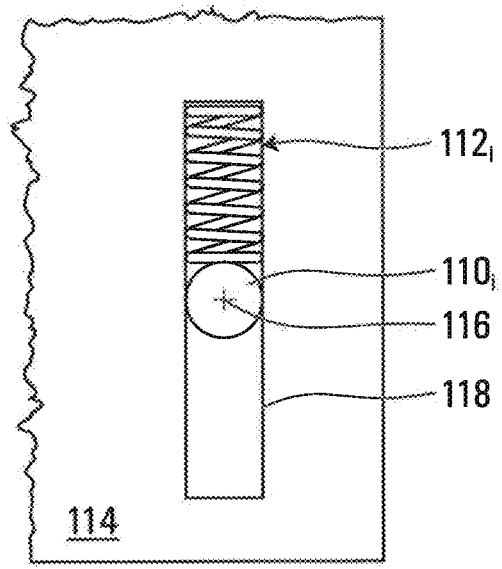
FIGS. 22 and 23 respectively show a side view of the suspension of the idler wheels if FIGS. 20 and 21.
Figure 23:
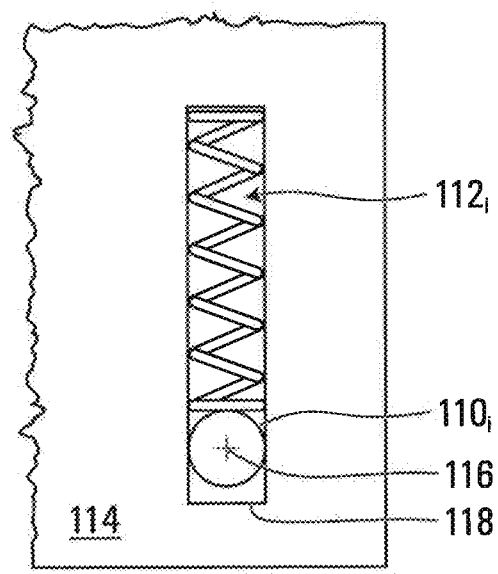

As shown in FIGS. 22 and 23, the frame 114 is configured to support the axle 110, and to bound its motion. For instance, in this embodiment, the frame 114 comprises a slot 118 generally extending in the height direction of the track system $16_i$ and along which the axle $110_i$ is movable. In this embodiment, the frame 114 is a part of the bogie 85. In other embodiments, the frame 114 may be part of the frame 13 of the track system $16_i$.

Thus, each resilient element $112_i$ exerts a downward force on a corresponding axle $110_i$ to cause the corresponding mid-roller $28_i$ to apply the bottom run 66 of the track 22 onto the ground. Moreover, motion of the axle $110_i$ is limited both in the height direction and in the longitudinal direction of the track system $16_i$ by the frame 114.

Figure 21:
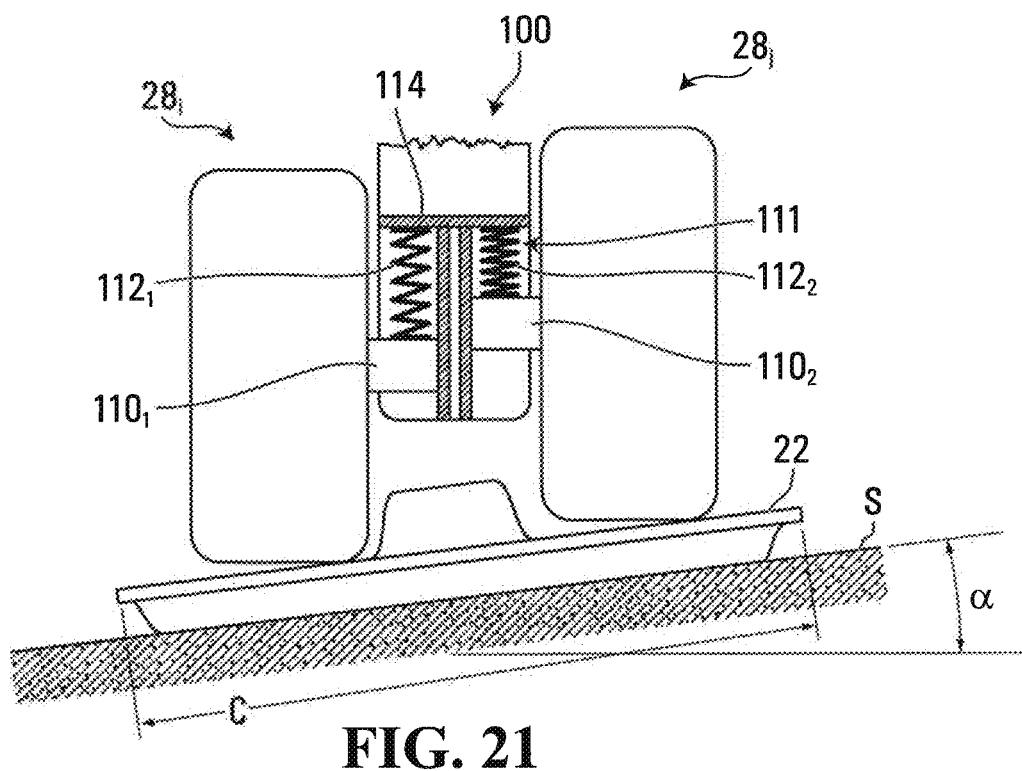

Therefore, when the agricultural vehicle 10 travels on the crowned road 115, as illustrated in FIG. 21, the lateral load distribution system 100 causes the mid-roller $28_i$ that is at a lowest section of the road to be moved lower in the height direction of the track system $16_i$ while the other mid-roller $28_j$ that is at a highest section of the road is moved higher in the height direction of the track system $16_i$. This may help to more evenly apply the bottom run 66 of the track 22 onto the hard surface S of the crowned road 115 such as to increase the lateral extent C of the contact patch 63 of the track 22.

Although the lateral load distribution mechanism 100 has been described in respect of laterally-adjacent mid-rollers $28_i$, $28_j$, a similar system may be applied to other laterally-adjacent idler wheels such as the front idler wheels $23_1$, $23_2$ and the rear idler wheels $26_1$, $26_2$. For example, the front idler wheels $23_1$, $23_2$ may rotate about separate axles that are adaptably supported by the frame 13 of the track system $16_i$ such that 2 height of each separate axle is varied when the agricultural vehicle 10 travels on the crowned road 115.

The suspension of respective ones of the idler wheels $23_1$, $23_2$, $26_1$, $26_2$, $28_1$-$28_4$ may be implemented by the lateral load distribution mechanism 100 in any other suitable way in other embodiments.

1.3 Articulated Idler Wheel Ale

In some embodiments, the lateral load distribution mechanism 100 may implement an articulated axle of one or more of the idler wheels $23_1$, $23_2$, $26_1$, $26_2$, $28_1$-$28_4$ that causes the front and rear idler wheels $23_1$, $23_2$, $26_1$, $26_2$ and/or the mid-rollers $28_1$-$28_4$ to engage the track 22 in order to increase the lateral extent C of the contact patch 63 of the track 22 when the agricultural vehicle 10 travels on the crowned road's surface S.

For example, in some embodiments, as shown in FIGS. 24 to 27, the lateral load distribution mechanism 100 may comprise articulated axles $119_1$, $119_2$ for laterally-adjacent mid-rollers $28_i$, $28_j$. Each articulated axle $119_x$ comprises an articulation $124_x$ between sections $121_1$, $121_2$ of the articulated axle $119_i$ to allow the sections $121_1$, $121_2$ of the articulated axle $119_x$ to move relative to one another to accommodate the crowned road's surface S.

In this embodiment, the articulated axles $119_1$, $119_2$ are part of a common axle 120. The outboard section $121_1$ of each articulated axle $119_x$ comprises a spindle 122 leading to the mid-rollers $28_x$ while the inboard section $121_2$ of the articulated axle $119_x$ comprises a central portion 123 of the common axle 120. The articulation $124_x$ constitutes a joint between the spindle 122 and the central portion 123 of the common axle 120. In other embodiments, the articulated axles $119_1$. $119_2$ may be separate from one another (i.e., not part of any common axle).

More particularly, in this embodiment, the common axle 120 comprises a shaft extending along a longitudinal axis 125 (generally parallel to the widthwise direction of the track system $16_i$) and mounted to a frame 126. In this example, the frame 126 is part of the bogie 85. However, in other examples, the frame 126 may be a part of the frame 13 of the track system 16$_i$. The central portion 123 of the common axle 120 comprises a first connecting portion 128 at each end portion of the central portion 123. In this embodiment, the first connecting portion 128 comprises a forked connector including two prongs extending along the longitudinal axis 125.

The spindle 122 of each articulated axle 119$_x$ is configured for mounting a respective mid-roller 28$_i$ and comprises a shaft extending along a longitudinal axis 127 of the spindle 122. For example, the mid-roller 28$_i$ may be mounted to the spindle 122 via the hub 75 as previously described and illustrated in FIG. 15. The spindle 122 comprises a second connecting portion 130 at a longitudinal end thereof. The second connecting 130 of the spindle 122 is complimentary to the first connecting portion 128 of the central portion 123 of the common axle 120. For example, in this embodiment, the second connecting portion 130 comprises a single-pronged connector extending in a longitudinal direction of the spindle 122.

The articulation 124, allows the spindle 122 to move relative to the central portion 123 of the common axle 120 such that the longitudinal axis 127 of the spindle 122 is movable relative to the longitudinal axis 125 of the common axle 120. More specifically, the articulation 124$_x$ defines an axis of rotation 132 about which the spindle 122 is rotatable. The axis of rotation 132 of the articulation 124$_x$ is defined by a rotation member 134 which rotatably connects the first and second connecting portions 128, 130 to one another. In this embodiment, the rotation member 134 comprises a dowel pin which may be secured to the first and second connecting portions 128, 130 in any suitable way (e.g., via cotter pins).

In this embodiment, the articulation 124$_x$ further comprises a resilient element 136 for biasing the spindle 122 to rotate about the axis of rotation 132 in a particular direction. More specifically, the resilient element 136 urges the spindle 122 to rotate downwardly (i.e., towards the bottom run 66 of the track 22). The resilient element 136 comprises a spring 137. In this embodiment, the spring 137 comprises a torsion spring. The spring 137 may be a coil spring, a leaf spring, an elastomeric spring (e.g., a rubber spring), a fluid spring (e.g., an air spring), or any other object that is operable to change in configuration from a first configuration to a second configuration in response to a load and recover the first configuration in response to removal of the load in other embodiments.

In some embodiments, the resilient element 136 may be omitted as the weight of the mid-roller 28$_i$ may be sufficient to cause the spindle 122$_i$ to rotate downwardly.

Figure 24:
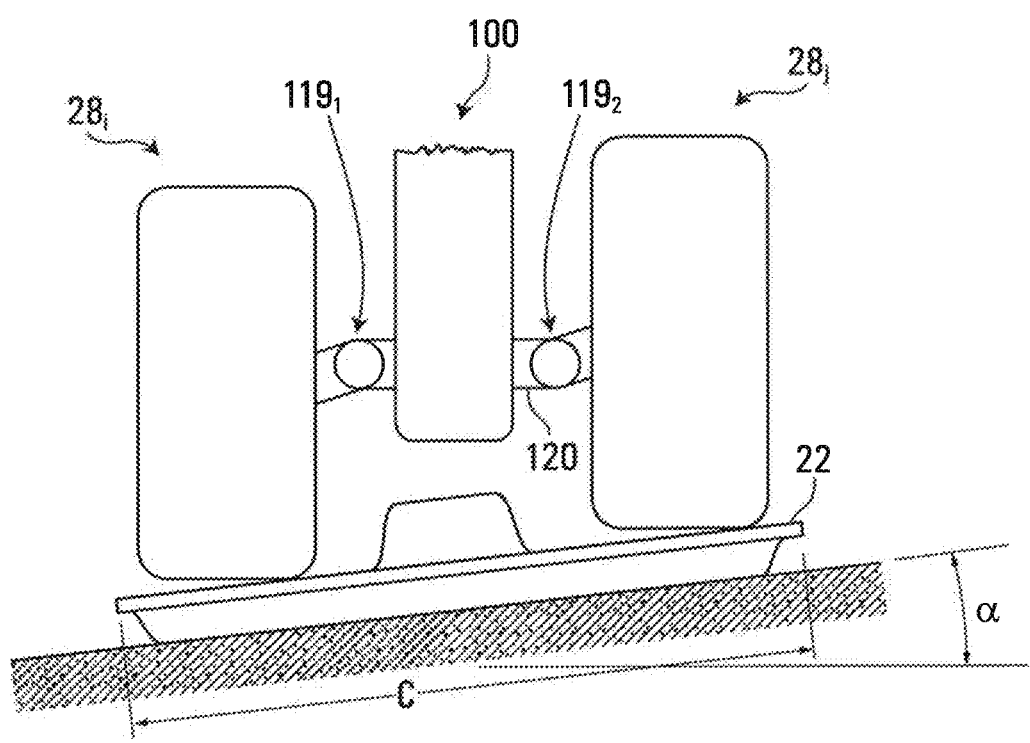
FIG. 24 shows an example of an embodiment of the lateral load distribution mechanism in which an axle of the idler wheels is articulated to cause a rotation of a respective idler wheel about an articulation of the axle.
Figure 25:
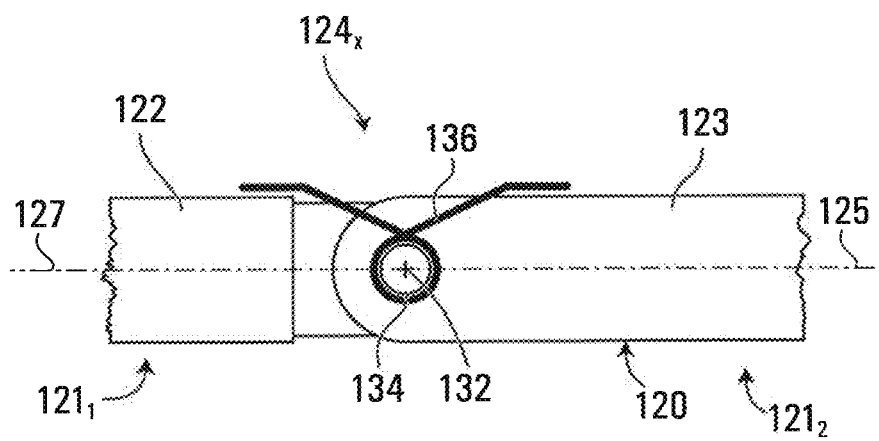
FIG. 25 shows a side view of the articulation of the axle in a first configuration.
Figure 26:
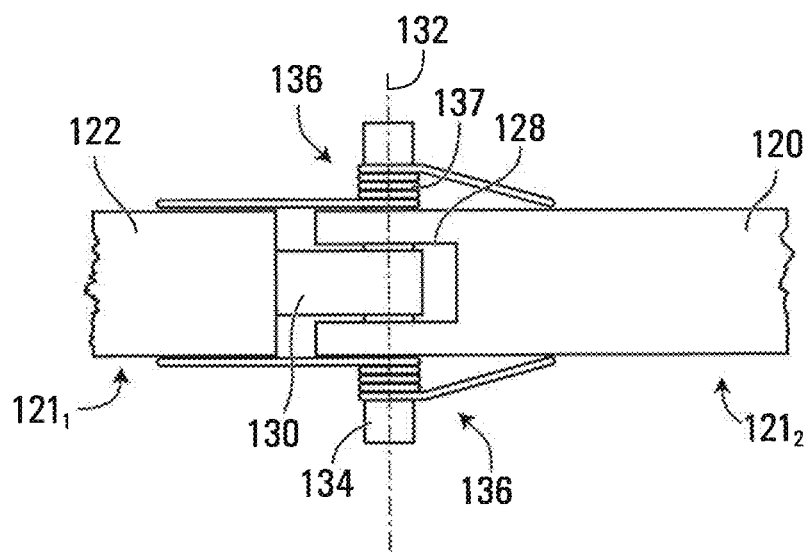
FIG. 26 shows a top view of the articulation of FIG. 25.
Figure 27:
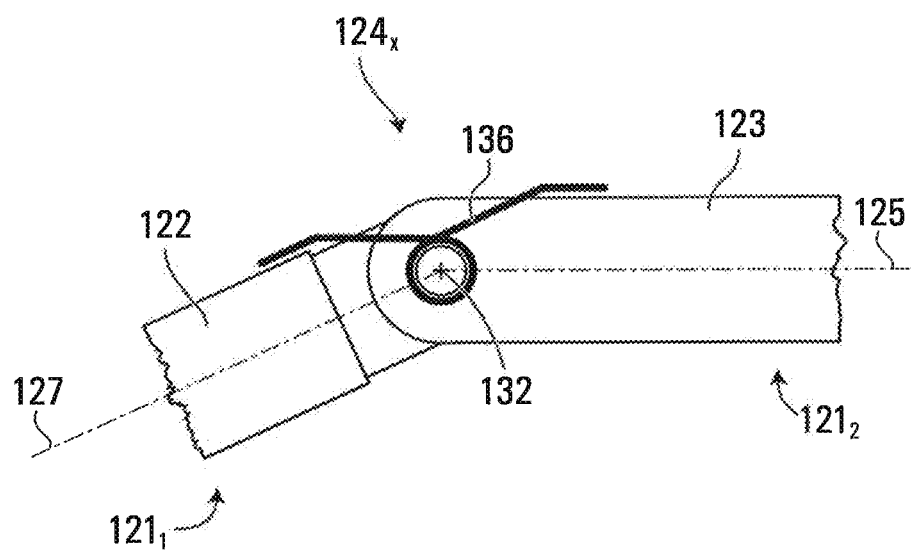
FIG. 27 shows a side view of the articulation of the axle in a second configuration.

In use, as shown in FIGS. 24 and 27, when the agricultural vehicle 10 travels on the crowned road 115, the lateral load distribution mechanism 100 causes the spindle 122 that is at a lowest section of the road 115 to be rotated downwardly (i.e., towards the bottom run 66 of the track 22) and the spindle 122 that is at a highest section of the road 115 to be rotated upwardly (i.e., towards the upper run 65 of the track 22). As a result, the mid-roller 28 that is at the lowest section of the road 115 is moved lower in the height direction of the track system 16$_i$ while the other mid-roller 28$_j$ that is at the highest section of the road 115 is moved higher in the height direction of the track system 16$_i$. This may more evenly apply the bottom run 66 of the track 22 onto the hard surface S of the crowned road 115 such as to increase the lateral extent C of the contact patch 63 of the track 22.

Although the lateral load distribution mechanism 100 has been described in respect of laterally adjacent mid-rollers 28$_i$, 28$_j$, a similar system may be applied to other laterally-adjacent idler wheels such as the front idler wheels 23$_1$, 23$_2$ and the rear idler wheels 26$_1$, 26$_2$.

The articulated axles of respective ones of the idler wheels 23$_1$, 23$_2$, 26$_1$, 26$_2$, 28$_1$-28$_4$ may be implemented by the lateral load distribution mechanism 100 in any other suitable way in other embodiments (e.g., a spherical joint, a universal joint, etc.).

1.4 Deformable Idler Wheels

Figure 28:
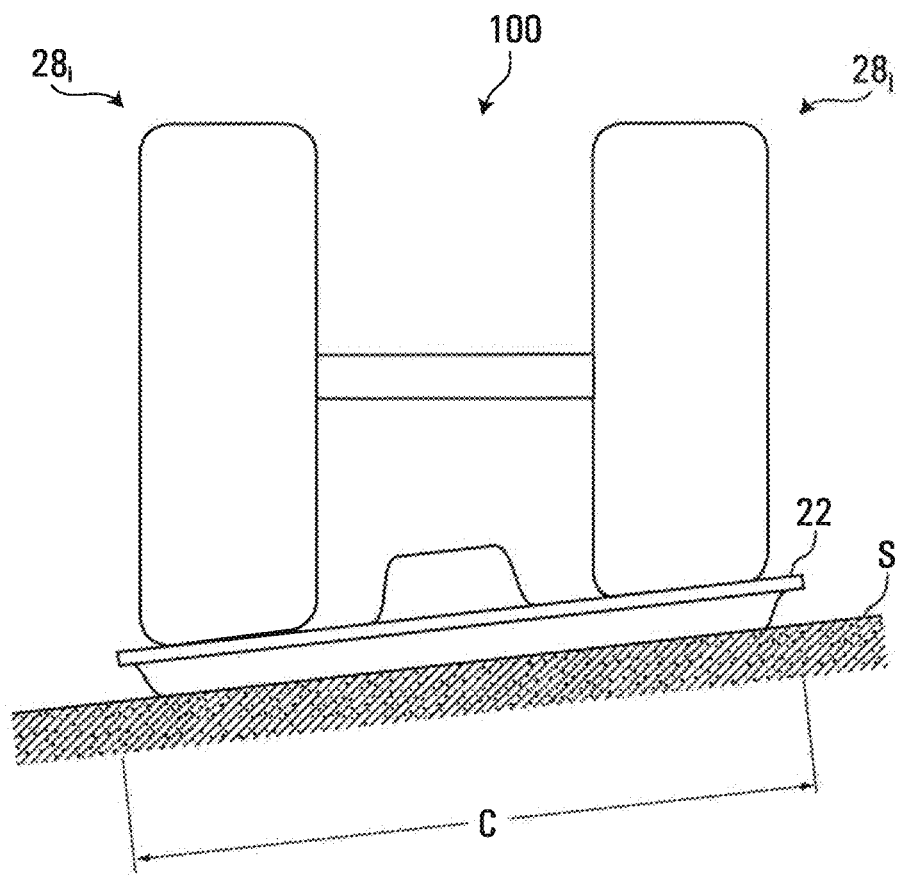
FIG. 28 shows an example of an embodiment of the lateral load distribution mechanism in which the idler wheels are deformable to cause the idler wheels to engage the track evenly along the widthwise direction of the track while the agricultural vehicle travels over the crowned road.

In some embodiments, the lateral load distribution mechanism 100 may be implemented by deformation (i.e., change in configuration) of one or more of the idler wheels 23$_1$, 23$_2$, 26$_1$, 26$_2$, 28$_1$-28$_4$. For instance, as shown in FIG. 28, the lateral load distribution system 100 may allow deformation of the front and rear idler wheels 23$_1$, 23$_2$, 26$_1$, 26$_2$ and/or the mid-rollers 28$_1$-28$_4$ to engage the track 22 to minimize a decrease in the lateral extent C of the contact patch 63 of the track 22 when the agricultural vehicle 10 travels over the crowned road surface S.

More particularly, the lateral load distribution mechanism 100 may allow the front and rear idler wheels 23$_1$, 23$_2$, 26$_1$, 26$_2$ and/or the mid-rollers 28$_1$-28$_4$ to deform from a first configuration to a second configuration to cause the bottom run 66 of the track 22 to be applied onto the ground when the agricultural vehicle 10 travels over the crowned road surface S.

Figure 29:
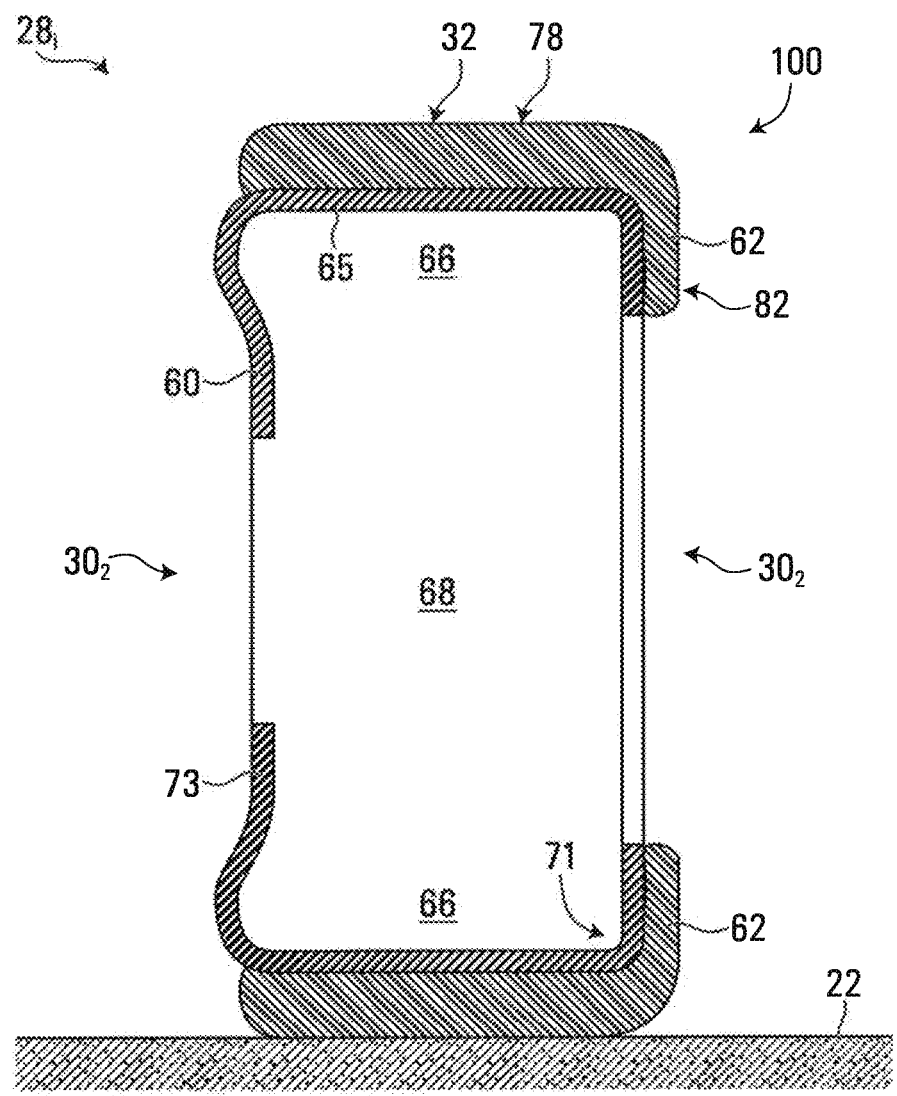
FIG. 29 shows the idler wheel of FIG. 28 in a first configuration when the agricultural vehicle travels over a flat horizontal surface.

For example, in some embodiments, as shown in FIG. 29, each mid-roller 28$_i$ may comprise a wheel body 60 and a covering 62 (e.g., a tire) disposed over the wheel body 60.

The wheel body 60 is a core of the mid-roller 28$_1$ that imparts structural integrity to the mid-roller 28$_i$. The wheel body 60 has a pair of lateral sides opposite one another and a peripheral side 77 between the lateral sides. In this case, the lateral sides of the wheel body 60 form part of the lateral sides 30$_1$, 30$_2$ of the mid-roller 28$_i$, while the peripheral side 65 of the wheel body 60 is covered by the covering 62. The wheel body 60 defines an internal space 68 delimited by internal surfaces of the wheel body 60. The internal space 68 includes an internal circumferential channel 66 which is defined by a shoulder 71 of the wheel body 60. Moreover, the wheel body 60 comprises an opening 72 that is accessible from the internal space 68 of the wheel body 60 and grants access to the deformable member 64.

In this case, the hub 75 is removably mounted to the wheel body 60. More particularly, in this case, a hub portion of the wheel body 60, corresponding to the hub portion 73 of the mid-roller 28$_i$, comprises a plurality of openings in which are received a plurality of fasteners that interconnect the wheel body 60 to the hub 75. The hub portion of the wheel body 60 may be configured in various other ways in other embodiments (e.g., the hub 75 may be integrally formed (e.g., cast) with or permanently affixed (e.g., welded) to the hub portion of the wheel body 60).

The wheel body 60 is made of at least one material, referred to as "wheel body material". That is, the wheel body 60 comprises one or more wheel body materials making up the wheel body 60. In some cases, the wheel body 60 may comprise a single wheel body material making up an entirety of the wheel body 60. In other cases, the wheel body 60 may comprise two or more wheel body materials that make up different parts of the wheel body 60.

In this embodiment, the wheel body 60 is a metallic wheel body. The wheel body 60 is metallic in that it is at least mainly (i.e., it is mostly or entirely) made of a metallic material. The metallic material is selected to provide strength and rigidity to the mid-roller 28$_i$. For example, in this case, the metallic material comprises steel. In other cases, the metallic material may comprise another metal instead of steel. In other embodiments, the wheel body 60 may be at least mainly made of another type of material (e.g., composite material, polymeric material, or ceramic material). Also, in other embodiments, different parts of the wheel body 60 may be made of two or more wheel body materials (e.g., two types of steel).

The covering 62 contacts the inner side 45 of the endless track 22 as the mid-roller $28_i$ rolls on the inner side 45 of the track 22. In this embodiment, the covering 62 forms at least part of the peripheral side 32 and at least part of at least one of the lateral sides $30_1$, $30_2$ of the mid-roller $28_i$. More particularly, in this embodiment, the covering 62 comprises a peripheral portion 78 that forms the peripheral side 32 of the mid-roller $28_i$ and a lateral portion 82 that forms part of the lateral side $30_2$ of the mid-roller $28_i$ which faces a drive/guide lug $48_i$.

The covering 62 covers at least part of the wheel body 60 of the mid-roller $28_i$. In this embodiment, the covering 62 covers the peripheral side 77 of the wheel body 60 and part of a lateral side of the wheel body 60. Notably, the covering 62 covers at least part, in this case all, of an external surface of the shoulder 76 of the wheel body 60.

The covering 62 is made of at least one material, referred to as a "covering material". That is, the covering 62 comprises one or more covering materials making up the covering 62. In some cases, the covering 62 may comprise a single covering material making up an entirety of the covering 62. In other cases, the covering 62 may comprise two or more covering materials that make up different parts of the covering 62.

The covering material of the covering 62 is different from a wheel body material of the wheel body 60. That is, the covering material and the wheel body material may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; an abrasion resistance of the covering material may be different from (e.g., greater than) an abrasion resistance of the wheel body material; a coefficient of friction of the covering material with the track 22 may be different from (e.g., less than) a coefficient of friction of the wheel body material with the track 22; etc.

In this embodiment, the modulus of elasticity of the covering material of the wheel covering 62 is substantially lower than a modulus of elasticity of the elastomeric material of the track 22. For instance, a ratio of the modulus of elasticity of the covering material over the modulus of elasticity of the elastomeric material of the track 22 may be at most 0.6, in some cases at most 0.5, in some cases at most 0.4, in some cases at most 0.3, and in some cases even less.

As shown in FIG. 29, when the agricultural vehicle 10 travels over a substantially flat terrain, the mid-roller $28_i$ assumes its first configuration in which the peripheral portion 78 of the covering 62 is substantially parallel to the peripheral side 77 of the wheel body 60.

Figure 30:
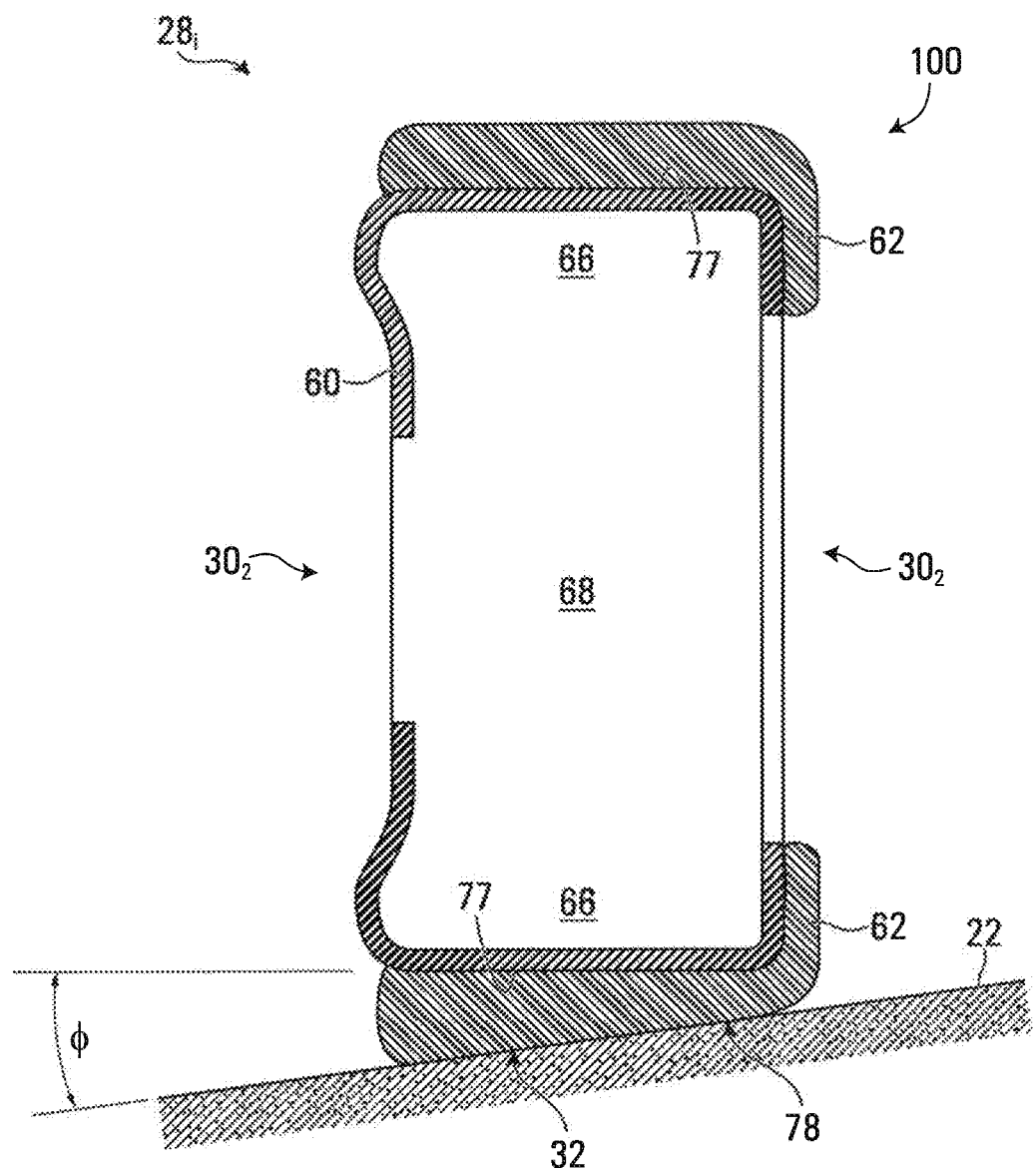
FIG. 30 shows the idler wheel of FIG. 28 in a second configuration when the agricultural vehicle travels over the crowned road.

As shown in FIG. 30, when the agricultural vehicle 10 travels over the crowned road surface S, the mid-roller $28_i$ assumes its second configuration. More specifically, the covering 62 of the mid-roller $28_i$ deforms such that a lower portion of its peripheral portion 78 is transverse (i.e., non-parallel) to the peripheral side 77 of the wheel body 60. Thus, the peripheral portion 78 of the covering 62 defines an angle φ between an outer surface of its peripheral portion 78 and an outer surface of the peripheral side 77 of the wheel body 60. For instance, the angle φ may be at least 1°, in some cases at least 2°, in some cases at least 3°, in some cases at least 4°, in some cases at least 5°, and in some cases even greater (e.g., 6°). For example, in some cases, the angle φ may be equal to the angle α defined by the sloped surface S of the crowned road 115.

Thus, in use, when the agricultural vehicle 10 travels over the crowned road 115, the covering 62 of the mid-roller $28_i$ elastically deforms such that the lower portion of the peripheral portion 78 (i.e., the portion in contact with the bottom run 66 of the track 22) defines the angle φ relative to the peripheral side 77 of the wheel body 60. This may minimize a reduction in the lateral extent C of the contact patch 63 of the track 22 that would otherwise occur if the lateral load distribution mechanism 100 were not implemented.

Although the lateral load distribution mechanism 100 has been described in respect of laterally adjacent mid-rollers $28_i$, $28_j$, a similar system may be applied to other laterally adjacent idler wheels such as the front idler wheels $23_1$, $23_2$ and the rear idler wheels $26_1$, $26_2$.

The deformation of one or more of the idler wheels $23_1$, $23_2$, $26_1$, $26_2$, $28_1$-$28_4$ allowed by the lateral load distribution mechanism 100 may be implemented in any other suitable way in other embodiments (e.g., the covering 62 may comprise a "balloon" tire (i.e., a low-pressure tire) or a bladder containing a fluid that can deform to accommodate the crowned road's hard surface S).

2. Wider and/or Shorter Traction Lugs

In some embodiments, the track 22 of the track system $16_i$ may be configured to be more resistant to wear as the agricultural vehicle 10 is roading. For instance, in some embodiments, the tread pattern 40 of the track 22 may be more resistant to wear or other deterioration as the agricultural vehicle 10 travels on the road's hard surface S. Notably, the tread pattern 40 of the track 22 may be designed to reduce potential for blowout of the traction lugs $58_1$-$58_T$ by reducing heat buildup within the track 22.

Figure 34:
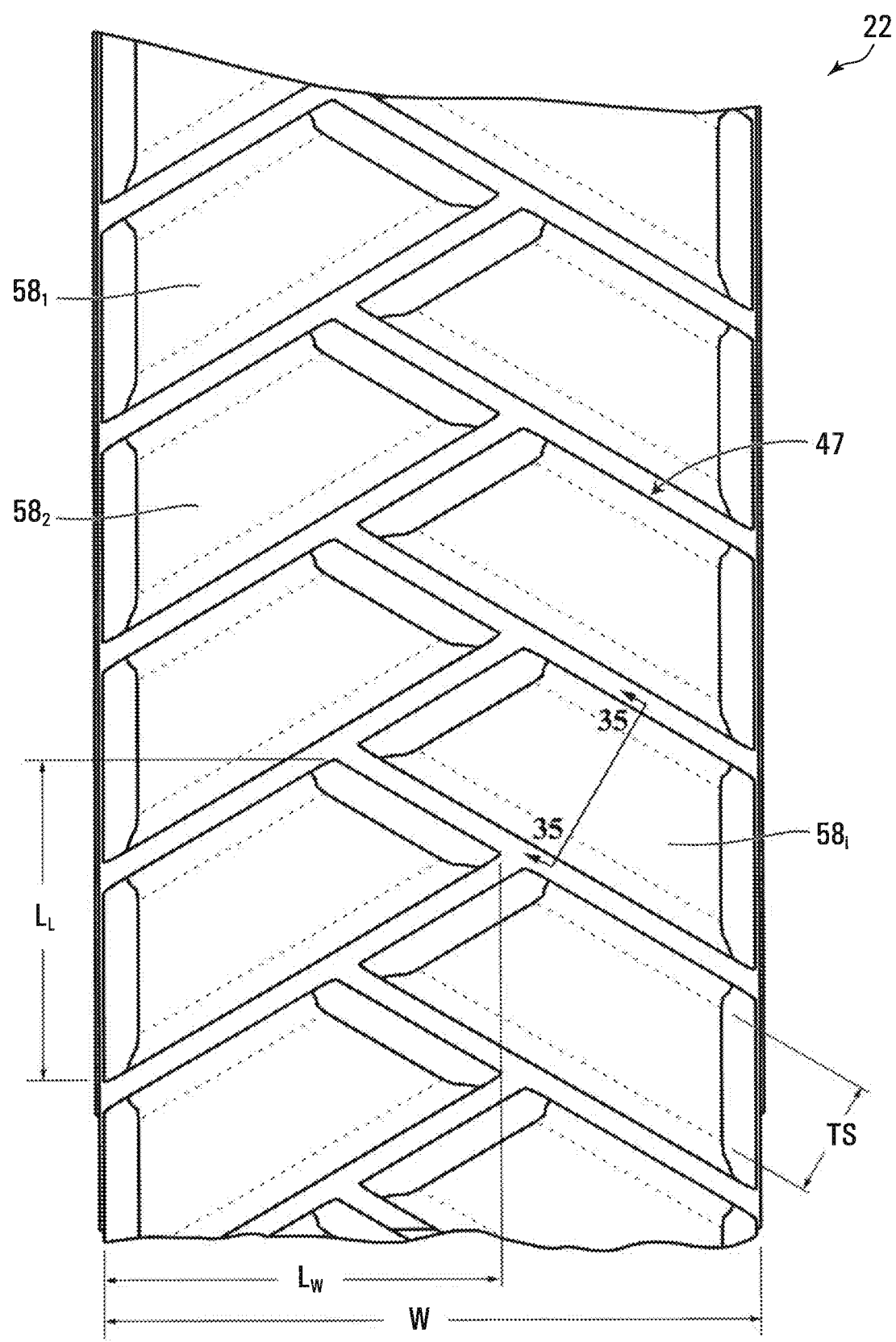
FIGS. 34 and 35 show a plan view and a side view of an example of an embodiment of the track in which traction projections of the track have a modified shape and dimensions to minimize deterioration of the track.
Figure 35:
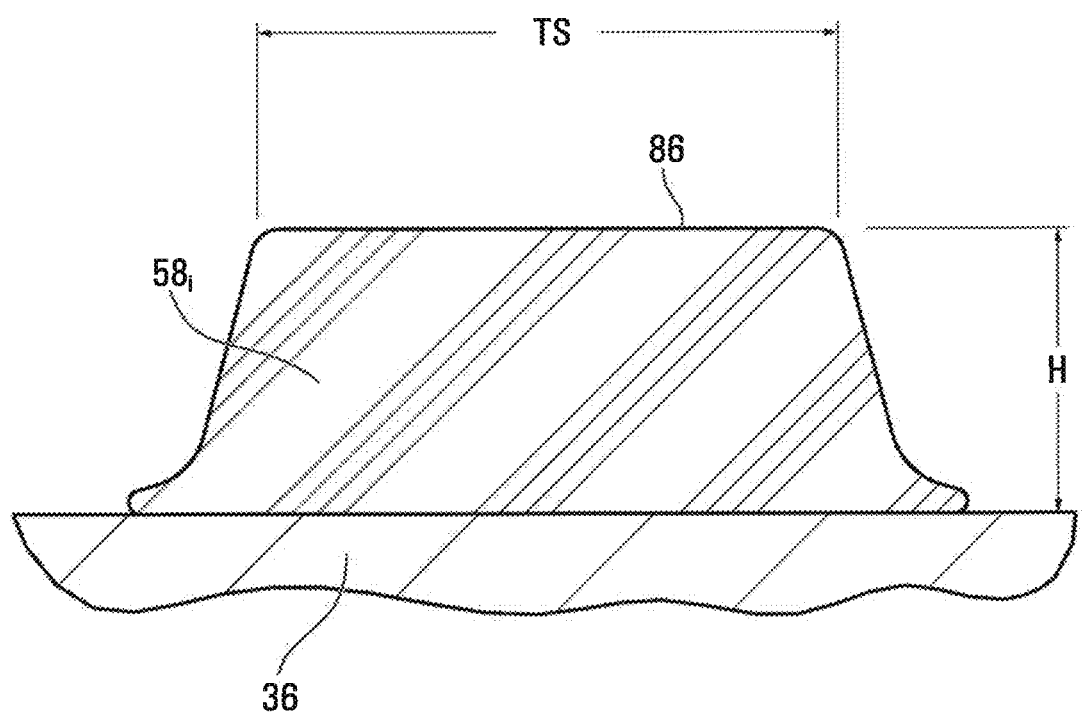
Figure 36:
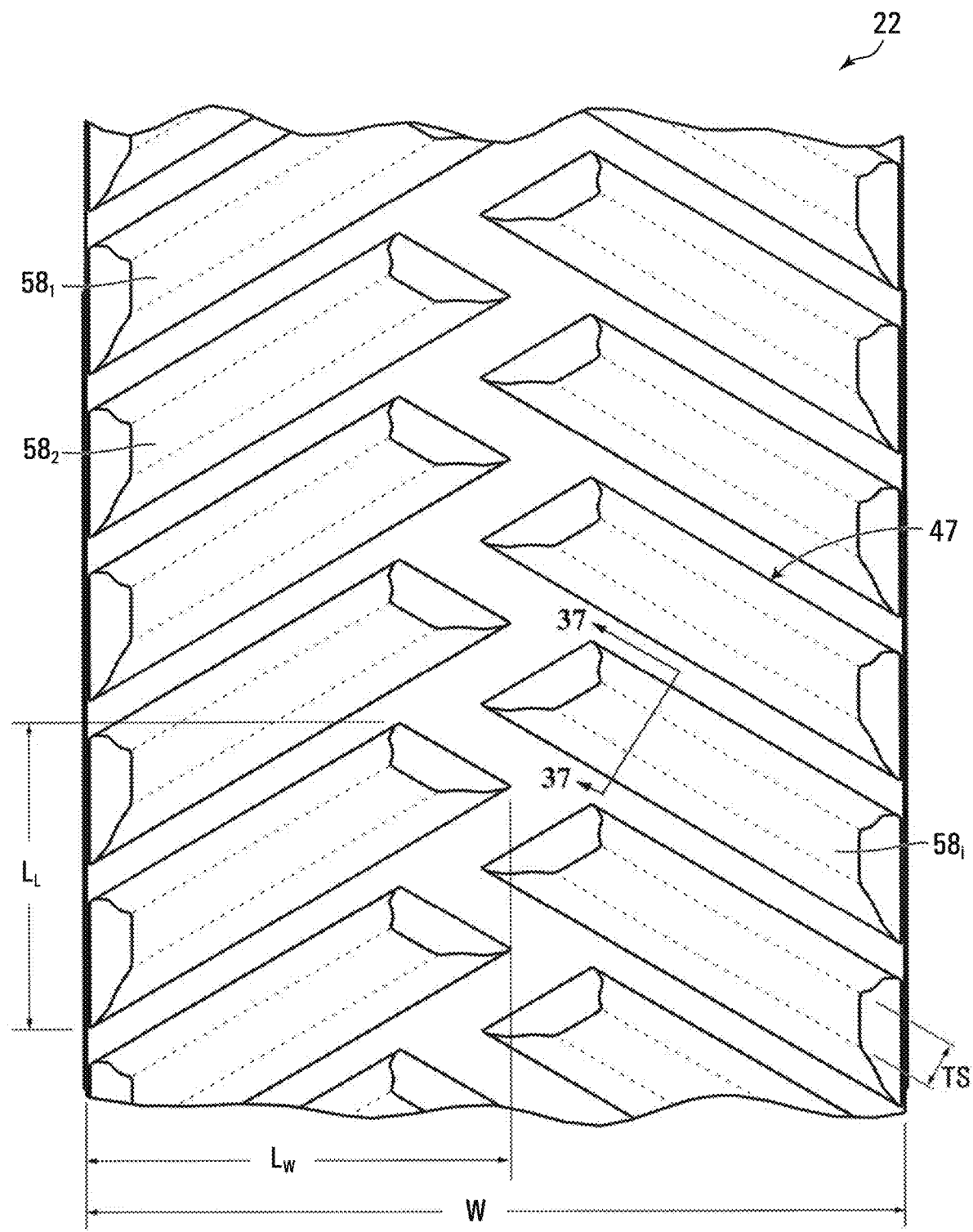
FIGS. 36 and 37 show a plan view and a side view of another example of an embodiment of the track in which the traction projections of the track have a modified shape and dimensions to minimize deterioration of the track.
Figure 37:
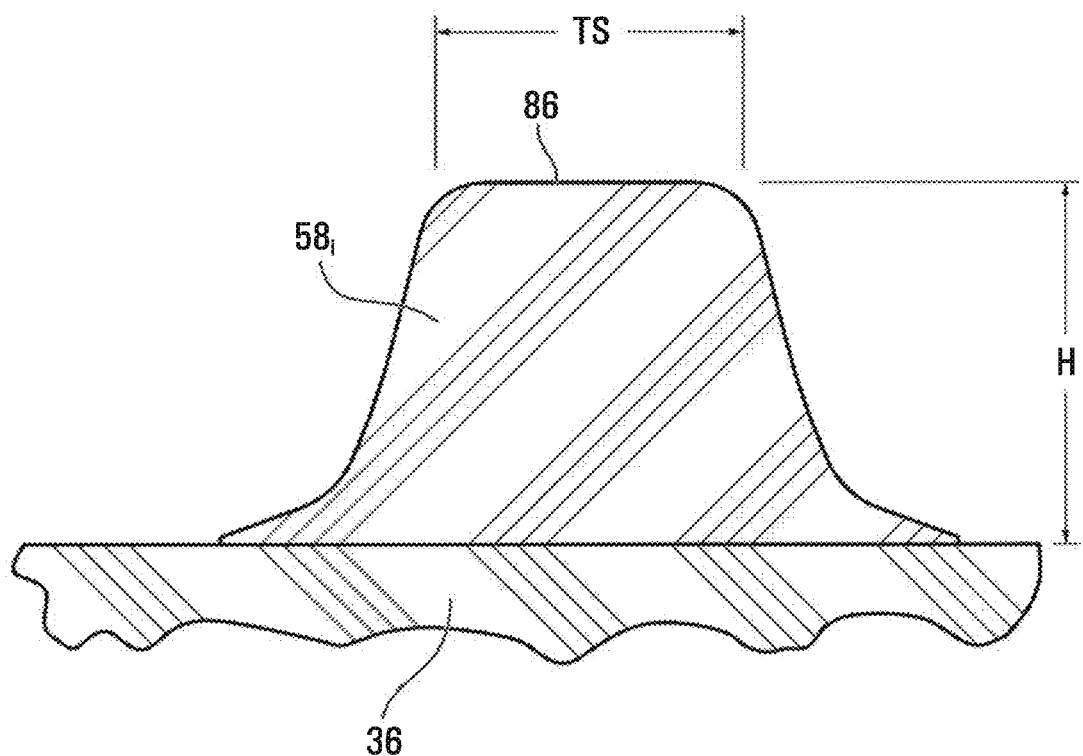
Figure 38:
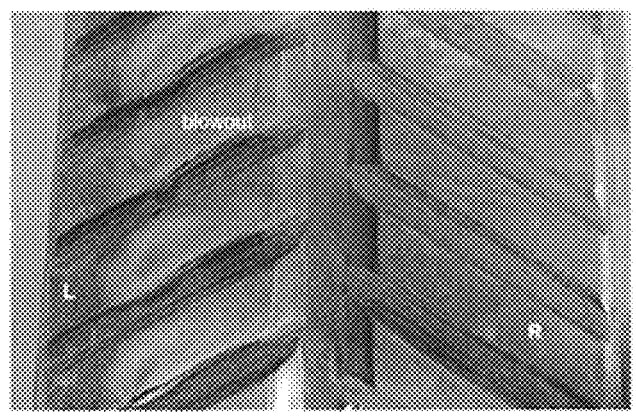
FIGS. 38 to 42 show damaged traction projections (i.e., blown out), a damaged carcass having a reinforcement (e.g., cables) exposed, and damaged idler wheels of a conventional track system as a result of roading.
Figure 39:
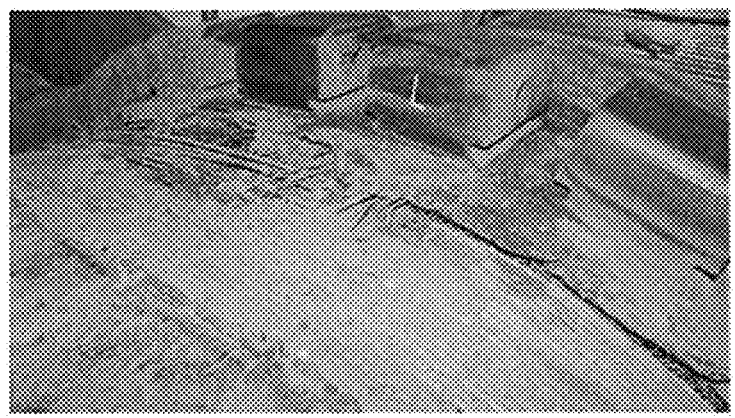
Figure 40:
Figure 41:
Figure 42:

To that end, in some embodiments, as shown in FIGS. 34 and 35, the traction lugs $58_1$-$58_T$ may be dimensioned to reduce potential for heat buildup within them and to facilitate their internal heat dissipation. For example, a ground-contacting area of each traction lug $58_i$ may be increased and/or the height H of the traction lug $58_i$ may be decreased in order to reduce deformation of the traction projection $58_i$ as it repeatedly contacts the road's hard surface S as the agricultural vehicle 10 is roading. Increasing the ground-contacting area of the traction lug $58_i$ distributes loading on the traction lug $58_i$ over a larger space and may thus reduce stress and strain of the traction lug $58_i$. Decreasing the height H of the traction lug $58_i$ may also help to reduce deflection of the traction lug $58_i$. This reduced deformation of the traction lug $58_i$ as it frequently engages the road's surface S while the vehicle 10 is roading may help to reduce heat buildup within the traction lug $58_i$, thus reducing potential for blowout of the traction lug $58_i$. In other words, by "flattening" the traction lug $58_i$, it may deform less and thus be less susceptible to blowout.

For example, in some embodiments, the width $L_W$ of the traction lug $58_i$ may be greater than that of conventional tracks. For instance, the width $L_W$ of the top surface 86 of the traction lug $58_i$ may be increased in relation to the width W of the track 22. For instance, a ratio of the width $L_W$ of the traction lug $58_i$ over the width W of the track 22 may be at least 0.5, in some cases at least 0.6, in some cases at least 0.7, and in some cases even more. The ratio of the width $L_W$ of the traction lug $58_i$ over the width W of the track 22 may have any other suitable value in other embodiments.

In some embodiments, a width TS of the top surface 86 of the traction lug $58_i$ may be significantly greater than that of conventional tracks. For instance, the width TS of the top surface 86 of the traction lug $58_i$ may be increased in relation to the width W of the track 22. For example, a ratio of the width TS of the top surface 86 of the traction lug $58_i$ over the width W of the track 22 may be at least 0.1, in some cases at least 0.15, in some cases at least 0.2, and in some cases even more. The ratio of the width TS of the top surface 86 of the traction lug $58_i$ over the width W of the track 22 may have any other suitable value in other embodiments.

Furthermore, the height H of the traction lug $58_i$ may be considerably smaller than that of conventional tracks. For instance, a ratio of the height H of the traction lug $58_i$ over the thickness $T_C$ of the carcass 36 may be no more than 1.2, in some cases no more than 1.15, in some cases no more than 1.1, in some cases no more than 1.05, and in some cases even less. The ratio of the height H of the traction lug $58_i$ over the thickness $T_C$ of the carcass 36 may have any other suitable value in other embodiments.

In some embodiments, a ratio of the width TS of the top surface 86 of the traction lug $58_i$ over the height H of the traction lug $58_i$ may be greater than conventional tracks. For example, in some embodiments, the ratio of the width TS of the top surface 86 of the traction lug $58_i$ over the height H of the traction lug $58_i$ may be greater than one, in some cases at least 1.2, in some cases at least 1.4, in some cases at least 1.6, in some cases at least 1.8, and in some cases even more (e.g., 2 or more). The ratio of the width TS of the top surface 86 of the traction lug $58_i$ over the height H of the traction lug $58_i$ may have any other suitable value in other embodiments.

In this embodiment, with its track systems $16_1$-$16_4$ designed to better perform when it is roading, the agricultural vehicle 10 may travel faster on the road 115 without excessively wearing or deteriorating the track systems $16_1$-$16_4$.

For example, in some embodiments, a speed restriction for the agricultural vehicle 10 on the road 115 may be laxer (i.e., less stringent) than if an enhanced-roading feature (e.g., the lateral load distribution mechanism 100 or the wider and/or shorter traction lugs $58_1$-$58_1$-) of a track system $16_i$ was omitted but the track system $16_i$ was otherwise identical. That is, the agricultural vehicle 10 may be authorized to travel faster on the road 115 than if the enhanced-roading feature of the track system $16_i$ was omitted but the track system $16_i$ was otherwise identical.

The speed restriction for the agricultural vehicle 10 on the road 115 may be conveyed by a provider of the track system $16_i$ as a recommended maximal speed of the agricultural vehicle 10 on the road 115 in certain conditions, including a load on an axle of the vehicle 10 that carries the track system $16_i$. For example, the provider of the track system $16_i$ may be a manufacturer of the track system $16_i$ and/or a manufacturer of the agricultural vehicle 10 (e.g., an original equipment manufacturer (OEM)).

Figure 43:
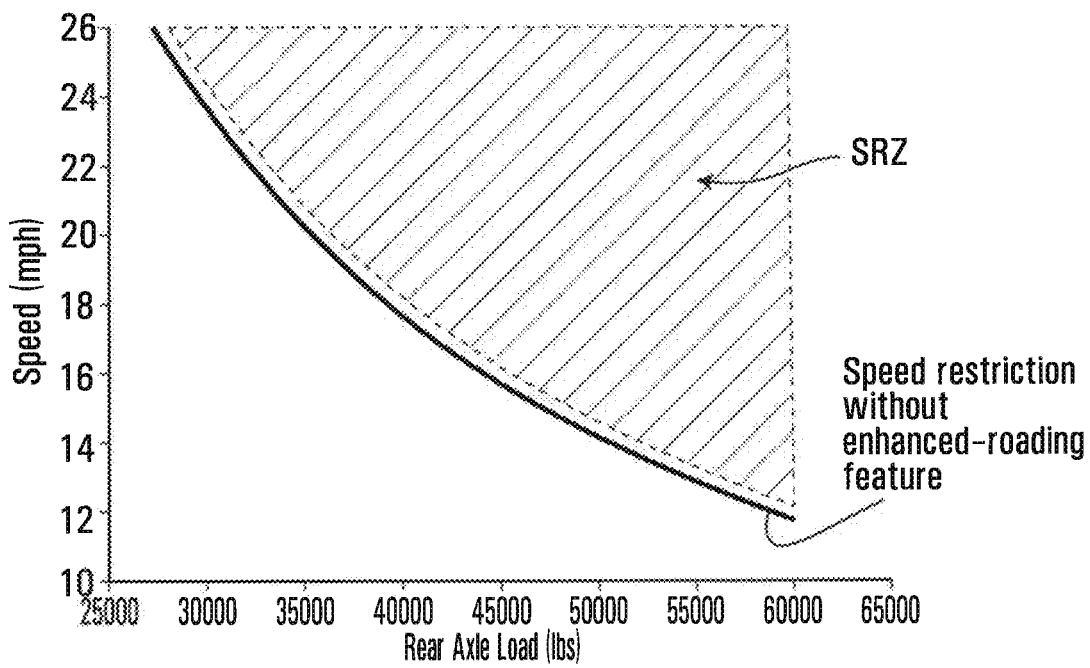
FIG. 43 is a chart representing a speed restriction for the agricultural vehicle on the crowned road as a function of a load on a rear axle of the vehicle, and more particularly shows a speed restriction zone comprising speed restrictions of the vehicle when the agricultural vehicle has an enhanced-roading feature.
Figure 44:
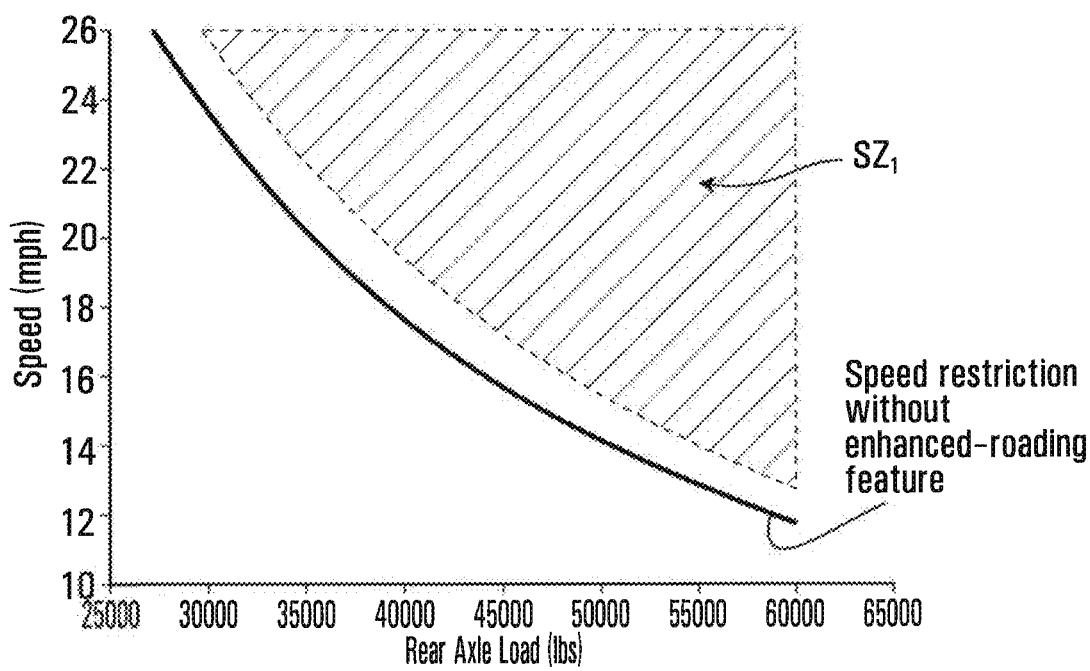
FIGS. 44 to 48 are charts showing examples of speed restriction subzones for the agricultural vehicle when the agricultural vehicle travels on the crowned road.
Figure 45:
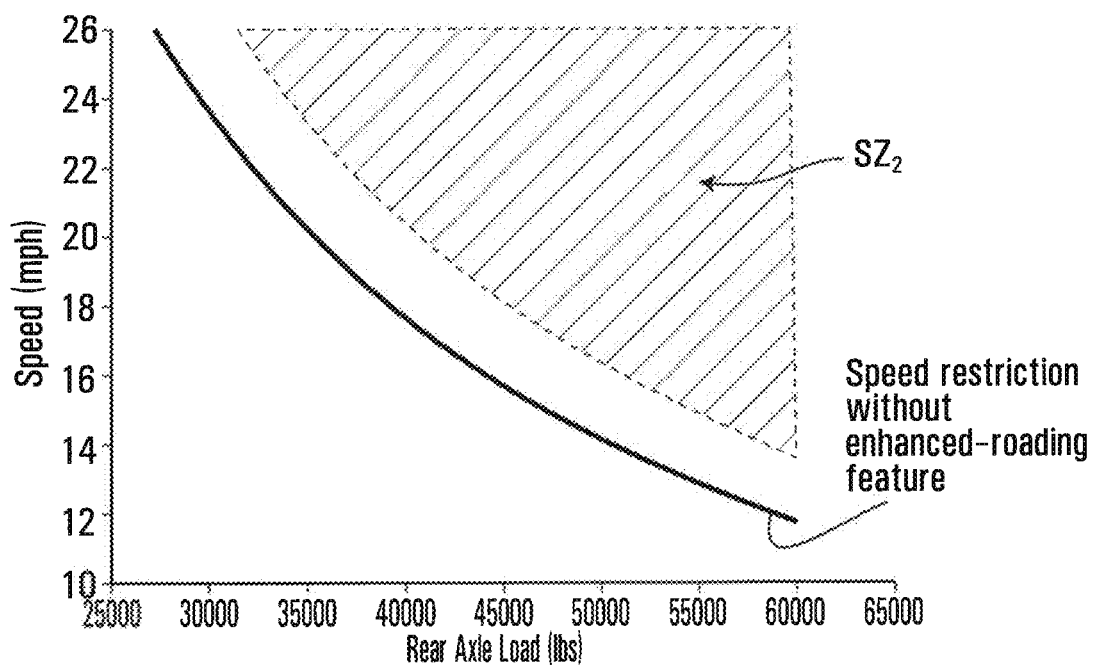
Figure 46:
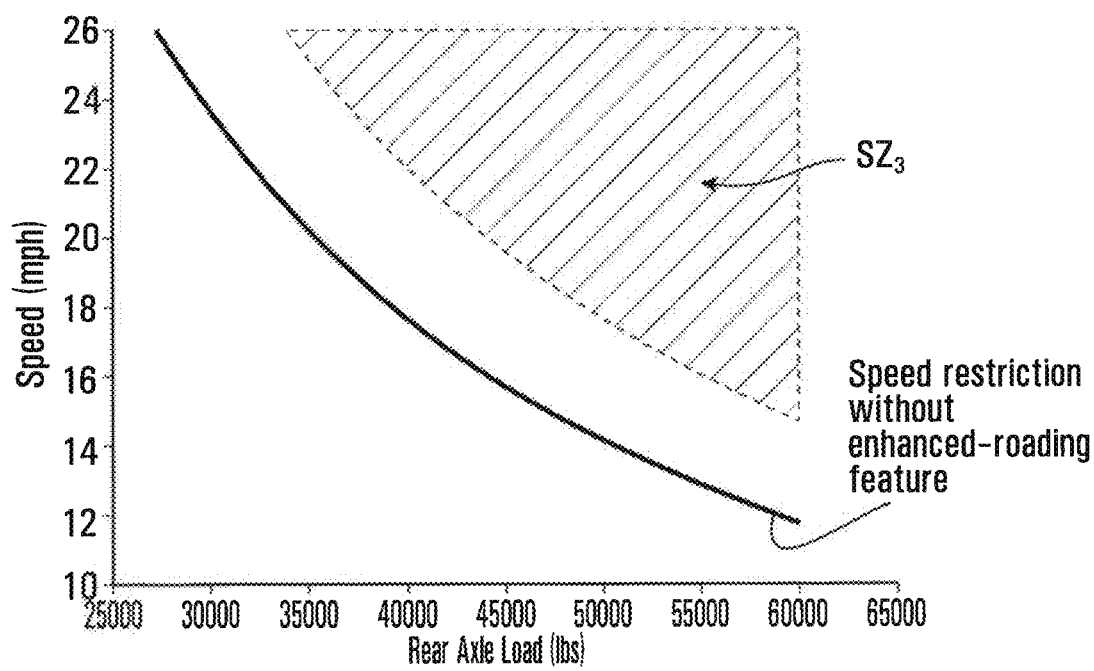
Figure 47:
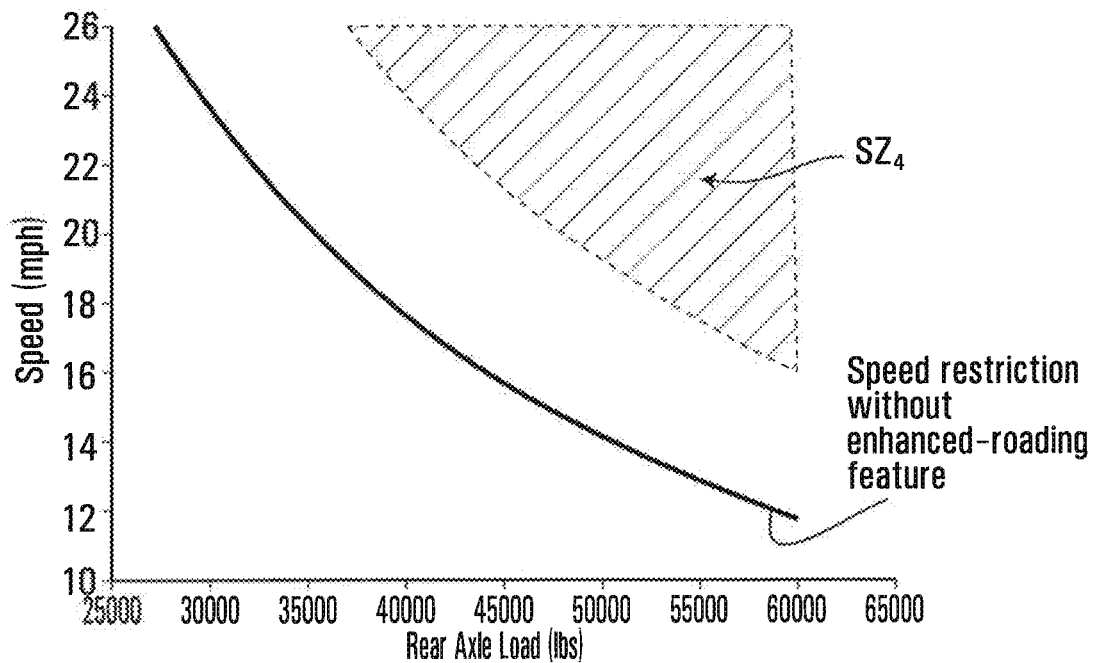
Figure 48:
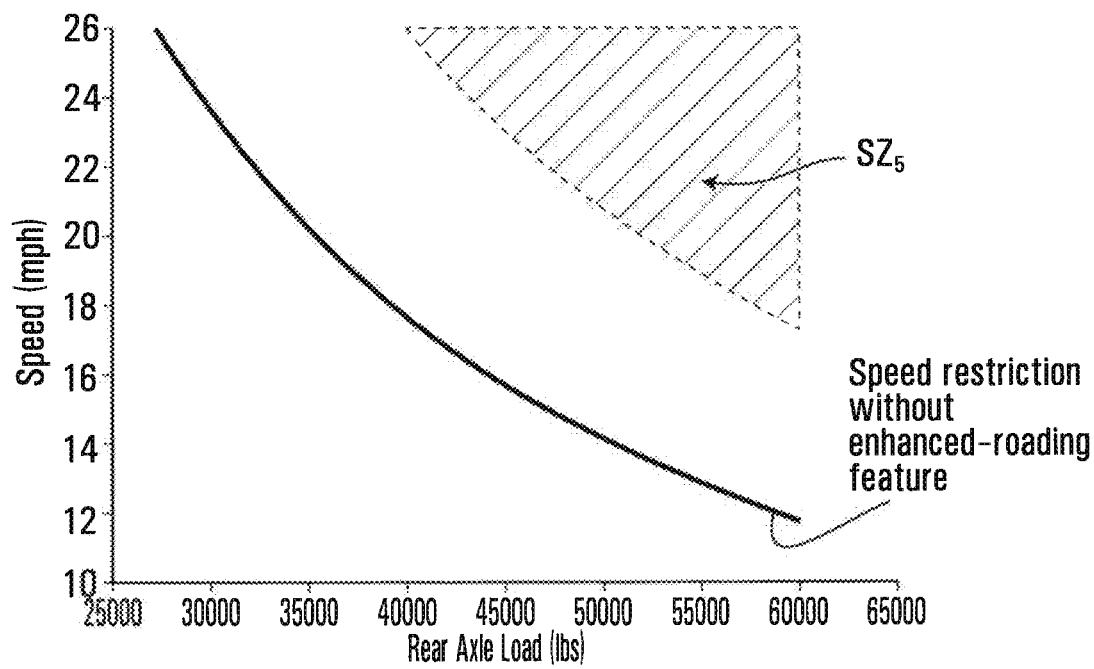

For instance, in some embodiments, as shown in a chart represented in FIG. 43, the speed restriction for the agricultural vehicle 10 on the road 115 may be expressed as a recommended maximal speed of the vehicle 10 as a function of a load on an axle of the vehicle 10 carrying the track system $16_i$. In this example, the axle is a rear axle of the vehicle 10 (e.g., as the load on the rear axle of the vehicle 10 may be greater when the work implement 18 is mounted to a rear portion of the vehicle 10). Also, in this example, the track 22 is narrow. More particularly, in this example, the width W of the track 22 is 18 inches. Furthermore, in this example, the speed restriction for the agricultural vehicle 10 on the road 115 is based on an ambient temperature of 25° C. The function expressing the speed restriction for the agricultural vehicle 10 on the road 115 based on the load on the axle of the vehicle 10 may be represented as a graph such as a line (e.g., a curve), a table, a diagram, or any other information that expresses the recommended maximal speed of the vehicle 10 based on the load on the axle of the vehicle 10.

In this example, the speed restriction for the agricultural vehicle 10 on the road 115 if an enhanced-roading feature (e.g., the lateral load distribution mechanism 100 or the wider and/or shorter traction lugs $58_1$-$58_T$) of the track system $16_i$ was omitted but the track system $16_i$ was otherwise identical is represented by a function denoted "speed restriction without enhanced-roading feature". This can be established by omitting the enhanced-roading feature (e.g., the lateral load distribution mechanism 100 or the wider and/or shorter traction lugs $58_1$-$58_T$) of the track system $16_i$ but keeping the track system $16_i$ otherwise identical. For instance, in embodiments in which the bottom track-contacting areas 146 of laterally-adjacent ones of the idler wheels $23_1$, $23_2$, $26_1$, $26_2$, $28_1$-$28_4$ are vertically movable relative to one another (e.g., as described in section 1 above), this enhanced-roading feature may be omitted by precluding the bottom track-contacting areas 146 of the laterally-adjacent ones of the idler wheels $23_1$, $23_2$, $26_1$, $26_2$, $28_1$-$28_4$ from vertically moving relative to one another. For example, in embodiments in which the lateral load distribution mechanism 100 allows the roll motion of laterally-adjacent ones of the idler wheels $23_1$, $23_2$, $26_1$, $26_2$, $28_1$-$28_4$ about the roll axis 164, this enhanced-roading feature may be omitted by precluding the roll motion of the laterally-adjacent ones of the idler wheels $23_1$, $23_2$, $26_1$, $26_2$, $28_1$-$28_4$ about the roll axis 164 (e.g., by removing, blocking or otherwise disabling a pivot enabling the roll motion of the laterally-adjacent ones of the idler wheels $23_1$, $23_2$, $26_1$, $26_2$, $28_1$-$28_4$ about the roll axis 164). This may be done in the track system $16_i$ or by replacing the track system $16_i$ with an identical track system in which the enhanced-roading feature is omitted.

As shown in the chart, in this example, the speed restriction for the agricultural vehicle 10 on the road 115 may be laxer, i.e., the agricultural vehicle 10 may be authorized to travel faster on the road 115, with the enhanced-roading feature. That is, the speed restriction for the agricultural vehicle 10 on the road 115 with the enhanced-roading feature may be defined in a zone SRZ of the chart that is higher than the speed restriction without the enhanced-roading feature.

For example, in some embodiments, a ratio of (i) the speed restriction for the agricultural vehicle 10 on the road 115 with the enhanced-roading feature (e.g., the lateral load distribution mechanism 100 or the wider and/or shorter traction lugs $58_1$-$58_T$) of the track system $16_i$ over (ii) the speed restriction for the agricultural vehicle 10 on the road 115 if the enhanced-roading feature of the track system $16_i$ was omitted but the track system $16_i$ was otherwise identical may be at least 1.10, in some cases at least 1.15, in some cases at least 1.20, in some cases at least 1.25, in some cases at least 1.30, in some cases at least 1.45, and in some cases even more (e.g., at least 1.50 or more). This ratio may have any other suitable value in other embodiments.

For instance, in some embodiments, when the load at the axle of the vehicle 10 is at least 40000 lbs, the ratio of (i) the speed restriction for the agricultural vehicle 10 on the road 115 with the enhanced-roading feature (e.g., the lateral load distribution mechanism 100 or the wider and/or shorter traction lugs $58_1$-$58_T$) of the track system $16_i$ over (ii) the speed restriction for the agricultural vehicle 10 on the road 115 if the enhanced-roading feature of the track system $16_i$ was omitted but the track system $16_i$ was otherwise identical may be at least 1.10, in some cases at least 1.15, in some cases at least 1.20, in some cases at least 1.25, in some cases at least 1.30, and in some cases even more (e.g., at least 1.40 or more). This ratio may have any other suitable value in other embodiments.

FIGS. 44 to 48 show examples of subzones $SZ_1$-$SZ_5$ of the zone SRZ of the chart in which the speed restriction for the agricultural vehicle 10 on the road 115 with the enhanced-roading feature can be defined in various embodiments, where the agricultural vehicle 10 may be authorized to travel increasingly faster on the road 115.

Figure 49:
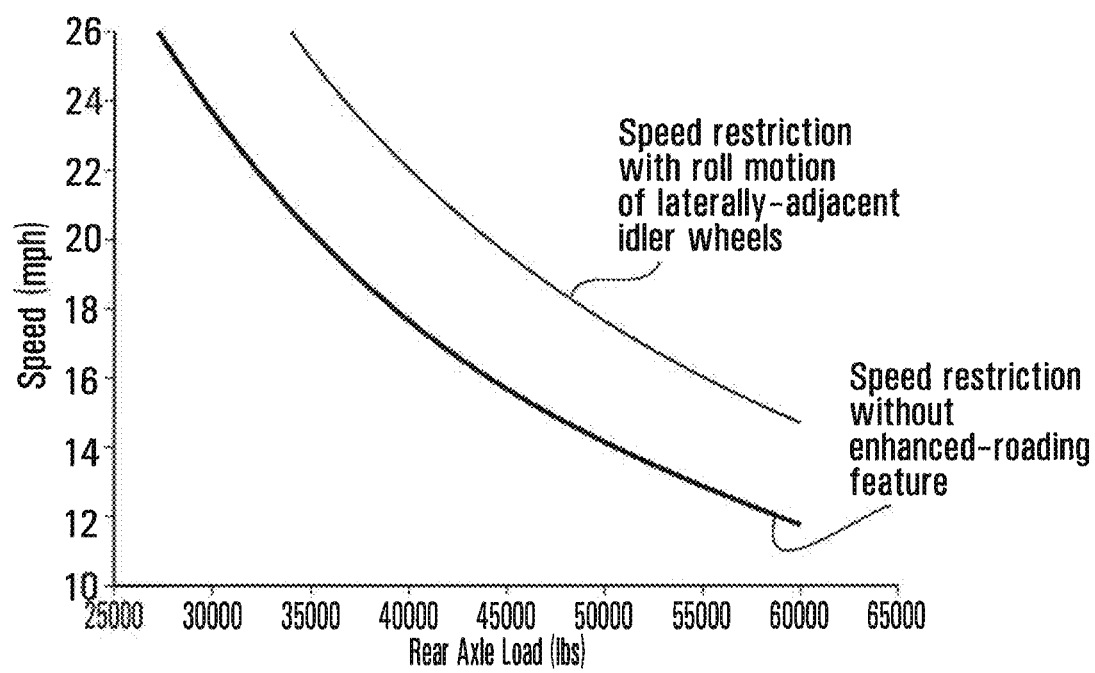
FIG. 49 is a chart showing a speed restriction for the agricultural vehicle on the crowned road when the lateral load distribution mechanism allows a roll motion of laterally-adjacent ones of the idler wheels.

As an example, in embodiments in which the lateral load distribution mechanism 100 allows the roll motion of laterally-adjacent ones of the idler wheels $23_1$, $23_2$, $26_1$, $26_2$, $28_1$-$28_4$ about the roll axis 164, the speed restriction for the agricultural vehicle 10 on the road 115 may be as defined as shown in FIG. 49.

In view of the enhanced-roading feature of the track system $16_i$ the agricultural vehicle 10 may thus be authorized to travel faster on the road 115. Notably, the track system $16_i$ may be homologated to allow the agricultural vehicle 10 to travel faster on the road 115. That is, the provider of the track system $16_i$ may officially authorize the agricultural vehicle 10 to travel faster on the road 115, including by conveying the speed restriction for the agricultural vehicle 10 on the road 115 that is more lax. For example, in some embodiments, the provider of the track system $16_i$ may honor a warranty for the track system $16_i$ according to the speed restriction for the agricultural vehicle 10 on the road 115 that is more lax.

The speed restriction for the agricultural vehicle 10 on the road 115 may be conveyed by the provider of the track system $16_i$ in any suitable way in various embodiments. For example, in some embodiments, the speed restriction for the agricultural vehicle 10 on the road 115 may be conveyed by a tangible medium. For instance, the tangible medium may be a manual (e.g., user or operator manual) provided with the track system $16_i$ and/or the agricultural vehicle 10. The tangible medium may be a printed medium (e.g., a paper copy) or a computer-readable storage medium (e.g., a semiconductor memory (e.g., read-only memory (ROM) and/or random-access memory (RAM)), a magnetic storage medium, an optical storage medium, and/or any other suitable type of memory). In some embodiments, the speed restriction for the agricultural vehicle 10 on the road 115 may be conveyed on an Internet webpage provided by the provider of the track system $16_i$. In some embodiments, the speed restriction for the agricultural vehicle 10 on the road 115 may be conveyed on the user interface 70 of the operator cabin 20 (e.g., on a graphical user interface (GUI) of a display of the user interface 70). In some embodiments, the speed restriction for the agricultural vehicle 10 on the road 115 may be conveyed in a memory accessed by a controller of the agricultural vehicle 10 that controls operation of the vehicle 10 (e.g., a powertrain controller such as an engine control unit (ECU) that controls the powertrain 15 of the vehicle 10).

Although the agricultural vehicle 10 illustrated in FIG. 1 is an agricultural tractor comprising four track systems $16_1$-$16_4$, different types of agricultural vehicles configured differently (e.g., having a different number of track systems) may implement improvements based on principles disclosed herein.

Figure 50:
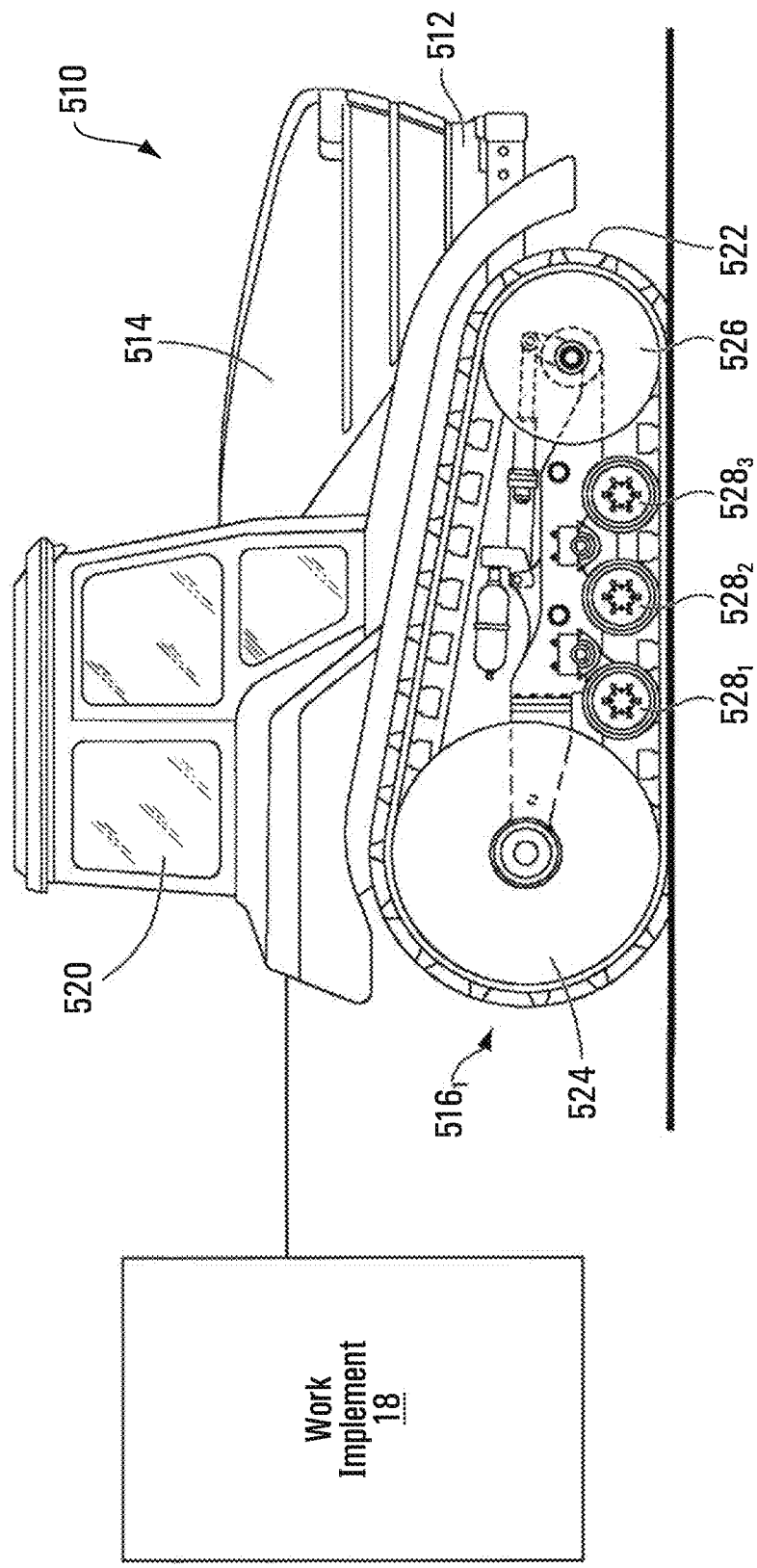
FIG. 50 shows an example of an agricultural vehicle comprising two track systems rather than four.

For instance, with additional reference to FIG. 50, an agricultural vehicle 510 may be provided comprising two track systems $516_1$, $516_2$ rather than four (i.e., one track system $516_i$ at each side of the agricultural vehicle 510). The agricultural vehicle 510 also comprises a frame 512, a prime mover 514, and an operator cabin 520 and can be equipped with the work implement 18 to perform agricultural work. Each track system $516_i$ comprises a drive wheel 524 at a first longitudinal end portion of the track system $516_i$, an idler wheel 526 at a second longitudinal end portion of the track system $516_i$ opposite to the first longitudinal end portion, and a plurality of roller wheels $528_1$-$528_6$ intermediate the drive wheel 524 and the idler wheel 526. The track system $516_i$ further comprises a track 522 disposed around the wheels 524, 526, $528_1$-$528_6$ and driven by the drive wheel 524. The track system $516_i$ may implement the lateral load distribution mechanism 100 as described in section 1 above. Additionally or alternatively, the track 522 may be configured in a manner similar to the track 22 as described in section 2 above.

Figure 51:
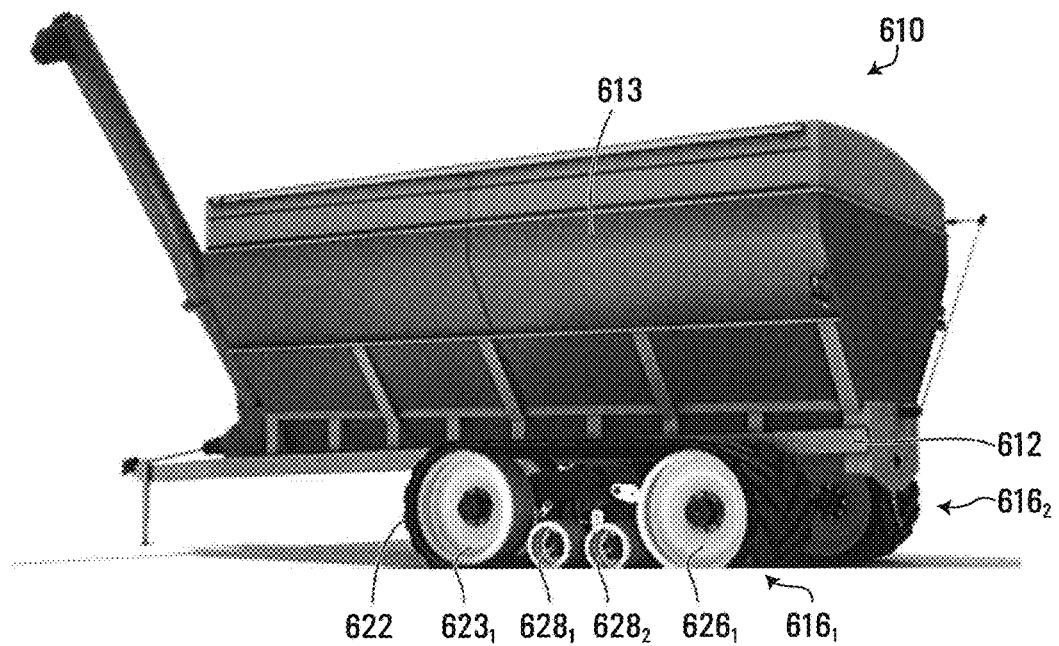
FIG. 51 shows an example of a trailed vehicle configured to be attached to the agricultural vehicle of FIG. 1 or 50.

Furthermore, the work implement 18 that is drawn by the agricultural vehicle 10 or the agricultural vehicle 510 may implement the improvements disclosed herein. For instance, with additional reference to FIG. 51, the work implement 18 may comprise a trailed vehicle 610 comprising a frame 612, a body 613 (e.g., a container) and track systems $616_1$, $616_2$. In this example, the trailed vehicle 610 is a harvest cart. In other examples, the trailed vehicle 610 may be a fertilizer cart, a sprayer, a planter or any other suitable type of trailed vehicle. Each track system $616_i$ of the trailed vehicle 610 comprises front (i.e., leading) idler wheels $623_1$, $623_2$ at a first longitudinal end portion of the track system $616_i$, rear (i.e., trailing) idler wheels $626_1$, $626_2$ at a second longitudinal end portion of the track system $616_i$ opposite the first longitudinal end portion, and a plurality of roller wheels $628_1$-$628_4$ intermediate the front idler wheels $623_1$, $623_2$ and the rear idler wheels $626_1$, $626_2$. The track system $616_i$ further comprises a track 622 disposed around the wheels $626_1$, $626_2$, $626_1$, $626_2$, $628_1$-$628_4$. The track system $616_i$ may implement the lateral load distribution mechanism 100 as described in section 1 above. Additionally or alternatively, the track 622 may be configured in a manner similar to the track 22 as described in section 2 above.

In this example, the trailed vehicle 610 is not motorized in that it does not comprise a prime mover for driving the track systems $616_1$, $616_2$. Rather, the trailed vehicle 610 is displaced by the agricultural vehicle 10 or the agricultural vehicle 510 to which the trailed vehicle 610 is attached. However, in some examples, the trailed vehicle 610 may be motorized. That is, the trailed vehicle 610 may comprise a prime mover for driving a drive wheel of each track system $616_i$. For example, instead of comprising rear idler wheels $626_1$, $626_2$, the track system $616_i$ may comprise a drive wheel for driving the track 622.

In some examples of implementation, any feature of any embodiment described herein may be used in combination with any feature of any other embodiment described herein.

Certain additional elements that may be needed for operation of some embodiments have not been described or illustrated as they are assumed to be within the purview of those of ordinary skill in the art. Moreover, certain embodiments may be free of, may lack and/or may function without any element that is not specifically disclosed herein.

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A method for regulating a speed of an agricultural vehicle on a paved road, the method comprising:

providing a plurality of track systems for traction of the agricultural vehicle in an agricultural field and on the paved road, each track system comprising a track and a track-engaging assembly for driving and guiding the track around the track-engaging assembly, the track comprising elastomeric material to flex around the track-engaging assembly, the track comprising a ground-engaging outer surface, an inner surface opposite to the ground-engaging outer surface, and a plurality of wheel-contacting projections that project from the inner surface and include respective parts of the elastomeric material, the track-engaging assembly comprising a drive wheel for driving the track and a plurality of track-engaging wheels for contacting a bottom run of the track, laterally-adjacent ones of the track-engaging wheels being spaced apart in a widthwise direction of the track system to receive the wheel-contacting projections of the track therebetween, the track system comprising a lateral load distribution mechanism configured such that bottom track-contacting areas of the laterally-adjacent ones of the track-engaging wheels are movable relative to one another in a heightwise direction of the track system when the agricultural vehicle travels, including in the agricultural field and on the paved road; and conveying a speed restriction for the agricultural vehicle on the paved road that is laxer than if the bottom track-contacting areas of the laterally-adjacent ones of the track-engaging wheels were not movable relative to one another in the heightwise direction of the track system when the agricultural vehicle travels on the paved road, wherein said conveying comprises providing a tangible medium conveying the speed restriction for the agricultural vehicle on the paved road, wherein the tangible medium is a computer-readable storage medium, wherein the computer-readable storage medium is accessible by a controller of the agricultural vehicle that controls operation of the agricultural vehicle.

2. The method of claim 1, wherein the paved road includes a crown and a surface that slopes downwardly away from the crown on opposite sides of the crown.

3. The method of claim 1, wherein the computer-readable storage medium is configured to convey the speed restriction for the agricultural vehicle on the paved road on a display.

4. The method of claim 1, wherein the computer-readable storage medium is configured to convey the speed restriction for the agricultural vehicle on the paved road via a user interface of the agricultural vehicle.

5. The method of claim 1, wherein the lateral load distribution mechanism of the track system is configured such that a given one of the laterally-adjacent ones of the track-engaging wheels is pivotable about an axis transversal to an axis of rotation of the given one of the laterally-adjacent ones of the track-engaging wheels.

6. The method of claim 5, wherein the axis transversal to the axis of rotation of the given one of the laterally-adjacent ones of the track-engaging wheels is substantially parallel to a longitudinal direction of the track system.

7. The method of claim 6, wherein the axis transversal to the axis of rotation of the given one of the laterally-adjacent ones of the track-engaging wheels is vertically spaced from a top of each of the wheel-contacting projections of the track.

8. The method of claim 5, wherein the lateral load distribution mechanism of the track system comprises an outer member and an inner member that is rotatable within the outer member and defines the axis transversal to the axis of rotation of the given one of the laterally-adjacent ones of the track-engaging wheels.

9. The method of claim 5, wherein longitudinally-spaced ones of the track-engaging wheels that are spaced from one another in a longitudinal direction of the track system are pivotable in unison about an axis substantially parallel to axes of rotation of the longitudinally-spaced ones of the track-engaging wheels.

10. The method of claim 1, wherein the track comprises a plurality of reinforcing cables extending in a longitudinal direction of the track.

11. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
| --- | --- |
| 30,000 | At least 24.3 |
| 35,000 | At least 20.8 |
| 40,000 | At least 18.2 |
| 45,000 | At least 16.3 |
| 50,000 | At least 14.6 |
| 55,000 | At least 13.1 |
| 60,000 | At least 12.1. |

12. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
| --- | --- |
| 30,000 | At least 26 |
| 35,000 | At least 22.3 |
| 40,000 | At least 19.4 |
| 45,000 | At least 17.2 |
| 50,000 | At least 15.2 |
| 55,000 | At least 14 |
| 60,000 | At least 12.8. |

13. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
| --- | --- |
| 35,000 | At least 23.4 |
| 40,000 | At least 20.4 |
| 45,000 | At least 18 |
| 50,000 | At least 16.3 |
| 55,000 | At least 14.6 |
| 60,000 | At least 13.4. |

14. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 35,000 | At least 25.4 |
| 40,000 | At least 22.1 |
| 45,000 | At least 19.7 |
| 50,000 | At least 17.6 |
| 55,000 | At least 16 |
| 60,000 | At least 14.9. |

15. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 40,000 | At least 24 |
| 45,000 | At least 21.2 |
| 50,000 | At least 19.2 |
| 55,000 | At least 17.2 |
| 60,000 | At least 16. |

16. The method of claim 1, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 40,000 | At least 26 |
| 45,000 | At least 23.2 |
| 50,000 | At least 20.9 |
| 55,000 | At least 18.9 |
| 60,000 | At least 17.2. |

17. In combination:
a track system for traction of an agricultural vehicle in an agricultural field and on a paved road, the track system comprising a track and a track-engaging assembly for driving and guiding the track around the track-engaging assembly, the track comprising elastomeric material to flex around the track-engaging assembly, the track comprising a ground-engaging outer surface, an inner surface opposite to the ground-engaging outer surface, and a plurality of wheel-contacting projections that project from the inner surface and include respective parts of the elastomeric material, the track-engaging assembly comprising a drive wheel for driving the track and a plurality of track-engaging wheels for contacting a bottom run of the track, laterally-adjacent ones of the track-engaging wheels being spaced apart in a widthwise direction of the track system to receive the wheel-contacting projections of the track therebetween, the track system comprising a lateral load distribution mechanism configured such that bottom track-contacting areas of the laterally-adjacent ones of the track-engaging wheels are movable relative to one another in a heightwise direction of the track system when the agricultural vehicle travels, including in the agricultural field and on the paved road; and
a tangible medium conveying a speed restriction for the agricultural vehicle on the paved road, the speed restriction being laxer than if the bottom track-contacting areas of the laterally-adjacent ones of the track-engaging wheels were not movable relative to one another in the heightwise direction of the track system when the agricultural vehicle travels on the paved road, wherein the tangible medium is a computer-readable storage medium, wherein the computer-readable storage medium is accessible by a controller of the agricultural vehicle that controls operation of the agricultural vehicle.

18. The combination of claim 17, wherein the lateral load distribution mechanism of the track system is configured such that a given one of the laterally-adjacent ones of the track-engaging wheels is pivotable about an axis transversal to an axis of rotation of the given one of the laterally-adjacent ones of the track-engaging wheels.

19. The combination of claim 18, wherein the axis transversal to the axis of rotation of the given one of the laterally-adjacent ones of the track-engaging wheels is substantially parallel to a longitudinal direction of the track system.

20. The combination of claim 19, wherein the axis transversal to the axis of rotation of the given one of the laterally-adjacent ones of the track-engaging wheels is vertically spaced from a top of each of the wheel-contacting projections of the track.

21. The combination of claim 18, wherein the lateral load distribution mechanism of the track system comprises an outer member and an inner member that is rotatable within the outer member and defines the axis transversal to the axis of rotation of the given one of the laterally-adjacent ones of the track-engaging wheels.

22. The combination of claim 18, wherein longitudinally-spaced ones of the track-engaging wheels that are spaced from one another in a longitudinal direction of the track system are pivotable in unison about an axis substantially parallel to axes of rotation of the longitudinally-spaced ones of the track-engaging wheels.

23. The combination of claim 17, wherein the computer-readable storage medium is configured to convey the speed restriction for the agricultural vehicle on the paved road on a display.

24. The combination of claim 17, wherein the computer-readable storage medium is configured to convey the speed restriction for the agricultural vehicle on the paved road via a user interface of the agricultural vehicle.

25. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 30,000 | At least 24.3 |
| 35,000 | At least 20.8 |
| 40,000 | At least 18.2 |
| 45,000 | At least 16.3 |
| 50,000 | At least 14.6 |
| 55,000 | At least 13.1 |
| 60,000 | At least 12.1. |

26. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 30,000 | At least 26 |
| 35,000 | At least 22.3 |
| 40,000 | At least 19.4 |
| 45,000 | At least 17.2 |
| 50,000 | At least 15.2 |
| 55,000 | At least 14 |
| 60,000 | At least 12.8. |

27. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 35,000 | At least 23.4 |
| 40,000 | At least 20.4 |
| 45,000 | At least 18 |
| 50,000 | At least 16.3 |
| 55,000 | At least 14.6 |
| 60,000 | At least 13.4. |

28. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 35,000 | At least 25.4 |
| 40,000 | At least 22.1 |
| 45,000 | At least 19.7 |
| 50,000 | At least 17.6 |
| 55,000 | At least 16 |
| 60,000 | At least 14.9. |

29. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 40,000 | At least 24 |
| 45,000 | At least 21.2 |
| 50,000 | At least 19.2 |
| 55,000 | At least 17.2 |
| 60,000 | At least 16. |

30. The combination of claim 17, wherein the speed restriction for the agricultural vehicle on the paved road is defined as a function of a rear load on an axle of the agricultural vehicle and respects at least part of the conditions expressed below:

| Rear Axle Load (lbs) | Speed restriction (mph) |
|---|---|
| 40,000 | At least 26 |
| 45,000 | At least 23.2 |
| 50,000 | At least 20.9 |
| 55,000 | At least 18.9 |
| 60,000 | At least 17.2. |

* * * * *